United States Patent
Leyden et al.

(10) Patent No.: US 6,270,335 B2
(45) Date of Patent: *Aug. 7, 2001

(54) SELECTIVE DEPOSITION MODELING METHOD AND APPARATUS FOR FORMING THREE-DIMENSIONAL OBJECTS AND SUPPORTS

(75) Inventors: Richard N. Leyden, Topanga; Jeffrey S. Thayer, Montana; Bryan J. L. Bedal, Santa Clarita; Thomas A. Almquist, San Gabriel; Charles W. Hull, Santa Clarita, all of CA (US); Jocelyn M. Earl, Old Headington (GB); Thomas A. Kerekes, Calabasas, CA (US); Christian M. Merot, Mesa, CO (US); Richard P. Fedchenko, Saugus, CA (US); Michael S. Lockard, Elizabeth Lake, CA (US); Thomas H. Pang, Castaic, CA (US)

(73) Assignee: 3D Systems, Inc., Valencia, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,512

(22) Filed: Feb. 18, 1999

Related U.S. Application Data

(60) Division of application No. 08/722,335, filed on Sep. 27, 1996, now abandoned, which is a continuation-in-part of application No. 08/534,813, filed on Sep. 27, 1995, now abandoned.

(51) Int. Cl.[7] .............................. B29C 35/08; B29C 41/02

(52) U.S. Cl. .......................................... 425/375; 425/449

(58) Field of Search .................................... 425/145, 150, 425/375, 447, 449; 264/308, 401

(56) References Cited

U.S. PATENT DOCUMENTS

| | | |
|---|---|---|
| 4,567,570 | 1/1986 | Peer . |
| 4,741,930 | 5/1988 | Howard et al. . |
| 4,775,945 | 10/1988 | Cavill et al. . |
| 4,992,806 | 2/1991 | Peer . |
| 5,134,569 | 7/1992 | Masters . |
| 5,149,548 | 9/1992 | Yamane et al. . |
| 5,198,159 | 3/1993 | Nakamura et al. . |
| 5,282,140 | 1/1994 | Tazawa et al. . |
| 5,313,232 | 5/1994 | Peer . |
| 5,340,656 | 8/1994 | Sachs et al. . |
| 5,398,193 | 3/1995 | deAngelis . |
| 5,510,066 | 4/1996 | Fink et al. . |

FOREIGN PATENT DOCUMENTS

| | | |
|---|---|---|
| 195 07 881 | 9/1995 | (DE) . |
| 388 129 | 9/1990 | (EP) . |
| 426 363 | 5/1991 | (EP) . |
| 590 957 | 4/1994 | (EP) . |
| 655 317 | 10/1994 | (EP) . |
| 666 163 | 8/1995 | (EP) . |
| 63-139729 | 6/1988 | (JP) . |
| 1-61230 | 3/1989 | (JP) . |
| 5-33901 | 5/1993 | (JP) . |
| 89/10801 | 11/1989 | (WO) . |
| 91/12120 | 8/1991 | (WO) . |
| 92/00820 | 1/1992 | (WO) . |
| 95/05935 | 3/1995 | (WO) . |
| 95/05943 | 3/1995 | (WO) . |
| 95/12485 | 5/1995 | (WO) . |

Primary Examiner—James P. Mackey
(74) Attorney, Agent, or Firm—Ralph D'Alessandro

(57) ABSTRACT

A variety of support structures and build styles for use in Rapid Prototyping and Manufacturing systems are described wherein particular emphasis is given to Thermal Stereolithography, Fused Deposition Modeling, and Selective Deposition Modeling systems, and wherein a 3D modeling system is presented which uses multijet dispensing and a single material for both object and support formation.

18 Claims, 27 Drawing Sheets

FIG. 19
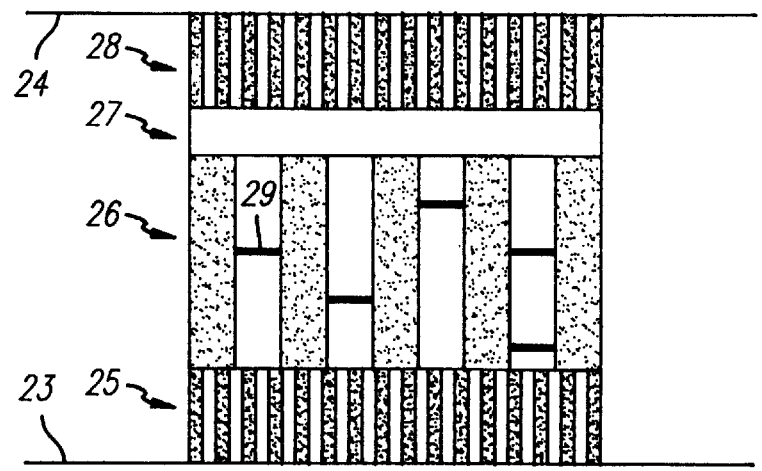
FIG. 20
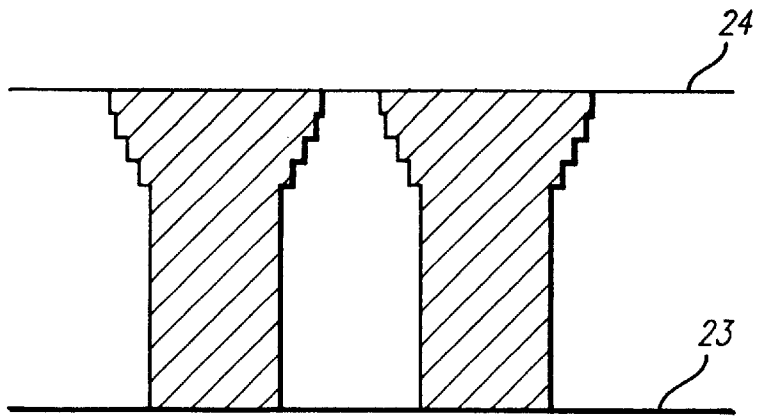
FIG. 21a

SELECTIVE DEPOSITION MODELING METHOD AND APPARATUS FOR FORMING THREE-DIMENSIONAL OBJECTS AND SUPPORTS

This application is a divisional of prior U.S. application Ser. No. 08/722,335, filed Sep. 27, 1996, now abandoned, which is a continuation-in-part of U.S. application Ser. No. 08/534,813, filed Sep. 27, 1995, now abandoned

FIELD OF THE INVENTION

This invention relates to techniques for forming three-dimensional (3D) objects and supporting those objects during formation; more particularly, it relates to techniques for use in Rapid Prototyping and Manufacturing (RP&M) Systems; and most particularly to building and supporting methods and apparatus for use in a Thermal Stereolithography (TSL) system, Fused Deposition Modeling (FDM) system, or other Selective Deposition Modeling (SDM) system.

BACKGROUND INFORMATION

Various approaches to automated or semi-automated three-dimensional object production or Rapid Prototyping & Manufacturing have become available in recent years, characterized in that each proceeds by building up 3D objects from 3D computer data descriptive of the objects in an additive manner from a plurality of formed and adhered laminae. These laminae are sometimes called object cross-sections, layers of structure, object layers, layers of the object, or simply layers (if the context makes it clear that solidified structure of appropriate shape is being referred to). Each lamina represents a cross-section of the three-dimensional object. Typically lamina are formed and adhered to a stack of previously formed and adhered laminae. In some RP&M technologies, techniques have been proposed which deviate from a strict layer-by-layer build up process wherein only a portion of an initial lamina is formed and prior to the formation of the remaining portion(s) of the initial lamina, at least one subsequent lamina is at least partially formed.

According to one such approach, a three-dimensional object is built up by applying successive layers of unsolidified, flowable material to a working surface, and then selectively exposing the layers to synergistic stimulation in desired patterns, causing the layers to selectively harden into object laminae which adhere to previously-formed object laminae. In this approach, material is applied to the working surface both to areas which will not become part of an object lamina, and to areas which will become part of an object lamina. Typical of this approach is Stereolithography (SL), as described in U.S. Pat. No. 4,575,330, to Hull. According to one embodiment of Stereolithography, the synergistic stimulation is radiation from a UV laser, and the material is a photopolymer. Another example of this approach is Selective Laser Sintering (SLS), as described in U.S. Pat. No. 4,863,538, to Deckard, in which the synergistic stimulation is IR radiation from a $CO_2$ laser and the material is a sinterable powder. This first approach may be termed photo-based stereolithography. A third example is Three-Dimensional Printing (3DP) and Direct Shell Production Casting (DSPC), as described in U.S. Pat. Nos. 5,340,656 and 5,204,055, to Sachs, et al., in which the synergistic stimulation is a chemical binder (e.g. an adhesive), and the material is a powder consisting of particles which bind together upon selective application of the chemical binder.

According to a second such approach, an object is formed by successively cutting object cross-sections having desired shapes and sizes out of sheets of material to form object lamina. Typically in practice, the sheets of paper are stacked and adhered to previously cut sheets prior to their being cut, but cutting prior to stacking and adhesion is possible. Typical of this approach is Laminated Object Manufacturing (LOM), as described in U.S. Pat. No. 4,752,352, to Feygin in which the material is paper, and the means for cutting the sheets into the desired shapes and sizes is a $CO_2$ laser. U.S. Pat. No. 5,015,312 to Kinzie also addresses building object with LOM techniques.

According to a third such approach, object laminae are formed by selectively depositing an unsolidified, flowable material onto a working surface in desired patterns in areas which will become part of an object laminae. After or during selective deposition, the selectively deposited material is solidified to form a subsequent object lamina which is adhered to the previously-formed and stacked object laminae. These steps are then repeated to successively build up the object lamina-by-lamina. This object formation technique may be generically called Selective Deposition Modeling (SDM). The main difference between this approach and the first approach is that the material is deposited only in those areas which will become part of an object lamina. Typical of this approach is Fused Deposition Modeling (FDM), as described in U.S. Pat. Nos. 5,121,329 and 5,340,433, to Crump, in which the material is dispensed in a flowable state into an environment which is at a temperature below the flowable temperature of the material, and which then hardens after being allowed to cool. A second example is the technology described in U.S. Pat. No. 5,260,009, to Penn. A third example is Ballistic Particle Manufacturing (BPM), as described in U.S. Pat. Nos. 4,665,492; 5,134,569; and 5,216,616, to Masters, in which particles are directed to specific locations to form object cross-sections. A fourth example is Thermal Stereolithography (TSL) as described in U.S. Pat. No. 5,141,680, to Almquist et. al.

When using SDM (as well as other RP&M building techniques), the appropriateness of various methods and apparatus for production of useful objects depends on a number of factors. As these factors cannot typically be optimized simultaneously, a selection of an appropriate building technique and associated method and apparatus involve trade offs depending on specific needs and circumstances. Some factors to be considered may include 1) equipment cost, 2) operation cost, 3) production speed, 4) object accuracy, 5) object surface finish, 6) material properties of formed objects, 7) anticipated use of objects, 8) availability of secondary processes for obtaining different material properties, 9) ease of use and operator constraints, 10) required or desired operation environment, 11) safety, and 12) post processing time and effort.

In this regard there has been a long existing need to simultaneously optimize as many of these parameters as possible to more effectively build three-dimensional objects. As a first example, there has been a need to enhance object production speed when building objects using the third approach, SDM, as described above (e.g. Thermal Stereolithography) while simultaneously maintaining or reducing the equipment cost. As a second example, there has been a long existing need for a low cost RP&M system useable in an office environment.

In SDM, as well as the other RP&M approaches, typically accurate formation and placement of working surfaces are required so that outward facing cross-sectional regions can be accurately formed and placed. The first two approaches naturally supply working surfaces on which subsequent layers of material can be placed and lamina formed. However, since the third approach, SDM, does not necessarily supply a working surface, it suffers from a particularly acute problem of accurately forming and placing subsequent lamina which contain regions not fully supported by previously dispensed material such as regions including outward facing surfaces of the object in the direction of the previously dispensed material. In the typical building process where subsequent laminae are placed above previously formed laminae this is particularly a problem for down-facing surfaces (down-facing portions of laminae) of the object. This can be understood by considering that the third approach theoretically only deposits material in those areas of the working surface which will become part of the corresponding object lamina. Thus, nothing will be available to provide a working surface for or to support any down-facing surfaces appearing on a subsequent cross-section. Downward facing regions, as well as upward facing and continuing cross-sectional regions, as related to photo-based Stereolithography, but as applicable to other RP&M technologies including SDM, are described in detail in U.S. Pat. Nos. 5,345,391, and 5,321,622, to Hull et. al. and Snead et. al., respectively. The previous lamina is non-existent in down-facing regions and is thus unavailable to perform the desired support function. Similarly, unsolidified material is not available to perform the support function since, by definition, in the third approach, such material is typically not deposited in areas which do not become part of an object cross-section. The problem resulting from this situation may be referred to as the "lack of working surface" problem.

The "lack of working surface" problem is illustrated in FIG. 1, which depicts two laminae, identified with numerals 1 and 2, built using a three-dimensional modeling method and apparatus. As shown, lamina 1, which is situated on top of lamina 2, has two down-facing surfaces, which are shown with cross-hatch and identified with numerals 3 and 4. Employing the SDM approach described above, unsolidified material is never deposited in the volumes directly below the down-facing surfaces, which are identified with numerals 5 and 6. Thus, with the SDM approach, there is nothing to provide a working surface for or to support the two down-facing surfaces.

Several mechanisms have been proposed to address this problem, but heretofore, none has proven completely satisfactory. One such mechanism, suggested or described in U.S. Pat. No. 4,247,508, to Housholder; U.S. Pat. Nos. 4,961,154; 5,031,120; 5,263,130; and 5,386,500, to Pomerantz, et al.; U.S. Pat. No. 5,136,515, to Helinski; U.S. Pat. No. 5,141,680, to Almquist, et al.; U.S. Pat. No. 5,260,009, to Penn; U.S. Pat. No. 5,287,435, to Cohen, et al., U.S. Pat. No. 5,362,427, to Mitchell; U.S. Pat. No. 5,398,193, to Dunghills; U.S. Pat. Nos. 5,286,573 and 5,301,415, to Prinz, et al., involves filling the volumes below down-facing surfaces with a support material different from that used to build the object, and presumably easily separable from it (by means of having a lower melting point, for example). In relation to FIG. 1, for example, the volumes identified with numerals 5 and 6 would be filled with the support material prior to the time that the material used to form down-facing surfaces 3 and 4 is deposited.

A problem with the two material (i.e. building material and different support material) approach is that it is expensive and cumbersome because of the inefficiencies, heat dissipation requirements, and costs associated with handling and delivering the support, or second, material. For example, a separate material handling and dispensing mechanism for the support material may have to be provided. Alternatively, means may have to be provided to coordinate the handling and delivery of both materials through a single system.

Another approach, described in U.S. Pat. No. 4,999,143, to Hull, et al.; U.S. Pat. No. 5,216,616, to Masters; and U.S. Pat. No. 5,386,500, to Pomerantz, et al., is to build generally spaced support structures from the same material as that used to build the object. A multitude of problems have occurred with this approach. A first problem has involved the inability to make support structures of arbitrary height while simultaneously ensuring that they were easily separately from the object. Second, a problem has been encountered regarding the inability to achieve easy separability between object and support structure while simultaneously maintaining an effective working surface for the building of and support of the outward facing surfaces. A third problem involves the inability to accumulate support structure in the direction perpendicular to the planes of the cross-sections (e.g. vertical direction) at approximately the same rate as that at which the object accumulates. A fourth problem has involved the inability to ensure easy separability and minimal damage to up-facing surfaces when supports must be placed thereon in order to support down-facing surfaces thereabove which are part of subsequent layers. A fifth issue has involved the desire to increase system throughput.

To illustrate, the objective of achieving easy separability dictates that the surface area over which each support contacts the object be kept as small as possible. On the other hand, the objective of accumulating a support in the Z-direction at a rate approximating that of object accumulation dictates that the cross-sectional area of each support be as large as possible to provide a large area to perimeter ratio thereby minimizing loss of material for build up in the Z-direction due to run off, spreading, mis-targeting and the like by allowing a large target area to compensate for any inaccuracies in the deposition process and to limit the ability of material to spread horizontally instead of building up vertically.

Further, the objective of achieving minimal damage to the down-facing surface dictates that the spacing between the supports be kept as large as possible in order to minimize the area of contact between the supports and the object. On the other hand, the objective of providing an effective working surface for the building of the down-facing surface dictates that the spacing be kept as small as possible. As is apparent, there is a conflict in simultaneously achieving these objectives.

This problem is illustrated in FIG. 2, in which, compared to FIG. 1, like elements are referenced with like numerals. As shown, down-facing surface 3 is supported through columnar supports 7a, 7b, and 7c, while down-facing surface 4 is supported through columnar supports 8a, 8b, 8c, and 8d. Columnar supports 7a, 7b, and 7c are widely spaced from one another in order to minimize damage to down-facing surface 3. Moreover, they are each configured to contact the down-facing surface over a relatively small surface area to enhance separability. On the other hand, because of their small cross-sectional surface area, they may not be able to accumulate, in the vertical direction, fast enough to keep up with the rate of growth of the object. Moreover, because of their wide spacing, they may not be able to provide an effective working surface for the building of and support of down-facing surface 3.

Columnar supports 8a, 8b, 8c, and 8d, by contrast, are more closely spaced together in order to provide a more effective working surface for the building and support of down-facing surface 4. Also, each is configured with a larger surface area to enable them to grow at rate approximating that of the object. Unfortunately, because of their closer spacing and larger cross-sectional area, these supports will cause more damage to the down-facing surface when they are removed.

All patents referred to herein above in this section of the specification are hereby incorporated by reference as if set forth in full.

ATTACHED APPENDICES AND RELATED PATENTS AND APPLICATIONS

Appendix A is attached hereto and provides details of preferred Thermal Stereolithography materials for use in the some preferred embodiments of the invention.

The following applications are hereby incorporated herein by reference as if set forth in full herein:

| Filing Date | Application No. | Title | Status |
|---|---|---|---|
| 9/27/95 | 08/535,772 | Selective Deposition Modeling Materials and Method | Abandoned |
| 9/27/95 | 08/534,477 | Selective Deposition Modeling Method and System | Abandoned |

The assignee of the subject application, 3D Systems, Inc., is filing this application concurrently with the following related application, which is incorporated by reference herein as though set forth in full:

| Docket No. | Filing Date | Application No. | Title | Status |
|---|---|---|---|---|
| 08/722,326 | 9/27/96 | 08/722,326 | Method and Apparatus for Data Manipulation and System Control in a Selective Deposition Modeling System | 5,943,235 |

According to Thermal Stereolithography and some Fused Deposition Modeling techniques, a three-dimensional object is built up layer by layer from a material which is heated until it is flowable, and which is then dispensed with a dispenser. The material may be dispensed as a semi-continuous flow of material from the dispenser or it may alternatively be dispensed as individual droplets. In the case where the material is dispensed as a semi-continuous flow, it is conceivable that less stringent working surface criteria may be acceptable. An early embodiment of Thermal Stereolithography is described in U.S. Pat. No. 5,141,680. Thermal Stereolithography is particularly suitable for use in an office environment because of its ability to use non-reactive, non-toxic materials. Moreover, the process of forming objects using these materials need not involve the use of radiations (e.g. UV radiation, IR radiation, visible light and/or other forms of laser radiation), heating materials to combustible temperatures (e.g. burning the material along cross-section boundaries as in some LOM techniques), reactive chemicals (e.g. monomers, photopolymers) or toxic chemicals (e.g. solvents), complicated cutting machinery, and the like, which can be noisy or pose a significant risks if mishandled. Instead, object formation is achieved by heating the material to a flowable temperature then selectively dispensing the material and allowing it to cool.

U.S. patent application Ser. No. 08/534,447, now abandoned, referenced above, is directed to data transformation techniques for use in converting 3D object data into support and object data for use in a preferred Selective Deposition Modeling (SDM) system based on SDM/TSL principles. This referenced application is also directed to various data handling, data control, and system control techniques for controlling the preferred SDM/TSL system described hereinafter. Some alternative data manipulation techniques and control techniques are also described for use in SDM systems as well as for use in other RP&M systems.

U.S. patent application Ser. No. 08/535,772, now abandoned, as referenced above, is directed to the preferred material used by the preferred SDM/TSL system described herein. Some alternative materials and methods are also described.

U.S. patent application Ser. No. 08/534,477, now abandoned, as referenced above, is directed to some particulars of the preferred SDM/TSL system. Some alternative configurations are also addressed.

The assignee of the instant application, 3D Systems, Inc., is also the owner of a number of other U.S. patent applications and U.S. patents in RP&M field and particularly in the photo-based Stereolithography portion of that field. These patents include disclosures which can be combined with the teachings of the instant application to provide enhanced SDM object formation techniques. The following commonly owned U.S. patent applications and U.S. patents are hereby incorporated by reference as if set forth in full herein:

| App No. Filing Date | Topic | Status and/or Patent No. |
|---|---|---|
| 08/484,582 Jun 7, 1995 | Fundamental elements of Stereolithography are taught. | 5,573,722 |
| 08/475,715 Jun 7, 1995 | Various recoating techniques for use in SL are described including a material dispenser that allows for selective deposition from a plurality of orifices. | 5,667,820 |
| 08/479,875 Jun 7, 1995 | Various LOM type building techniques are described. | 5,637,169 |
| 08/486,098 Jun 7, 1995 | A description of curl distortion is provided along with various techniques for reducing this distortion. | Abandoned |
| 08/475,730 Jun 7, 1995 | A description of a 3D data slicing technique for obtaining cross-sectional data is described which utilizes Boolean layer comparisons to define down-facing, up-facing and continuing regions. Techniques for performing cure-width compensation and for producing various object configurations relative to an initial CAD design are also described. | 5,854,748 |
| 08/480,670 Jun 7, 1995 | A description of an early SL Slicing technique is described including vector generation and cure width compensation. | 5,870,307 |
| 08/428,950 Apr 25, 1995 | Various building techniques for use in SL are described including various build styles involving alternate sequencing, vector interlacing and vector offsetting for forming semi-solid and solid objects. | Abandoned |
| 08/428,951 Apr 25, 1995 | Simultaneously Multiple Layer Curing techniques for SL are taught including techniques for performing vertical comparisons, correcting errors due to over curing in the z-direction, techniques for performing horizontal comparisons, and horizontal erosion routines. | 5,999,184 |
| 08/405,812 Mar 16, 1995 | SL recoating techniques using vibrational energy are described. | 5,688,464 |
| 08/402,553 Mar 13, 1995 | SL recoating techniques using a doctor blade and liquid level control techniques are described. | 5,651,934 |

-continued

| App No. Filing Date | Topic | Status and/or Patent No. |
|---|---|---|
| 08/382,268 Feb 1, 1995 | Several SL recoating techniques are described including techniques involving the use of ink jets to selectively dispense material for forming a next layer of unsolidified material. | Abandoned |
| 08/148,544 Nov 8, 1993 | Fundamental elements of thermal stereo-lithography are described. | 5,501,824 |
| 07/182,801 Apr 18, 1988 | Support structures for SL are described. | 4,999,143 |
| 07/183,015 Apr 18, 1988 | Placement of holes in objects for reducing stress are described. | 5,015,424 |
| 07/365,444 Jun 12, 1989 | Integrated SL building, cleaning and post curing techniques are described. | 5,143,663 |
| 07/824,819 Jan 22, 1992 | Various aspects of a large SL apparatus are described. | 5,182,715 |
| 07/605,979 Oct 30, 1990 | Techniques for enhancing surface finish of SL objects are described including the use of thin fill layers in combination with thicker structural layers and meniscus smoothing. | 5,209,878 |
| 07/929,463 Aug 13, 1991 | Powder coating techniques are described for enhancing surface finish. | 5,234,636 |
| 07/939,549 Aug 31, 1992 | Building techniques for reducing curl distortion in SL (by balancing regions of stress and shrinkage) are described. | 5,238,639 |

SUMMARY OF THE INVENTION

The instant invention embodies a number of techniques (methods and apparatus) that can be used alone or in combination to address a number of problems associated with building and supporting objects formed using Selective Deposition Modeling techniques. Though primarily directed to SDM techniques, the techniques described hereinafter can be applied in a variety of ways (as will be apparent to one of skill in the art who reads the instant disclosure) to the other RP&M technologies as described above to enhance object accuracy, surface finish, build time and/or post processing effort and time. Furthermore, the techniques described herein can be applied to Selective Deposition Modeling systems that use one or more building and/or support materials wherein one or more are selectively dispensed and in which others may be dispensed non-selectively and wherein elevated temperatures may or may not be used for all or part of the materials to aid in their deposition.

The techniques can be applied to SDM systems wherein the building material (e.g. paint or ink) is made flowable for dispensing purposes by adding a solvent (e.g. water, alcohol, acetone, paint thinner, or other solvents appropriate for specific building, wherein the material is solidifiable after or during dispensing by causing the removal of the solvent (e.g. by heating the dispensed material, by dispensing the material into a partially evacuated (i.e. vacuumed) building chamber, or by simply allowing sufficient time for the solvent to evaporate). Alternatively, or additionally, the building material (e.g. paint) may be thixotropic in nature wherein an increase in shear force on the material could be used to aid in its dispensing or the thixotropic property may simply be used to aid the material in holding its shape after being dispensed. Alternatively, and/or additionally, the material may be reactive in nature (e.g. a photopolymer, thermal polymer, one or two-part epoxy material, a combination material such as one of the mentioned materials in combination with a wax or thermal plastic material) or at least solidifiable when combined with another material (e.g. plaster of paris & water), wherein after dispensing, the material is reacted by appropriate application of prescribed stimulation (e.g. heat, EM radiation [visible, IR, UV, x-rays, etc.], a reactive chemical, the second part of a two part epoxy, the second or multiple part of a combination) such that the building material and/or combination of materials become solidified. Of course, Thermal Stereolithographic materials and dispensing techniques may be used alone or in combination with the above alternatives. Furthermore, various dispensing techniques may be used such as dispensing by single or multiple ink jet devices including, but not limited to, hot melt ink jets, bubble jets, etc., and continuous or semi-continuous flow, single or multiple orifice extrusion nozzles or heads.

Accordingly it is a first object of the invention to provide a method and apparatus for higher accuracy production of objects.

A second object of the invention is to provide a method and apparatus for production of objects with less distortion by controlling the thermal environment during object formation.

A third object of the invention is to provide a method and apparatus for production of objects with less distortion by controlling how material is dispensed.

A fourth object of the invention is to provide a method and apparatus for enhancing object production speed.

A fifth object of the invention is to provide a support structure method and apparatus that allows object supports of arbitrary height to be formed.

A sixth object of the invention is to provide a support structure method and apparatus that provides a good working surface.

A seventh object of the invention is to provide a method and apparatus that forms a support structure that is easily removed from down-facing surfaces of the object.

An eighth object of the invention is to provide a support structure method and apparatus that results in minimum damage to down-facing surfaces of the object upon removal thereof.

A ninth object of the invention is to provide a method and apparatus for removing the supports from the object.

A tenth object of the invention is to provide a support structure method and apparatus that builds up supports vertically at a rate approximating the vertical build up rate of the object.

An eleventh object of the invention is to provide a method and apparatus that forms a support structure that is easily removed from up-facing surfaces of the object.

A twelfth object of the invention is to provide a support structure method and apparatus that results in minimum damage to up-facing surfaces of the object upon removal thereof.

A thirteenth object of the invention is to provide a method and apparatus for producing supports that are separated from vertical object surfaces.

A fourteenth object is to provide support structures that are combinable with other RP&M technologies for enhanced object formation.

It is intended that the above objects can be achieved separately by different aspects of the invention and that additional objects of the invention will involve various combinations of the above independent objects such that combined benefits may be obtained from combined techniques.

Other objects of the invention will be apparent from the description herein.

BRIEF DESCRIPTION OF THE DRAWINGS

FIG. 19 illustrates an alternative pixel pattern for column supports;

FIG. 20 illustrates a Hybrid support structure;

FIGS. 21a and 21b illustrate arch-type supports;

FIGS. 32a–31d depict a top view of branching layers for another embodiment of branching supports

DESCRIPTION OF THE PREFERRED EMBODIMENTS

As previously discussed, the subject application is directed to support techniques and building techniques appropriate for use in a Selective Deposition Modeling (SDM) system. In particular, the preferred SDM system is a Thermal Stereolithography (TSL) system. The Description Of The Preferred Embodiments will begin with a description of the preferred TSL system. A more detailed description of the preferred system, data manipulation techniques, system control techniques, material formulations and properties, and various alternatives are described in previously referenced and incorporated U.S. patent application Ser. Nos. 08/534,813; 08/534,447, now abandoned; Ser. Nos. 08/535,772; and 08/534,477, now abandoned; and U.S. Pat. No. 5,943,235, filed concurrently herewith. Further, alternative systems are discussed in a number of the previously incorporated applications and patents, especially those referenced as being directly related to, or applicable to, SDM, TSL or Fused Deposition Modeling (FDM). As such, the support structures and build styles described hereinafter should be construed as applicable to a variety of SDM, TSL and FDM systems and not limited by the system examples described herein. Furthermore, as noted previously, these support structures and build styles have utility in the other RP&M technologies.

Figure 1:
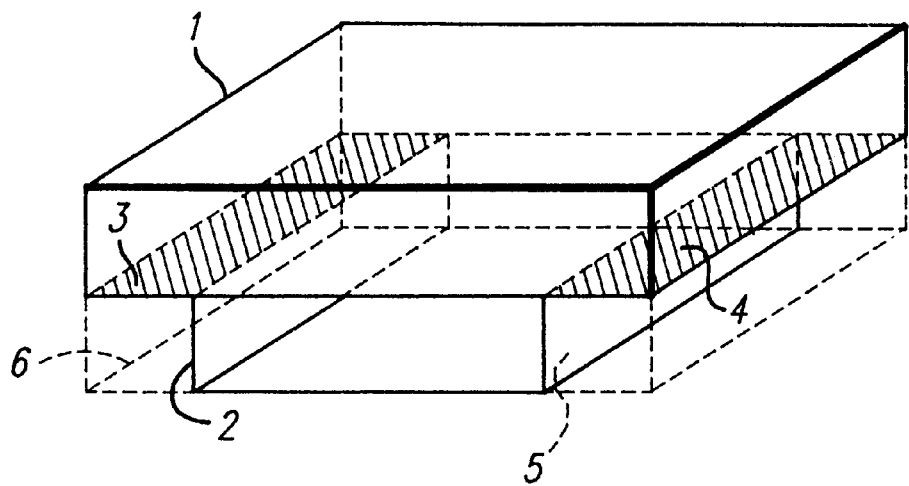
FIG. 1 illustrates down-facing surfaces of an object.
Figure 2:
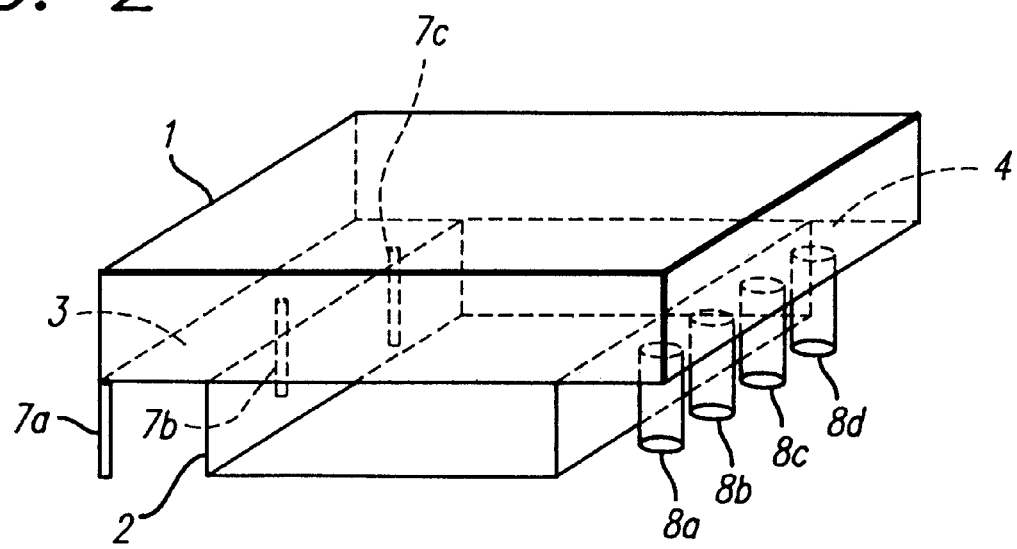
FIG. 2 illustrates two categories of support structures for supporting the down-facing surfaces of FIG. 1.
Figure 3:
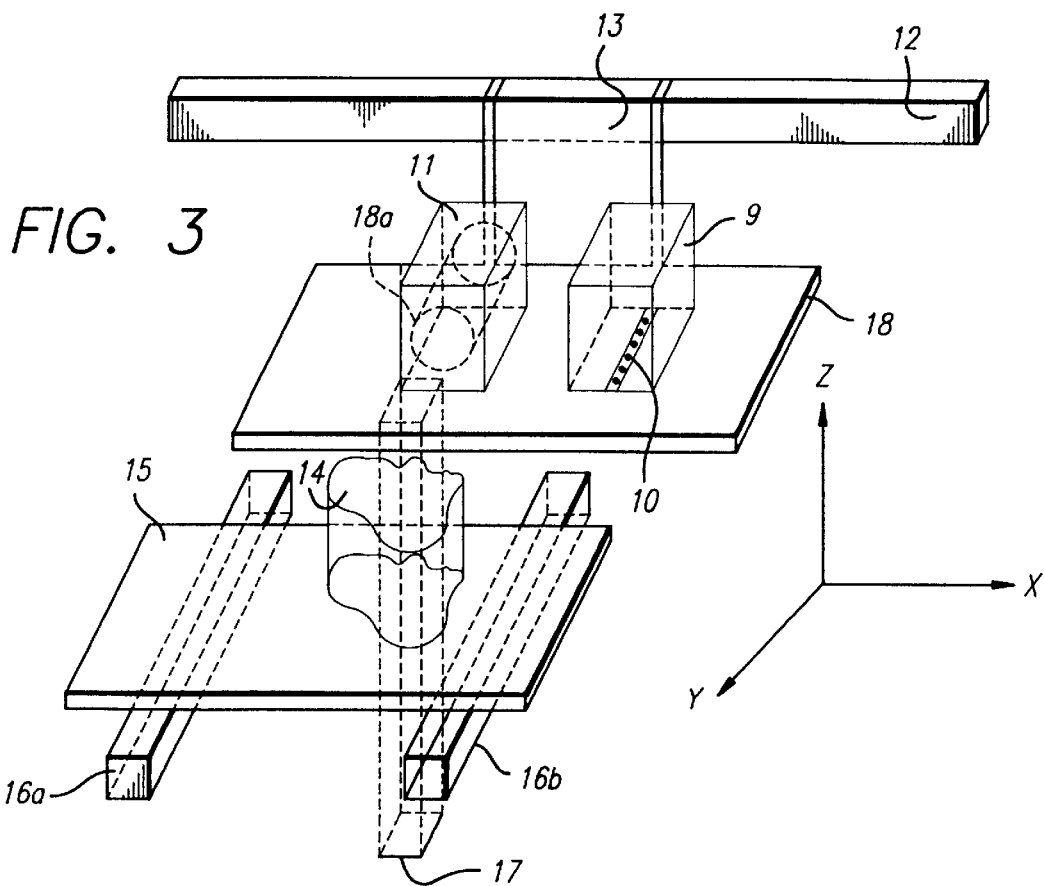
FIG. 3 is a diagram of the main functional components of the preferred Selective Deposition Modeling/Thermal Stereolithography system.

A preferred embodiment of an apparatus for performing SDM/TSL is illustrated in FIG. 3. The apparatus comprises a dispensing platform 18, a dispensing head 9 (e.g. multi orifice ink jet head), wherein the dispensing head 9 is located on the dispensing platform 18, a planarizer 11 and a part-building platform, 15. The dispensing platform 18 is a horizontal member which is capable of supporting the planarizer 11 and the dispensing head 9. The dispensing platform 18 is slidably coupled to an X-stage 12 through a coupling member 13. The X-stage 12 is preferably controlled by a control computer or microprocessor (not shown) and controllably moves the dispensing platform 18 back and forth in the X-direction, or the main scanning direction.

Furthermore, at either side of the platform 18, fans (not shown) are mounted for blowing air vertically downward to help cool the dispensed material 14 and part-building platform 15 such that the desired building temperature is maintained. Other suitable mounting schemes for the fans and/or other cooling systems include, but are not limited to, misting devices for directing vaporizable liquids (e.g. water, alcohol, or solvents) onto the surface of the object, forced air cooling devices with fans mounted between the planarizer 11 and the dispensing head 9, and forced air cooling devices with stationary or moving fans mounted off the dispensing platform. Cooling systems may include active or passive techniques for removing heat which may be computer controlled in combination with temperature sensing devices to maintain the previously dispensed material within the desired building temperature range. Other approaches to cooling include, but are not limited to, salting the material with a substance which functions as a black body radiator, especially at IR frequencies, such that heat is more readily radiated from the object during the building process. Further alternative approaches include, but are not limited to, adding a conductive substance to the material every few layers, adding a solvent to the material, building parts with cooling passages or with an embedded substrate (such as interlaced wires) for cooling, or building on a glass plate or Mylar® sheet.

Other embodiments for cooling the material or at least maintaining the dispensed material at an appropriate temperature, might involve the use of directing a temperature moderating gas (e.g. a cooling gas such as air) at the upper surface of the partially formed object, as discussed above, but they may additionally include controlled techniques for removing the cooling air from the surface. Such techniques might involve the use of blowing and sucking devices and alternate positioning of blowing ducts (gas inserting ducts) and sucking ducts (gas removing ducts). These ducts may allow the cooling gas to be removed before excessive heating of the gas causes a loss in effective cooling rate. The gas directed at the surface may be introduced in a cooled state, introduced at room temperature, or introduced at some other appropriate temperature. If appropriately configured, these alternate inserting and removing ducts may allow faster scanning speed than presently allowable due to turbulence or wind distortion of fragile structures such as supports. These ducts might be configured to provide air flow in the opposite direction to print head movement thereby reducing the net wind velocity coming into contact with the partially formed object. The blowing or sucking associated with individual ducts may be reversed, turned on, or turned off depending on the direction of movement of the print head.

The print head 9 is a commercial print head configured for jetting hot melt inks such as, for example, thermal plastics or wax-like materials, and modified for use in a three-dimensional modeling system, wherein the print head undergoes back and forth movements and accelerations. The print head modifications include configuring any on board reservoir such that the accelerations result in minimal misplacement of material in the reservoir. One preferred embodiment includes a 96 jet commercial print head, Model No. HDS 96i, sold by Spectra Corporation, Nashua, Hew Hampshire including reservoir modifications. The print head is supplied material in a flowable state from a Material Packaging & Handling Subsystem (not shown), which is described in the previously referenced U.S. patent application Ser. No. 08/534,477, now abandoned. In the preferred embodiment, all 96 jets on the head are computer controlled to selectively fire droplets through orifice plate 10 when each orifice (i.e. jet) is appropriately located to dispense droplets onto desired locations. In practice, approximately 12,000 to 16,000 commands per second have been sent to each jet selectively commanding each one to fire (dispense a droplet) or not to fire (not to dispense a droplet) depending on jet position and desired locations for material deposition. Also, in practice, firing commands have been sent simultaneously to all jets. Since, the preferred print head mentioned above contains almost 100 jets, the above noted firing rates result in the need to send approximately 1.2 to 1.6 million firing commands to the head each second. Thus, the head is computer controlled so as to selectively fire the jets and cause them to simultaneously emit droplets of the molten material through one or more orifices in orifice plate 10. Of course, it will be appreciated that in alternative preferred embodiments, heads with different numbers of jets can be used, different firing frequencies are possible, and in appropriate circumstances non-simultaneous firing of the jets is possible.

To most effectively build a three-dimensional object, it is desired that all of the jets fire correctly. To ensure that all jets are firing correctly or at least maximize the number which are firing correctly, various techniques can be used. One such embodiment involves checking the jets after formation of each lamina. This technique includes the steps of: 1) forming a lamina; 2) checking the jets by printing a test pattern of lines on a piece of paper, with all jets firing; 3) optically detecting (through bar code scanning or the like) whether a jet is misfiring; 4) unclogging the jet; 5) removing the entirety of the just-dispensed layer (e.g. by machining using a preferred planarizer to be described herein after); and 6) rebuilding the layer with all jets including the unclogged jet.

A second embodiment involves the following preferred steps: 1) forming a layer; 2) optically detecting a misfiring jet; 3) rescanning the lines on the layer that should have been formed by the misfiring jet; 4) ceasing the use of the misfiring jet in the remainder of the building process; and 5) scanning subsequent layers while compensating for the misfiring jet (i.e., make extra passes with a working jet to cover the lines corresponding to the misfiring jet). Optionally, the misfiring jet may be periodically checked to see if it has started functioning again. If so, this jet is put back into operation. Another option involves putting a misfiring jet through a reactivation routine to see if it can be made operational. This could occur during the building process or during servicing of the system. As a further alternative, it may be possible to determine whether or not a jet is firing correctly by tracking the electrical characteristics of the piezo electric element as firing is to occur.

A third embodiment might involve the use of a flexible element for wiping excess material from the bottom of the print head. This embodiment involves the firing of all the jets followed by a wiping of the orifice plate with a heated rubber (e.g. VITON) blade. Preferably the blade is positioned such that it contacts the orifice plate as they are relatively moved passed each other thereby causing a squeegee action to remove excess material from the orifice plate and hopefully revitalizing any jets which were not behaving properly. It is further preferred that the orifice plate and blade be positioned at an angle to each other such that at any one time during their contact only a portion of the orifice plate is in contact with the squeegee thereby minimizing the force the blade exerts on the orifice plate.

Figure 4A:
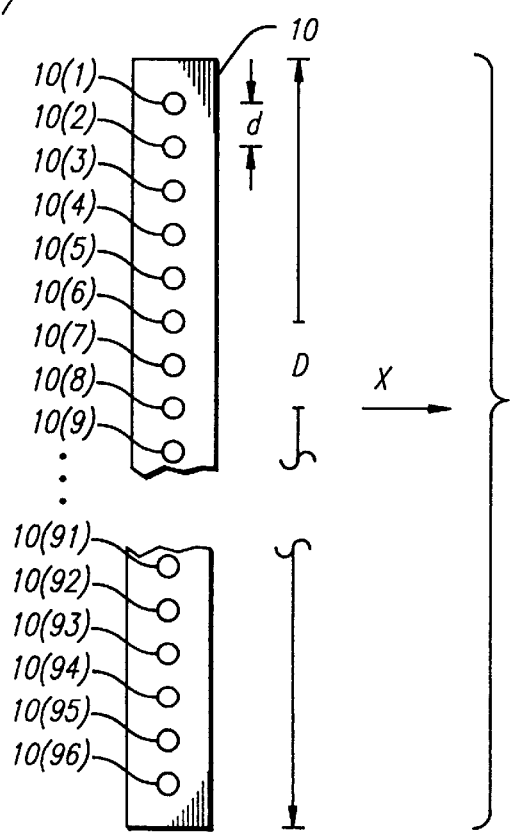
FIGS. 4a and 4b illustrate the orifice plate of the print head of FIG. 3 at different orientations to the scanning direction.
Figure 4B:
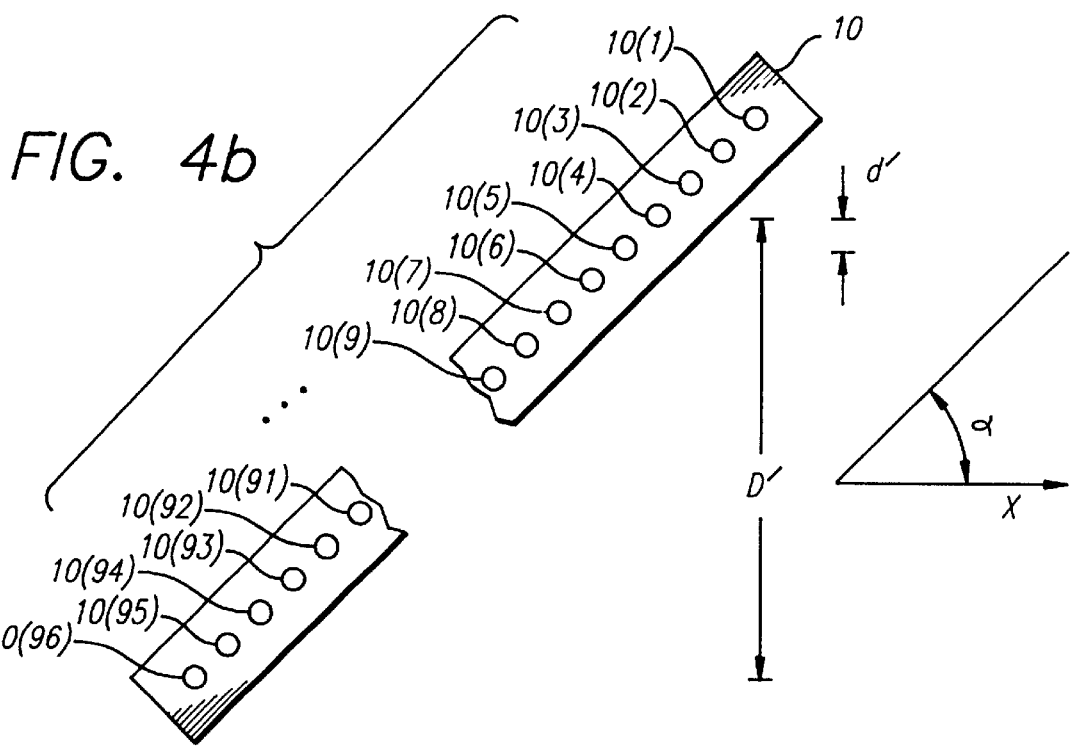

The orifice plate 10 is mounted on the dispensing platform 18 such that droplets of material are allowed to emit from the underside of the dispensing platform 18. The orifice plate 10 is illustrated in FIGS. 4a and 4b. In one preferred embodiment, and as depicted in FIG. 4a, the orifice plate 10 (i.e. the line of orifices) is mounted approximately perpendicular to the main scanning direction (X-direction) and is configured with N=96 individually controllable orifices (labeled 10(1), 10(2), 10(3) . . . 10(96)). Each orifice is equipped with a piezoelectric element that causes a pressure wave to propagate through the material when an electric firing pulse is applied to the element. The pressure wave causes a drop of material to be emitted from the orifice. The 96 orifices are controlled by the control computer which controls the rate and timing of the firing pulses applied to the individual orifices. With reference to FIG. 4a, the distance "d" between adjacent orifices in the preferred embodiment is about $8/300$ of an inch (about 26.67 mils or 0.677 mm). Thus, with 96 orifices, the effective length "D" of the orifice plate is about (N×$8/300$ inch)=(96×$8/300$ inches)=2.56 inches (65.02 mm).

To accurately build an object, the print head must fire such that the droplets reach particular "desired drop locations", i.e., locations that the droplet is intended to land. The desired drop locations are determined from a data map, or pixel locations, which describes the object as a series of relatively spaced location points. For the droplets to land at the desired drop locations, the print head must fire the droplets from a "desired firing location" or at a "desired firing time" which is based on the relative position of the print head to the desired drop location, the velocity of the print head, and the ballistic characteristics of the particles after being ejected.

In a preferred embodiment raster scanning is used to position the print head 9 and orifices at desired firing locations. The printing process -for each lamina is accomplished by a series of relative movements between the head 9 and the desired drop or firing locations. Printing typically occurs as the head 9 relatively moves in a main scanning direction. This is followed by a typically smaller increment of movement in a secondary scanning direction while no dispensing occurs, which in turn is followed by a reverse scan in the main scanning direction in which dispensing again occurs. The process of alternating main scans and secondary scans occurs repeatedly until the lamina is completely deposited.

Alternative preferred embodiments may perform small secondary scanning movements while main scanning occurs. Because of the typically large difference in net scanning speed along the main and secondary directions such an alternative still results in deposition along scanning lines which are nearly parallel to the main scanning direction and perpendicular to the secondary scanning direction. Further alternative preferred embodiments may utilize vector scanning techniques or a combination of vector scanning and raster scanning techniques.

It has been found that droplets, immediately after being dispensed from the jet orifice, have an elongated shape, compared to their width. The ratio of droplet length to width can be defined as the aspect ratio of the droplet. It has further been found that the aspect ratio of these droplets becomes smaller as the droplets travel away from the jet orifice (i.e. they become more spherical in shape).

It should be appreciated that in some embodiments the spacing between the orifice plate 10 and the working surface is preferably large enough such that the drops emitted therefrom have become semi-circular in shape when they impact the working surface. On the other hand, it should also be appreciated that this spacing, which determines the distance the droplets must travel during the printing process before impact, should be minimized in order to avoid accuracy problems which may occur as the travel time is increased. In practice, it has been found that these two conditions are both satisfactorily met when at least 90% of the droplets emitted from the orifice plate have achieved an aspect ratio (i.e., the ratio formed by the width of the droplet divided by its length) which is preferably less than about 1.3, more preferably less than about 1.2, and most preferably, which is between about 1.05 and 1.1.

In alternative preferred embodiments, the print head 9 may be mounted at a non-perpendicular angle to the main scanning direction. This situation is depicted in FIG. 4b wherein the print head 9 is mounted at an angle "a" to the main scanning direction (e.g., the "X" direction). In this alternative situation the separation between the orifices is reduced from d to d'=(d×sin α) and the effective length of the print head 9 is reduced to D'=(D×sin α). When the spacing d' is equal to the desired print resolution in the secondary scanning direction (direction approximately perpendicular to the main scanning direction), the angle a is considered to be the "saber angle".

If the spacing d or d' is not at the desired secondary print resolution (i.e. the print head is not at the saber angle) then for optimal efficiency in printing a layer, the desired resolution must be selected such as to make d or d' an integer multiple of the desired resolution. Similarly, when printing with α≠90°, a spacing between jets exists in the main scanning direction as well as the secondary scanning direction. This spacing is defined by d"=d×cos α. This in turn dictates that optimization of printing efficiency will occur when the desired main direction print resolution is selected to be an integral divisor of d" (this assumes that firing locations are located in a rectangular grid). Another way of expressing this is that the angle a is selected such that d' and/or d" when divided by appropriate integers M and P yield the desired secondary and main scanning resolutions. An advantage to using the preferred print head orientation (α=90°) is that it allows any desired printing resolution in the main scanning direction while still maintaining optimal efficiency.

In other preferred embodiments, multiple heads may be used which lay end to end (extend in the secondary scanning direction) and/or which are stacked back to back (stacked in the main scanning direction). When stacked back to back, the print heads may have orifices aligned in the main scanning direction so that they print over the same lines or alternatively they may be offset from one another so as to dispense material along different main scanning lines. In particular, it may be desirable to have the back to back print heads offset from each other in the secondary scanning direction by the desired raster line spacing to minimize the number of main scanning passes that must occur. In other preferred embodiments, the data defining deposition locations may not be located by pixels configured in a rectangular grid but instead may be located by pixels configured in some other pattern (e.g. offset or staggered pattern). More particularly, the deposition locations may be fully or partially varied from layer to layer in order to perform partial pixel drop location offsetting for an entire layer or for a portion of a layer based on the particulars of a region to be jetted.

Presently preferred printing techniques involve deposition resolutions of 300, 600 and 1200 drops per inch in the main scanning direction and 300 drops per inch in the secondary scanning direction.

Figure 5:
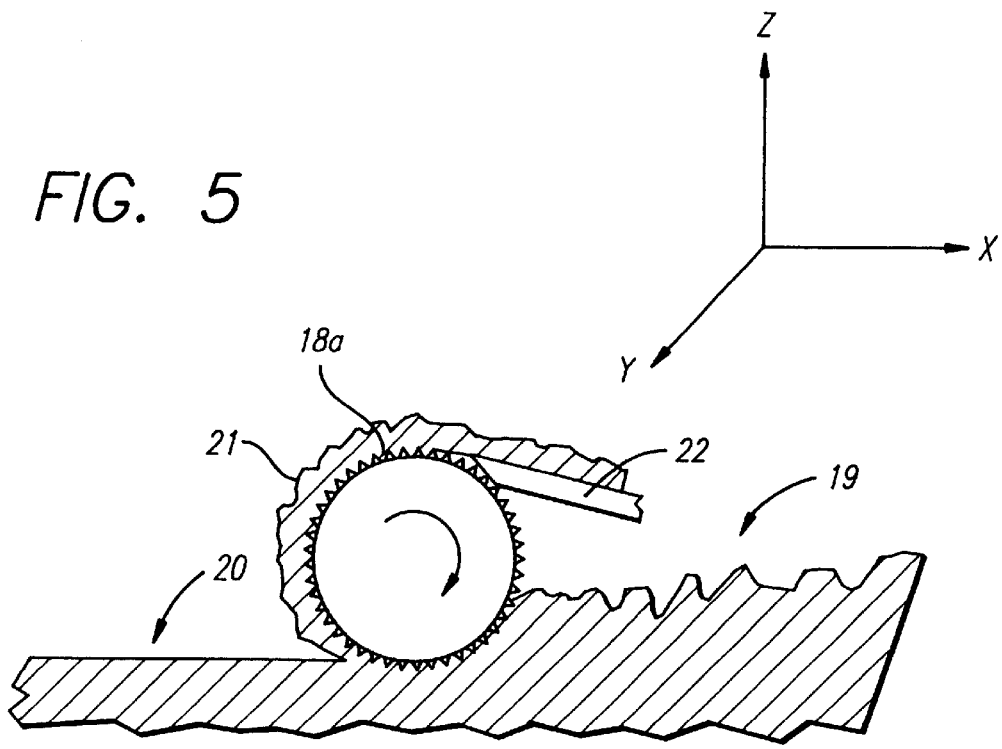
FIG. 5 is a more detailed drawing of the planarizer of FIG. 3.

With reference to FIGS. 3 and 5, the planarizer 11 includes a heated rotating (e.g. 2000 rpm) cylinder 18a with a textured (e.g. knurled) surface. Its function is to melt, transfer and remove portions of the previously dispensed layer or lamina of material in order to smooth it out, to set a desired thickness for the last formed layer, and to set the net upper surface of the last formed layer to a desired level. Numeral 19 identifies a layer of material which was just deposited by the print head. The rotating cylinder 18a is mounted in the dispensing platform such that it is allowed to project from the underside of the platform by a sufficient amount in the Z-direction such that it contacts material 19 at a desired level. More importantly the rotating cylinder 18a is mounted so as to project a desired distance below the plane swept out by the underside of the print head or orifice plate. In the event that the orifice plate itself projects below the dispensing platform 18, the rotating cylinder 18a will project further below the dispensing platform 18. In one preferred embodiment, the projection below the orifice plate in the z-direction is in the range of 0.5 mm to 1.0 mm. The extent to which the roller extends below the dispensing platform 18 is a determinant of the spacing between the orifice plate 10 and the working surface. Thus, in some preferred embodiments it is preferred that the extent to which the planarizer 11 extends below the orifice plate 10 not conflict with the condition described earlier in relation to droplet aspect ratio, in which 90% of the droplets have achieved an aspect ratio upon impact preferably less than about 1.3, more preferably less than about 1.2, and most preferably between about 1.05–1.1.

The rotation of the cylinder sweeps material from the just-deposited layer, identified in the figure with numeral 21, leaving in its wake smooth surface 20. The material 21 adheres to the knurled surface of the cylinder and is displaced until it contacts wiper 22. As shown, wiper 22 is disposed to effectively "scrape" the material 21 from the surface of the cylinder. The wiper is preferably made of VITON, although other materials, such as TEFLON®, are capable of scraping the material from the surface of the cylinder are also suitable. Preferably the scrapper material is non-wetting with respect to the liquefied building material and is durable enough to contact the rotating cylinder 18a without wearing out too quickly. The removed material is drawn away under suction via a heated umbilical to a waste tank (not shown), where it is either disposed of or recycled. The planarizer waste tank is held constantly under vacuum in order to continuously remove material from the planarizer cylinder. When the tank becomes full the system automatically reverses the vacuum for a few seconds to purge the waste material out of a check valve into a larger waste tray. Once empty, vacuum is restored and waste continues to be drawn from the planarizer. In practice, it has been observed that approximately 10–15% of the material dispensed is removed by the planarizer. Though most preferred embodiments use a combination of rotating, melting and scraping to perform planarization, it is believed that other embodiments might utilize any one of these three elements or any combination of two of them.

In present implementations, the cylinder 18a rotates (e.g. at approximately 2000 rpm) in a single direction as the head moves back in forth in each direction. In alternative embodiments, the cylinder 18a can be made to rotate in opposite directions based on the forward or reverse direction that platform 18 sweeps while moving in the main scanning direction. Some embodiments might involve the axis of rotation of cylinder 18a being off axis relative to the axis of orientation of the print head. In other embodiments more than one cylinder 18a may be used. For example, if two cylinders were used, each one may be caused to rotate in different directions and may further be vertically positionable so as to allow a selected one to participate in planarization during any given sweep.

When using a single print head 10 and cylinder 18a, planarization only effectively occurs on every second pass of the print head though deposition occurs on each pass (i.e. planarization always occurs in the same direction). Under these conditions, planarization occurs when the sweeping direction points along the same direction as an arrow pointing from the cylinder to the print head. In other words planarization occurs when the sweeping direction is such that the cylinder follows the print head as the elements traverse the layer in the main scanning direction.

Other preferred embodiments might use a single cylinder, but use one or more print heads located on either side of the cylinder, such that planarization effectively occurs when sweeping in both directions. Other alternative embodiments might decouple the movement of the print head(s) and the planarizing cylinder. This decoupling might allow independent planarization and dispensing activity. Such decoupling might involve the directions of print head sweeping (e.g. X-direction) and cylinder sweeping (e.g. Y-direction) being different. Such decoupling might also allow multiple layers to be formed or lines of a single layer to be deposited between planarization steps.

With reference to FIG. 3, part-building platform 15 is also provided. The three-dimensional object or part, identified in the figure with reference numeral 14, is built on the platform 15. The platform 15 is slidably coupled to Y-stage 16a and 16b which controllably moves the platform back and forth in the Y-direction (i.e., index direction or secondary scanning direction) under computer control. The platform 15 is also coupled to 7-stage 17 which controllably moves the platform up and down (typically progressively downward during the build process) in the Z-direction under computer control.

To build a cross-section, lamina, or layer of a part, the Z-stage is directed to move the part-building platform 15 relative to the print head 9 such that the last-built cross-section of the part 14 is situated an appropriate amount below the orifice plate 10 of the print head 9. The print head 9 in combination with the Y-stage 16a, 16b is then caused to sweep one or more times over the XY build region (the head sweeps back and forth in the X direction, while the Y-stage 16a, 16b translates the partially formed object in the Y-direction). The combination of the last formed cross-section, lamina, or layer of the object and any supports associated therewith define the working surface for deposition of the next lamina and any supports associated therewith. During translation in the XY directions, the jet orifices of the print head 9 are fired in a registered manner with respect to previously dispensed layers to deposit material in a desired pattern and sequence for the building of the next lamina of the object. During the dispensing process a portion of the dispensed material is removed by the planarizer 11 in the manner discussed above. The X, Y and Z movements, dispensing, and planarizing are repeated to build up the object from a plurality of selectively dispensed and adhered layers. Moreover, platform 15 can be indexed in either the Y- or Z- direction while the direction of the dispensing platform 18 is in the process of being reversed upon the completion of a scan.

In a preferred embodiment, the material deposited during the formation of a lamina has a thickness at or somewhat greater than the desired layer thickness. As described above the excess material deposited is removed by the action of the planarizer. Under these conditions, the actual build up thickness between layers is not determined by the amount of material deposited for each layer but instead is determined by the down-ward vertical increment made by the platform after deposition of each layer. If one wants to optimize build speed and/or minimize the amount of material wasted, it is desirable to trim off as little material as possible during the deposition process. The less material trimmed off, the thicker each lamina is and the faster the object builds up. On the other hand if one makes the layer thickness, i.e. z-increment, too large then the amount of build up associated with at least some drop locations will begin to lag behind the desired level. This lag will results in the actual physical working surface being at a different position from the desired working surface and probably results in the formation of a non-planar working surface. This difference in position can result in the XY misplacement of droplets due to a longer time of flight for than expected and it can further result in the vertical misplacement of object features that happen to begin or end at the layers in which the actual working surface is mis-positioned. Therefor in some embodiments it is desirable to optimize layer incrementing in the vertical direction.

To determine an optimum Z-axis increment, an accumulation diagnostic part may be used. This technique preferably involves building layers of one or more test parts at successively greater Z-increments, measuring the height of the features formed and determining which Z-increments gave rise to formation heights (i.e. vertical accumulation) of the correct amount and which Z-increments gave rise to formation heights which lagged behind the desired amount. It is expected that layer-increments (i.e. Z-increments) up to a certain amount (i.e. the maximum acceptable amount) would yield build up levels for the object equal to that predicted by the product of the number of layers and the thickness of each layer. After the layer increment exceeds the maximum acceptable amount, the build up level of the object would fall short of the amount predicted by the product of the number of layers and the thickness of each layer. Alternatively, the planarity of upper surface of the diagnostic part(s) may be lost (indicating that some drop locations may be receiving sufficient material while others are not). By inspecting the diagnostic part(s), the maximum acceptable Z-increment amount can be empirically determined. The optimal Z-increment amount can then be selected as this maximum acceptable amount or it can be selected at some thickness somewhat less than this maximum amount. Since it is known that different build and support styles accumulate in the vertical direction at different rates, the above test can be performed for each build style and support style, wherefrom the optimal Z-increment for a combination of different styles can then be selected such that it is not thicker than any of the maximum amounts determined for each style individually.

Further, the dispensing head, in tracing a given scan line, may only maintain a substantially constant velocity over part of the scan line. During the remainder of the scan, the head 9 will either be accelerating or decelerating. Depending on how the firing of the jets is controlled this may or may not cause a problem with excess build up during the acceleration and deceleration phases of the motion. In the event that velocity changes can cause problem in a accumulation rate, the part or support building can be confined to the portion of the scan line over which the print head has a substantially constant velocity. Alternatively, as discussed in the concurrently filed U.S. patent application Ser. No. 08/722,326, a firing control scheme can be used which allows accurate deposition during the acceleration or deceleration portions of a scan line.

Figure 6:
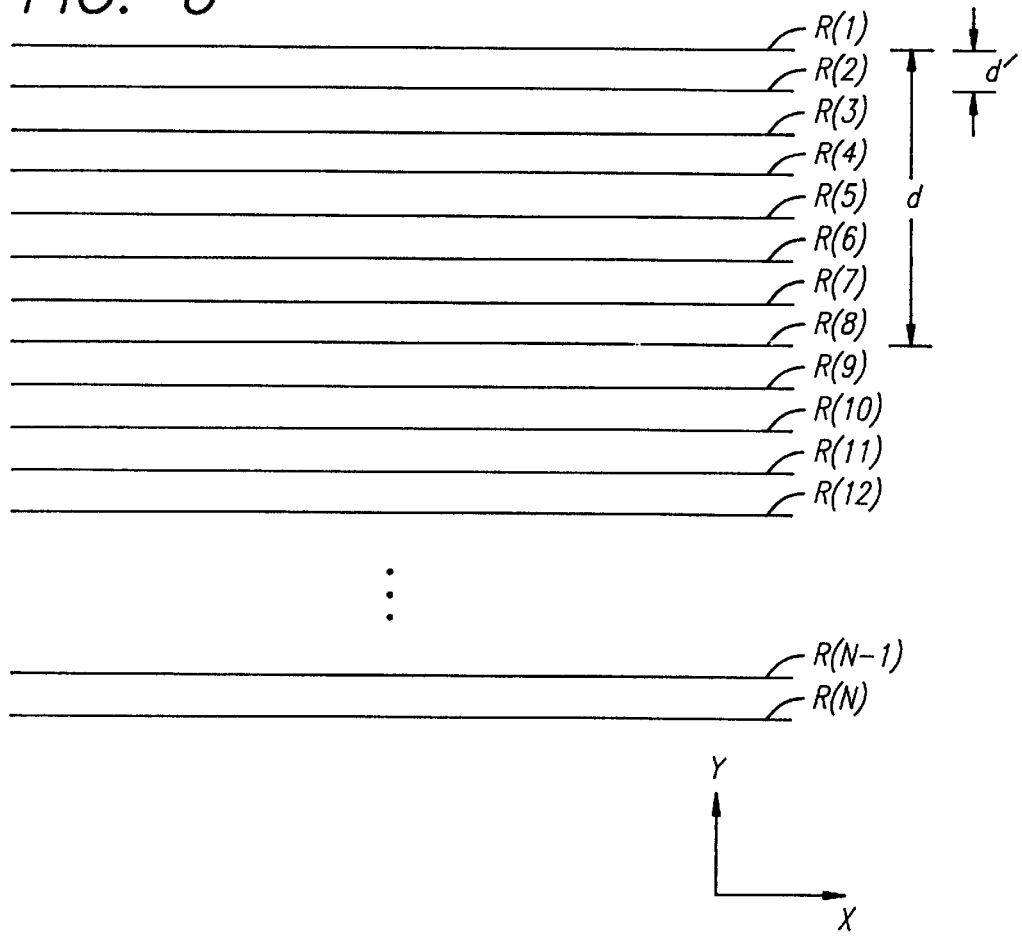
FIG. 6 illustrates the relative spacing between adjacent nozzles on the orifice plate and adjacent raster lines.

As noted previously, in some preferred embodiments, the print head 9 is directed to trace a raster pattern. An example of this is depicted in FIG. 6. As shown, the raster pattern consists of a series of raster lines (or scan lines), R(1), R(2), ..., R(N), running in the X-direction or main scanning direction and arrayed (i.e. spaced) along the Y-direction (i.e. the index direction or secondary scanning direction). The raster lines are spaced from one another by a distance $d_r$, which, in one preferred embodiment, is 1/300 of an inch (about 3.3 mils or about 83.8 $\mu$m). Since the orifices of the print head 9 are spaced by the distance d, which as discussed above is preferably about 26.67 mils (0.6774 $\mu$m), and since the desired number of raster lines may extend in the index direction by a distance greater than the length of the orifice plate 10, about 2.56 inches (65.02 mm), the print head 9 must be swept over the working surface through multiple passes in order to trace out all desired raster lines.

This is preferably accomplished by following a two-step process. In the first step, the print head 9 is passed 8 times over the working surface in the main scanning direction, with the Y-stage 16a, 16b being indexed by the amount dr in the secondary scanning direction after each pass in the main scanning direction. In the second step, the Y-stage 16a, 16b is indexed by a distance equal to the length of the orifice plate 10 (2.5600 inches+$d_r$ (0.0267 inches)=2.5867 inches (65.70 mm). This two-step process is then repeated until all of the desired raster lines have been traced.

In a first pass, for example, the print head 9 might be directed to trace raster lines R(1) (via orifice 10(1) in FIG. 4), R(9) (via orifice 10(2)), R(17) (via orifice 10(3)), etc. The Y-stage 16a, 16b would then be directed to move the building platform 18 the distance d, (one raster line) in the index direction. On the next pass, the print head 9 might be directed to trace R(2) (via 10(1)), R(10) (via 10(2)), R(17) (via 10(3)), etc. Six more passes would then be performed with the Y-stage 16a, 16b being indexed by the distance $d_r$ after each pass, until a total of 8 passes have been performed.

After performing the first step (consisting of 8 passes), the second step is performed if there are more raster lines to be traced. The second step consists of directing the Y-stage to move the building platform by an amount equal to the full length of the orifice plate 10+$d_r$, 2.5867 inches (65.70 mm). As needed, another set of 8 passes, comprising the first step, is performed followed by another second step. The two-step process described above would then be repeated until all raster lines have been traced out.

Figure 26:
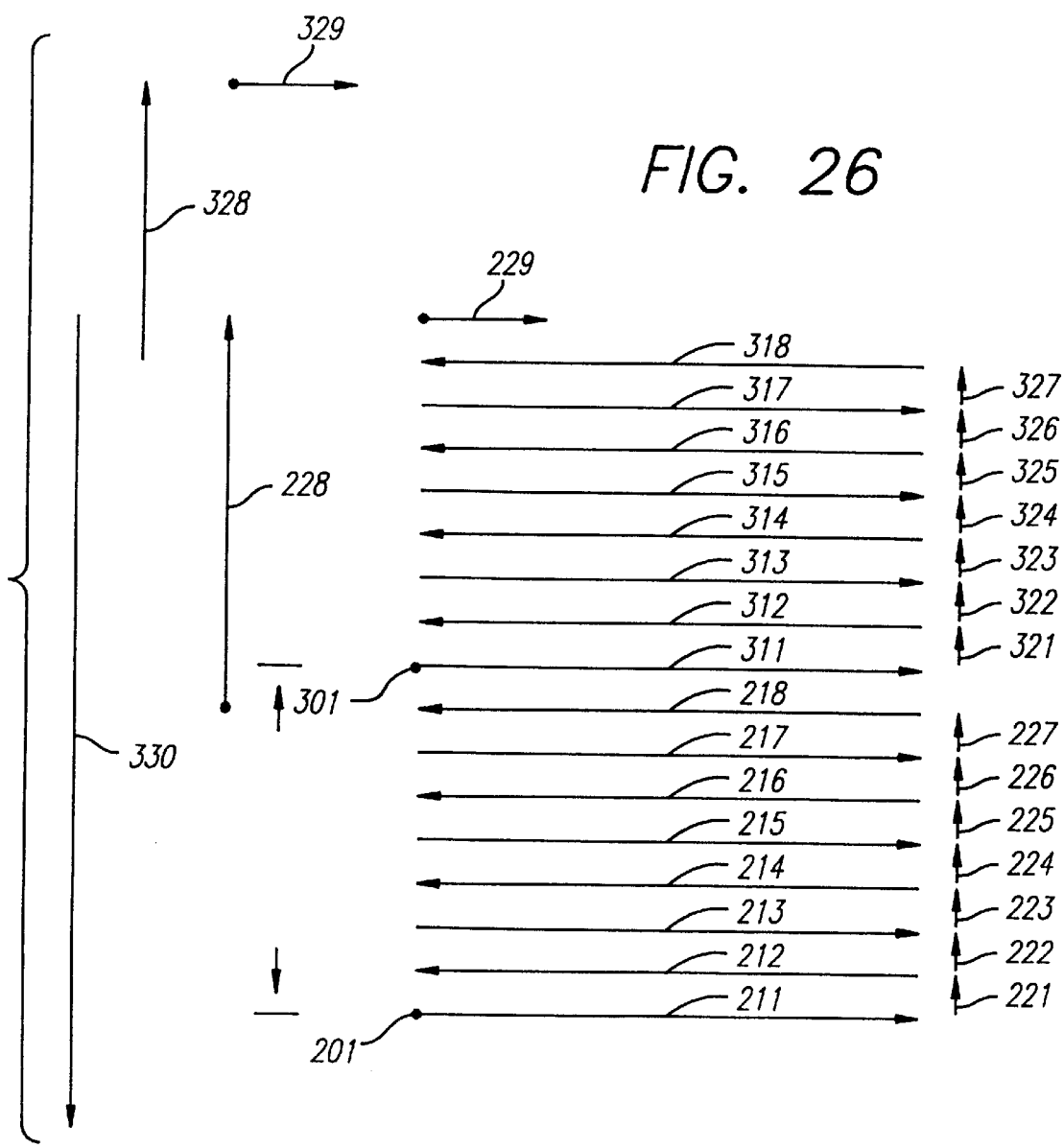
FIG. 26 illustrates a preferred two step raster scanning and indexing pattern.

An example of this two step process is depicted in FIG. 26 for a print head consisting of two jets and wherein the two jets are separated one from the other by 8 raster spacings. The scanning of the cross-sections begins with the first jet located at position 201 and the second jet located at position 301. The first step of the scanning process begins with the scanning of raster lines 211 and 311 in the indicated direction by the first and second jets, respectively. As part of the first step the initial scanning of raster lines 211 and 311 is followed by an index increment of one raster line width as indicated by elements 221 and 321. Continuing as part of the first step, the initial raster scan and index increment are followed by seven more raster scans (depicted by pairs of lines 212 and 312, 213 and 313, 214 and 314, 215 and 315, 216 and 316, 217 and 317, and 218 and 318) separated by six more I raster line width index increments (depicted with pairs of elements 222 and 322, 223 and 323, 224 and 324, 225 and 325, 226 and 326, and 227 and 327). Immediately after scanning raster line pairs 218 and 318, the second step of the process is taken wherein the head is indexed in the Y-direction according to the direction and lengths of raster lines 228 and 229. The length of this index is equal to the head width (i.e. in this example 8 raster lines widths) plus the width of 1 more raster line. After this large increment, the first steps and second steps are repeated as many times as necessary to complete the scanning of the particular cross-section being formed. It will be apparent to one of skill in the art that this two step scanning technique can be implemented in other ways in alternative embodiments. For example the second step may, instead of consisting of the positive index increment in Y as indicated by elements 228 and 328, consist of the large negative increment in Y as indicated by element 330 (i.e. three head widths minus one raster line width).

This preferred embodiment may be summarized as including the following characteristics: 1) the spacing along an indexing direction between adjacent jets is an integral (N) multiple of the desired spacing ($d_r$) between adjacent deposition lines which extend in a printing direction which is approximately perpendicular to the indexing direction; 2) the first step includes performing a number of passes (N) in the printing direction where each pass is offset in the indexing direction by the desired spacing ($d_r$) between adjacent deposition lines; and 3) the second step includes offsetting the print head 9 in the indexing direction by a large amount such that the jets can deposit material in material in another N passes, wherein successive passes are separated by one raster line index increments, and whereafter another large index increment will be made as necessary. In most preferred embodiments the second step index amount will be equal to the sum of the spacing between the first jet and the last jet plus the desired spacing between adjacent deposition lines (i.e., N×J+$d_r$, where J is the number of jets on the print head 9).

As noted in the above example, other second step index amounts are possible. For example, negative second step increments (opposite direction to the index increments used in the first step) equal to the sum of the head width plus the product of two times the width between successive jets less the width of one raster line spacing. In other embodiments, it is possible to use second step index amounts which vary or which alternate back and forth between positive and negative values. In these embodiments the second step increment amount has the common feature that it is larger than the individual index amounts used in the first step.

In other preferred embodiments other single or multiple step indexing patterns can be used, index direction increments could be generally be made which include increments involving both negative and positive movements along the Y-axis. This might be done to scan raster lines that were initially skipped. This will be described further in association with a technique called "interlacing".

In some preferred embodiments, the firing of ink jets is controlled by a rectangular bit map, i.e., pixel locations, maintained in the control computer or other memory device. The bit map consists of a grid of memory cells, in which each memory cell corresponds to a pixel of the working surface, and in which the rows of the grid extend in the main scanning direction (X-direction) and the columns of the grid extend in the secondary scanning direction (Y-direction). The width of (or distance between) the rows (spacing along the Y-direction) may be different from the width (or length of or distance between) of the columns (spacing along the X-direction) dictating that different data resolutions may exist along the X and Y directions. In other preferred embodiments, non-uniform pixel size is possible within a layer or between layers wherein one or both of the pixel width or length is varied by pixel position. In still other preferred embodiments, other pixel alignment patterns are possible. For example, pixels on adjacent rows may be offset in the main scanning direction by a fractional amount of the spacing between pixels so that their center points do not align with the center points of the pixels in the neighboring rows. This fractional amount may be ½ so that their center points are aligned with the pixel boundaries of adjacent rows. It may be ⅓, ¼ or some other amount such that its takes two or more intermediate layers before pixel patterns realign on subsequent layers. In further alternatives, pixel alignment might be dependent on the geometry of the object or support structure being dispensed. For example, it might be desirable to shift pixel alignment when forming a portion of a support pattern that is supposed to bridge a gap between support columns or when forming a down-facing portion of an object. These and other alternative pixel alignment schemes can be implemented by modifying the pixel configuration, or alternatively, defining a higher resolution pixel arrangement (in X and/or Y) and using pixel firing patterns that do not fire on every pixel location but instead fire on selected spaced pixel locations which may vary according to a desired random, predetermined or object biased pattern.

The data resolution in the main scanning direction can be defined in terms of Main Direction Pixels (MDPs). MDPs may be described in terms of pixel length or in terms of number of pixels per unit length. In some preferred embodiments, MDP=300 pixels per inch (26.67 mils/pixel or 677.4 µm/pixel). In other preferred embodiments, MDP= 1200 pixels per inch. Of course any other MDP values can be used as desired. Similarly the data resolution in the secondary scanning direction may be defined in terms of Secondary Direction Pixels (SDPs) and the SDPs may be described in terms of pixel width or in terms of number of pixels per unit length. In some preferred embodiments SDP MDP=300 pixels per inch (26.67 mils/pixel or 677.4 µm/pixel). The SDP may or may not be equivalent to spacing between raster lines and the MDP may or may not be equivalent to the spacing between successive drop locations along each raster line. The spacing between successive raster lines may be defined as Secondary Drop Locations (SDLs), while spacing between successive drop locations along each raster line may be defined as Main Drop Locations (MDLs). Similar to SDPs and MDPs, SDLs and MDLs may be defined in terms of drops per unit length or drop spacing.

If SDP=SDL there is a one to one correspondence between data and drop locations along the secondary scanning direction and the pixel spacing is equal to that of the raster line spacing. If MDP=MDL there is a one to one correspondence between data and drop locations along the main scanning direction.

Figure 16A:
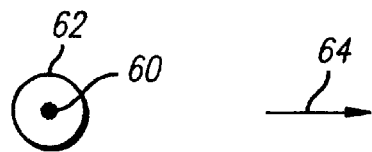
FIGS. 16a–16d illustrates several overprinting schemes.
Figure 16B:
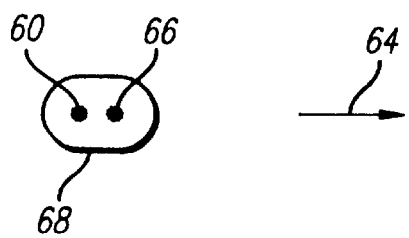
Figure 16C:
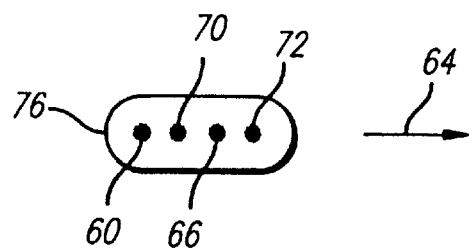
Figure 16D:
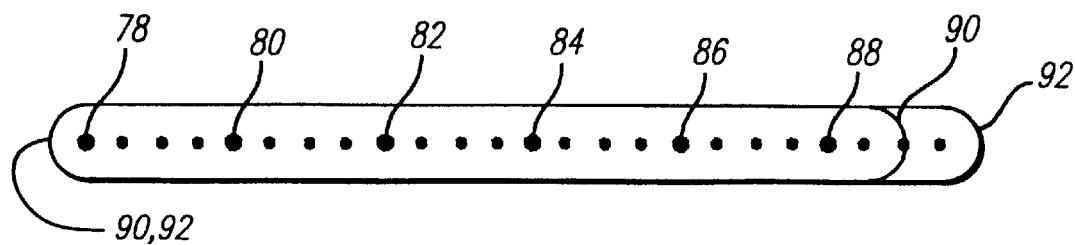

If SDL and/or MDL is larger than SDP and/or MDP, respectively, more drops will need to be fired than that for which data exists, thus each pixel will need to be used to control the dropping of more than one droplet. The dispensing of these extra droplets can be done either by dispensing the droplets at intermediate points between the centers of successive pixels (i.e. intermediate dropping, "ID") or alternatively, directly on top of pixel centers (i.e. direct dropping, "DD"). In either case this technique is called "overprinting" and results in faster build up of material and eases mechanical design constraints involving maximum scan speeds and acceleration rates since the same Z-build up can occur while moving the print head and/or object more slowly. The difference in ID overprinting versus non-overprinting, or DD overprinting, is depicted in FIGS. 16a to 16d. FIG. 16a depicts a single drop 60 being deposited and an associated solidified region 62 surrounding it when the print head is moving in direction 64. On the other hand, FIG. 16b depicts the same region being cured but using the ID overprinting technique where two drops 60 and 66 are deposited in association with the single data point when the head is moving in direction 64. The deposition zone filled by the two drops is depicted by region 68. FIG. 16c shows a similar situation for a four drop ID overprinting scheme wherein the drops are indicated by numerals 60, 70, 66 and 72 and the deposition zone is depicted by 76 and wherein the scanning direction is still depicted by numeral 64. FIG. 16d depicts a similar situation for a line of pixels 78, 80, 82, 84, 86 and 88 wherein numeral 90 depicts the length of the deposition zone without overprinting and the numeral 92 depicts the length of the deposition zone when using a four drop ID overprinting technique. The above can be generalized by saying that ID overprinting adds from approximately ½ to just under 1 additional pixel length to any region wherein it is used. Of course, the more overprinting drops that are used, the more vertical growth a pixel region will have.

If SDL and/or MDL is less than SDP and/or MDP, respectively, drops will be fired at fewer locations than those for which data exists, at least for a given pass of the print head. This data situation may be used to implement the offset pixel and/or non-uniform sized pixel techniques discussed above.

Figure 7:
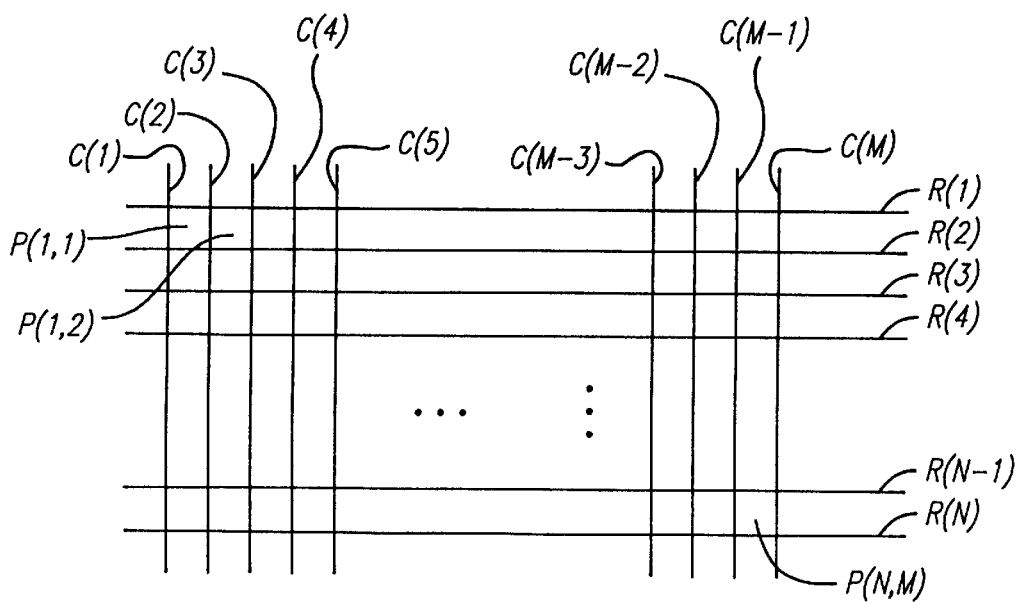
FIG. 7 illustrates the grid of pixels which defines the data resolution of the system.

An N row by M column grid is depicted in FIG. 7. As shown, the rows in the grid are labeled as R(1), R(2), ..., R(N), while the columns in the grid are labeled as C(1), C(2), ... C(M). Also shown are the pixels making up the grid. These are labeled as P(1,1), P(1,2), ... ,P(M,N).

To build a cross-section, the bit map is first loaded with data representative of the desired cross-section (as well as any supports which are desired to be built). Assuming, as with some preferred embodiments, a single build and support material is being used. If it is desired to deposit material at a given pixel location, then the memory cell corresponding to that location is appropriately flagged (e.g. loaded with a binary "1") and if no material is to be deposited an opposite flag is used (e.g. a binary "0"). If multiple materials are used, cells corresponding to deposition sites are flagged appropriately to indicate not only drop location sites but also the material type to be deposited. For ease of data handling, compressed data defining an object or support region (e.g. RLE data which defines on-off location points along each raster line as described in concurrently filed U.S. patent application Ser. No. 08/722,326, now U.S. Pat. No. 5,943,235) can be Booleaned with a fill pattern description (e.g. Style file information as described in U.S. Pat. No. 5,943,235) to be used for the particular region to derive a final bit map representation used for firing the dispensing jets. The actual control of the jets may be governed by a subsequently modified bit map which contains data which has been skewed or otherwise modified to allow more efficient data passing to the firing control system. These considerations are discussed further in the U.S. patent application based on 3D Systems' U.S. Pat. No. 5,943,235. The raster lines making up the grid are then assigned to individual orifices in the manner described earlier. Then, a particular orifice is directed to fire or not at firing locations corresponding to desired drop locations or pixel locations depending on how the corresponding cells in the bit map are flagged.

As discussed above, the print head 9 is capable of depositing droplets at many different resolutions. In some preferred embodiments of the present invention SDP=SDL= 300 pixels and drops per inch. Also in some preferred embodiments, MDL is allowed to take on three different values while MDP remains fixed 1) MDL=300 drops per inch and MDP=300 pixels per inch; 2) MDL=600 drops per inch; and MDP=300 pixels per inch or 3) MDL=1200 drops per inch and MDP=300 pixels per inch. When the MDL to MDP ratio is greater than one, the extra drops per pixel are made to occur at intermediate locations (ID overprinting) between the centers of the pixels. With the currently preferred print head and material, the volume per drop is about 80 to 100 picoliters which yields roughly drops having a 2 mil (50.8 $\mu$m) diameter. With the currently preferred print head, the maximum frequency of firing is about 20 kHz. By way of comparison, a firing rate of 1200 dpi at 13 ips involves a firing frequency of about 16 kHz, which is within the permissible limit.

In some preferred embodiments, build styles are defined separately from object data for ease of data manipulation, transfer and memory loading. In this regard, as noted above, data descriptive of the object is Booleaned (e.g. intersected) together with information descriptive of a build style, on a pixel by pixel basis, to yield a pixel by pixel representation of the deposition pattern at any given location. For example, if a completely solid pattern is to be dispensed in two passes (e.g. a two step pattern), the object data would first be Booleaned (e.g. intersected) with a first build style pattern representing the portion of the pixels at which drops are to be deposited (or for ease of terminology we may say "exposed" in analogy to the selective solidification that is used in photo-based stereolithography). The resultant modified pixel data could thereafter be used to control jet firing. Next, the object data would be Booleaned (e.g. intersected) with the complementary build style pattern to yield modified pixel data for controlling a second firing of the jets. In other preferred embodiments, object data and support data can be immediately correlated to build style data upon its derivation. In further preferred embodiments, build style information could also include pixel shifting information, pixel sizing information, overprinting information, scan direction preferences for depositing on each pixel location, planarization direction and rotational preferences, and the like. The build styles described herein enhance system performance by: 1) enhancing build speed; 2) enhancing accuracy of the formed object; 3) enhancing surface finish; 4) reducing stress in the object and/or distortion of the object; or 5) a combination of one or more of these simultaneously.

A significant problem with Selective Deposition Modeling systems involves ensuring the reliability of material deposition and more particularly of achieving uniform thickness of deposited cross-sections. Another problem involves achieving a uniform thickness for all build styles. In ink jet systems this reliability problem can take the form, inter alia, of misfiring or non-firing jets. In a multijet system, further problems exist regarding non-uniformity of jet firing direction, non-uniformity of dispensed volume between jets, and to a lesser extent, non-uniformity of dispensed volume from a single jet over time.

The problem of non-uniformity of cross-section thickness can also result from other phenomena as well. As an example, once a droplet leaves a jet there is a time of flight before the droplet encounters the working surface. When leaving the jet, the drop is fired with an initial downward velocity component away from the jet but since the jet is moving in the main scanning direction the droplet also has a horizontal velocity component. Once the droplet leaves the jet it is subject to various external and internal forces including gravity, viscous drag forces and surface tension. These initial conditions and forces in turn lead to the conclusion that the droplet may not, and probably will not, land directly on the working surface below the position from which it was fired. Instead the droplet will land somewhat away from this theoretical drop point, typically in the direction of travel of the print head. In other words the firing location and impact (or drop) location will not have the same XY coordinates but instead will be shifted one from the other. The shift in horizontal distance that occurs depends on the above noted factors but also on the distance between the orifice plate 10 and the vertical position (e.g. "Z" position) of the working surface at each horizontal location (e.g. X and/or Y position). As noted above variations in vertical position can occur for a number of reasons. For example, variations can result from differences in geometry between different portions of a cross-section (more or less material spreading results in less or more deposition thickness). As another example, variations can result from the temporal ordering of deposition for a given spatial pattern (previously deposited material on an adjacent pixel site can limit the ability of the material to spread in that direction).

As noted previously, the preferred system for embodying this invention utilizes planarization to bring each deposited cross-section to a uniform height wherein the net layer thickness results from the difference in Z-level between the planarization levels of two consecutive layers. In turn, if it is desired that the planarization step form a completely smooth and uniformly leveled layer, the Z increment between planarizations must be at or below the minimum deposition/build up thickness for each point on the entire layer. If one jet is weakly firing (or not firing), the minimum thickness build up can result in net layer thicknesses much smaller (i.e. near zero or zero) than desired and therefore much longer build times than desired. Several techniques for dealing with these deposition/build up problems are described herein. Other preferred embodiments might involve the use of planarization on periodic layers instead of on every layer. For example planarization may be used on every second, third, or other higher order spaced layer. Alternatively, determination of which layers or portions of layers to planarize may be based on object geometry.

Time of Flight Correction:

As noted above, one difficulty in ensuring that the droplets strike the desired locations on the working surface involves the time that the droplets are in flight (i.e. the time of flight of the droplets). If the times of flight were always the same and if the direction and amount of offset were always the same there would be no time of flight issue since the only effect would be a shift between firing coordinates and deposition coordinates. However, when forming three-dimensional objects it is typically desirable to jet material when the head is traveling in both the positive and negative main scanning directions (and may even involve, for example, alternating the definitions of main and secondary scanning directions). This results in a change in offset direction (e.g. reversal of offset direction) between scans due to relative movement occurring in different directions (e.g. opposite direction). This problem can be readily addressed by causing firing signals to occur before the head actually reaches the point directly above the desired deposition site. This correction to firing time is known as the "time of flight correction". The time of flight may be corrected by utilization of a correction factor applied to scanning in each direction separately or alternatively a single correction factor may be used to bring deposition from one scanning direction into registration with the uncorrected scans made in the other direction. The time of flight correction may be implemented in a number of ways. One way, for example is by appropriately defining the initial firing location (X position) at the beginning of each raster line, which initial firing location will be used to set the firing locations for all other pixels along the raster line.

Figure 27A:
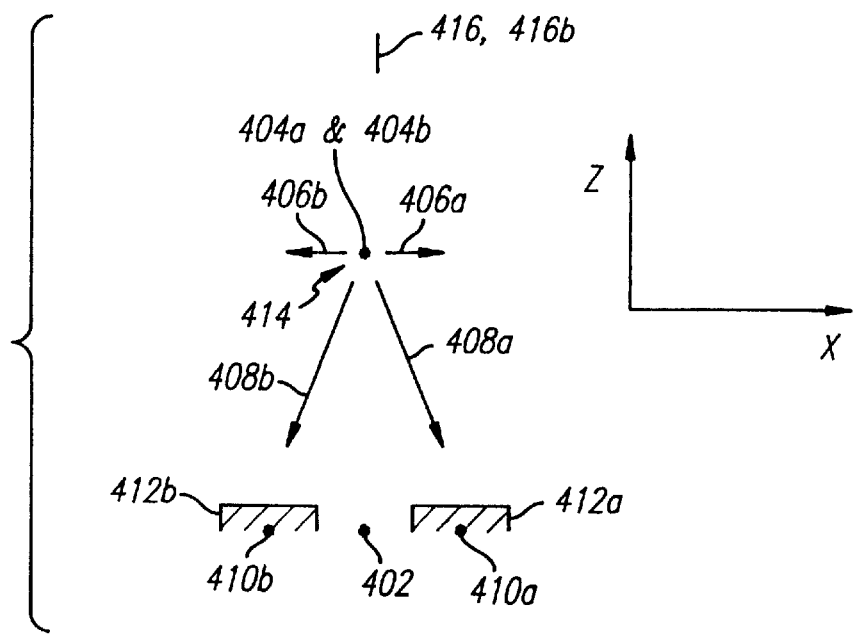
FIGS. 27a–27e depict various combinations of working surface and targeting positions.
Figure 27B:
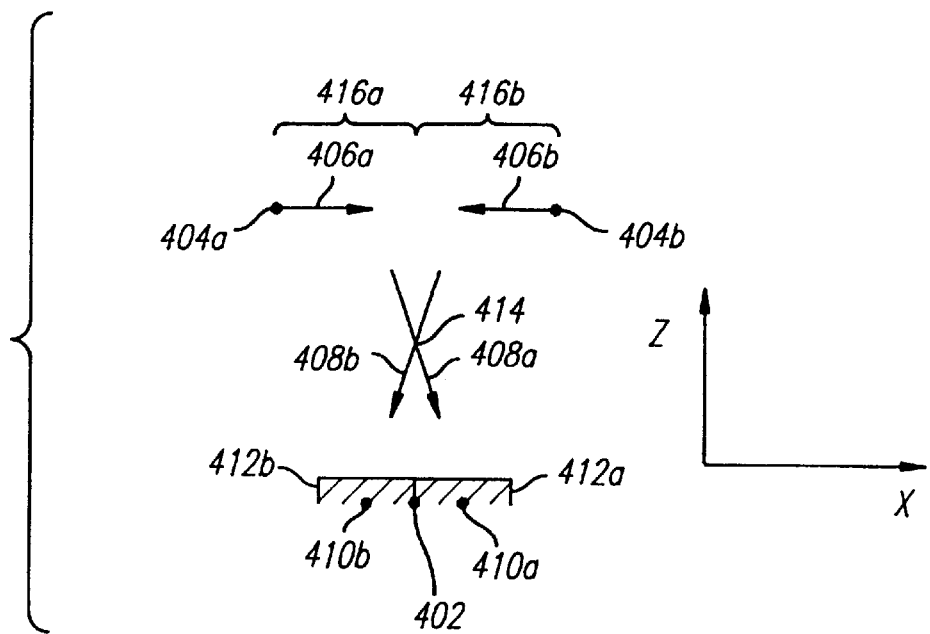
Figure 27C:
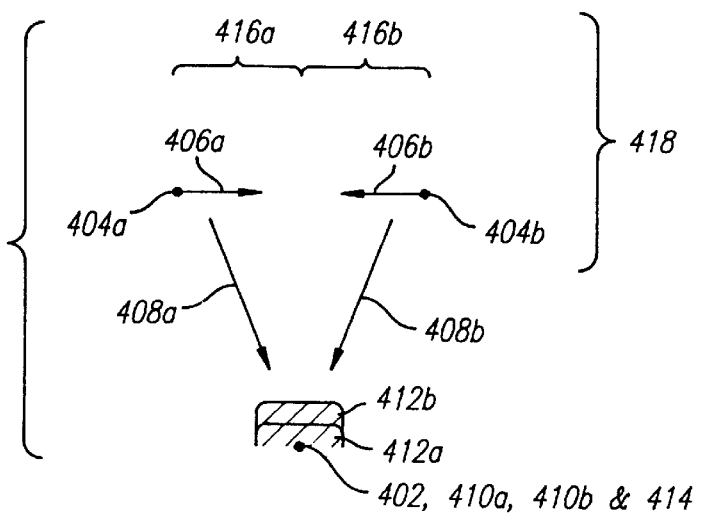
Figure 27D:
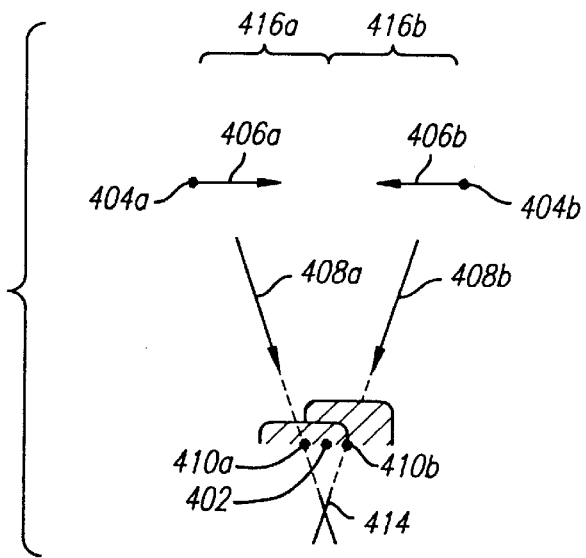
Figure 27E:
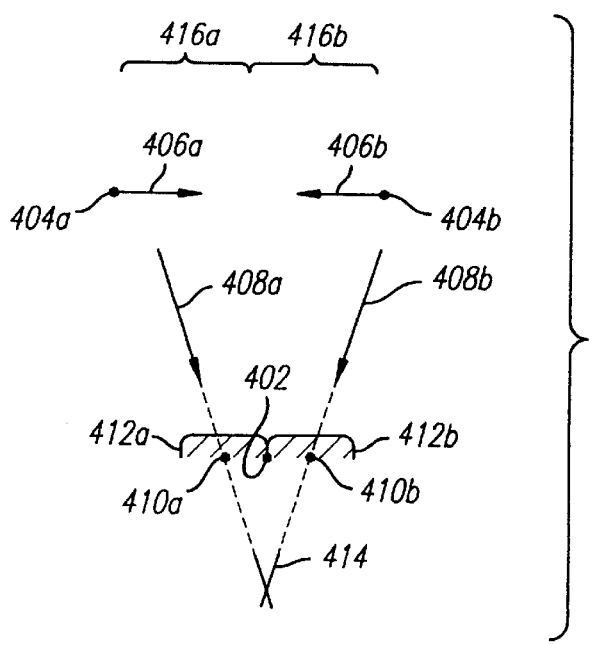

FIGS. 27a–27e illustrate the relationships between firing location, drop location, and time of flight wherein like elements are referenced with like numerals. FIG. 27a illustrates the situation where firing locations 404a and 404b are both coincident with desired drop location 402 (i.e. no time of flight correction factor is used). Element 404a represents the firing location when the head is passing in the positive X-direction, represented by element 406a, and element 404b represents the firing location when the head is passing in the negative X-direction, represented by element 406b. Elements 408a and 408b represent the nominal path followed by the droplets after leaving firing locations 404a and 404b, respectively. The nominal paths 408a and 408b direct the droplets to actual drop locations 410a and 410b, where the droplets impact the surface and form impacted droplets 412a and 412b. The crossover point (i.e. focal point) for the droplets fired, while scanning in both directions, is depicted with numeral 414. The plane defined by the crossover points for the entire layer may be called the focal plane. Elements 416a and 416b represent the time of flight factor used in terms of an X-displacement between the firing locations and the desired drop location. Whether or not the actual drop locations match the desired drop location determines the appropriateness the correction factor. In FIG. 27a it can be seen that the droplets are moving in diverging directions and that the impacted droplets do not overlap at the working surface resulting in a minimal build up in Z and inaccurate XY placement of material. FIG. 27b represents the situation where a small time of flight correction factors 416a and 416b are used which result in a focal point located above the desired working surface and in a closer spacing of the impacted droplets 412a and 412b as compared to that depicted in FIG. 27a. If the time of flight correction were any larger, Z build up would be increased due to the overlap or superposition of impacted droplets 412a and 412b. FIG. 27c represents a situation where the time of flight correction factors used result in the most accurate placement of impacted droplets 412a and 412b (assuming the thickness of impacted droplet 412a is small compared to the drop distance 418 and that the angle of incidence is not too large). If optimal time of flight correction is based on maximum Z accumulation then FIG. 27c depicts the optimal situation. FIG. 27d represents the situation where the time of flight correction factors 416a and 416b are slightly larger than those used in FIG. 27c but still result in Z-accumulation based on the superposition of both droplets. The X-direction placements of the droplets are still reasonably accurate and the focal point 414 of dispensing is somewhat below the desired working surface (and actual working surface). FIG. 27e represents the situation where even larger time of flight correction factors are used such that Z-accumulation is reduced to a minimal amount and where the focal point is even further below the desired working surface.

If drag effects and gravitational effects on flight time are ignored, the time of flight correction value (time) would be equal to the distance (length) separating the orifice from the working surface divided by the downward velocity (length/time) at which the droplet is dispensed. However, it is believed that drag is an important factor. For example, in some preferred embodiments print head scanning speed is approximately 13 inches per second, the distance from the orifice plate to the working surface is approximately 0.020 inches, and the initial vertical firing speeds are believed to be on the order of 200 to 360 inches per second. If drag or other frictional forces are ignored, under these initial conditions, a shift between firing locations and drop locations of approximately 0.8 to 1.3 mils would be expected. However, under these conditions, in practice shifts in the main scanning direction between the firing location and drop location of approximately 2 mils have been observed.

The appropriate correction value can be readily determined empirically by attempting to deposit droplets at a single X location when scanning in both directions and reiterating the experiment with different correction values until the two drops land at the same point. As noted above, in some preferred embodiments the most appropriate time of flight correction value is the one for which the droplets hit the same position. In terms of the above example, if drag forces are ignored, time of flight correction factors of approximately 60 to 100 $\mu S$ would be expected. When in practice correction factors of approximately 150 to 200 $\mu S$ have been found to be more appropriate.

In other preferred embodiments the optimal time of flight correction factor is not set at a value which yields the most accurate targeting (i.e. the focal point is not at the working surface) but instead is set at a value which would yield most accurate targeting some distance below the actual working surface (i.e. the focal point is located below the working surface). These embodiments may be called "off surface targeting" embodiments. In this context, most accurate targeting is considered to occur when vertical accumulation rate is the greatest and probably when the X position is most precisely impacted. FIG. 27d depicts an example of targeting for these off surface targeting embodiments. These off surface targeting embodiments are believed to be particularly useful when building is to occur without the use of additional components for maintaining the desired and actual working surface at the same level (e.g. without a planarizer or without additional elements such as a surface level detection device and adjustment mechanisms or schemes).

A characteristic of these off surface targeting embodiments is that Z-accumulation is self-correcting or self-compensating. As long as the Z-increments between deposition of successive layers are within an appropriate range and the deposition pattern allows horizontal spreading of dispensed material instead of only vertical accumulation, excess Z-accumulation on one layer causes a reduction in Z-accumulation on one or more subsequent layers causing the net accumulation to maintain the focal point somewhat below the actual working surface. On the other hand, again as long as Z-increments between deposition of successive layers is within an appropriate range and the deposition pattern allows horizontal spreading of dispensed material instead of only vertical accumulation, too little Z-accumulation on one layer causes an increase in Z-accumulation on one or more subsequent layers thereby causing net accumulation to maintain the focal point somewhat below the actual working surface. The preferred Z-increment range is discussed further below.

This self-correcting aspect can be understood by studying and comparing FIGS. 27c, 27d and 27e. When deposition begins (e.g. at the platform) the time of flight correction factor(s) are chosen such that the focal point is somewhat below the actual working surface as depicted in FIG. 27d (i.e. the focal point should be set at an appropriate position such that the situations depicted in FIGS. 27c and 27e do not occur). If when forming the first layer, too little material is deposited, for the given Z-increment being used, the actual surface will be lower as compared to the repositioned focal plane (but will still be above it as long as the Z-increment was not too large). This results in a more optimally focused deposition when forming the next layer, this in turn results in an increase in deposition thickness as depicted in FIG. 27c. If the net 7-accumulation resulting from depositing the second layer is still too low (as compared to the two Z-increments made), then the next layer when being deposited will have an actual surface which closer to the optimal focus plane than the original surface was. This closer approach to optimal positioning results in increased Z-accumulation which will again drive the net accumulated thickness toward that required by the Z-increments. On the other hand, if net accumulation from depositing the second layer is greater than that dictated by the two Z-increments, then the actual working surface will be further away from the focal plane and less Z-accumulation, upon forming the next layer, will occur thereby driving the net accumulation toward the amount required by the Z-increments. This is the situation depicted in FIG. 27e.

When the focal plane is appropriately below the actual working surface, when the z-increment amount is appropriately selected to approximately match deposition rates, and when objects/supports are being formed in a non-solid manner (not all pixel locations are directly deposited on, the system is stabilized and both supports and objects can be formed with accurate vertical dimensions without the explicit need of a planarizer. Of course a planarizer can still be used if desired. For optimal operation of these embodiments it is preferred that the Z-increment should be selected to be between the average amount accumulated per layer during optimal targeting (e.g. FIG. 27c) and the average amount accumulated when no superposition occurs (e.g. FIG. 27e). It is further preferred that layer thickness be significantly less than the distance that separates the plane of optimal focus (e.g. FIG. 27c) from the plane where superposition no longer occurs (e.g. FIG. 27d).

As noted above, in some of these embodiments objects may be formed in such a manner as to allow regions for material to spread horizontally instead of just accumulating vertically, based on the level of targeting optimization, and thereby allowing self correction of Z-accumulation. One such embodiment might involve the forming the object as a combination alternating solid layers and checkerboard layers. Other such embodiments might involve the formation of solid outward facing surfaces and checkerboard, offset checkerboard, or other open structures in internal object regions. Other appropriate building patterns can be determined empirically by building and analyzing test parts.

In some of these offset surface targeting embodiments, the most preferred initial target surface/focal plane position is selected to be approximately in the middle of the situations depicted in FIGS. 27c and 27c. One way of accomplishing this is to ignore the hypothetical focal points and instead focus on time of flight values. The time of flight correction values may be selected so that they are greater than the optimal time of flight correction values (as discussed above) and less than the time of flight correction values which yields immediately adjacent but non-overlapping (i.e. non-superimposed) impact zones. Most preferably the selected time of flight values would be taken as approximately the average of these two extremes.

Some offset surface targeting embodiments might be used to simultaneously form different portions of objects and/or supports such that their upper surfaces are intentionally at different heights after formation of any given layer. These different height embodiments might benefit from utilization of data manipulation techniques, like the SMLC techniques, discussed in previously referenced U.S. Pat. No. 5,999,184 as well as some of the of the other previously referenced U.S. Patents and applications.

Figure 17A:
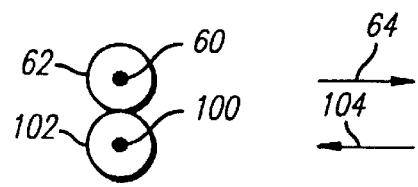
FIGS. 17a and 17b illustrates a mis-registration problem that can occur when using an overprinting technique.
Figure 17B:
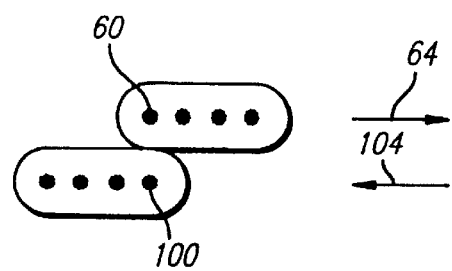

In addition to the above noted time of flight issues, other issues arise that can be corrected using modified time of flight correction factors. For example, when using ID overprinting techniques to cause more build up, features on scan lines which are scanned in opposite directions will lose alignment since the feature will be extended in one direction on one line and in the other direction on another line. This situation is depicted in FIGS. 17a and 17b. FIG. 17a depicts two points 60 and 100 belonging respectively to scan lines traversed in directions 64 and 104. Regions 62 and 102 depict the extents of deposited material associated with points 60 and 100, respectively. FIG. 17b depicts the same points 60 and 100 where jetting occurs using four times overprinting (i.e. four droplet depositions per pixel). Extents of deposition are depicted with numerals 76 and 106 respectively. As can be seen, due to the different directions of overprinting, registration between the physical features on the two lines is lost. The above mis-registration can be corrected by an additional time of flight correction factor which can be empirically, or possibly theoretically determined so as to cause realignment of features on different scan lines. Of course this form of correction does not account for any extra length added to object features along the scanning lines.

A different form of correction that can avoid both problems is proposed which involves recognition that a given pixel is not bounded on its far side, in the scanning direction, by an adjacent pixel that also calls for material deposition. Based on this recognition, no overprinting is used on such an unbounded pixel. As another alternative, the extra line length might be compensated for by using a form of drop width compensation similar to line width compensation used in photo-based stereolithography and as described in the previously referenced U.S. Pat. Nos. 5,854,748 and 5,870,307 but applied only to the points along each scan line representing a transition from deposition to no deposition. As an approximate correction these "terminal points" could simply be deleted from the deposition pattern as they will be in the range of ½ to fully covered by the use of ID overprinting of immediately adjacent pixels. Another variant involves the use of shifted time of flight correction data to implement subpixelling deposition.

The time of flight correction factors may also be used in variant manners for somewhat opposite purposes to those described above. In these embodiments, time of flight correction factors may be used to deposit material at intermediate pixel (i.e. subpixel) locations for implementation of enhanced building techniques. These enhanced building techniques might involve formation of down-facing surfaces, formation and placement of supports, enhanced vertical build up of material, enhanced resolution, and the like. In preferred embodiments, enhanced object formation may be achieved in a single pass or multiple pass implementations.

Droplet Width Compensation:

In some situations it may be desirable to modify the object data by performing droplet width compensation (i.e. deposition width compensation). Compensation (by offsetting inward toward solid one or more full pixel widths) can be used to achieve enhanced accuracy if the drop width is at least somewhat greater than the pixel width and/or length. This technique may be used in combination with any of the embodiments described above or any embodiments described herein after. As the drop width approaches or exceeds twice the pixel width (and/or length) better and better accuracy can be obtained by a single or multiple pixel offset. Droplet width compensation may be based on techniques like those disclosed in U.S. Pat. Nos. 5,854,748 and 5,870,307. Alternatively they may involve pixel based erosion routines. In some embodiments the pixel based erosions might involve multiple passes through a bit map wherein "solid" pixels meeting certain criteria would be converted to "hollow" pixels.

Some embodiment might involve the following steps wherein each edge of the bit map is: 1) In a first pass through the bit map all "solid" pixels which are bounded on their right side by a "hollow" pixel are converted to "hollow" pixels; 2) In a second pass all "solid" pixels which are bounded on their left side by a "hollow" pixel are converted to "hollow" pixels; 3) In a third pass all "solid" pixels which are bounded on their upper side by a "hollow" pixel are converted to "hollow" pixels; and 4) In a fourth pass all "solid" pixels which are bounded on their lower side by a "hollow" pixel are converted to "hollow" pixels. Other embodiments might change the order of steps (1) to (4). If more than a one pixel erosion is required, steps (1) to (4) can be repeated as multiple times until the correct amount of reduction is achieved. These embodiments can perform a reasonable droplet width compensation; however, they suffer from the short coming that pixels in solid corner regions (whether an object corner or an object edge that does not run parallel to either the X or Y axis) are removed at a faster rate than pixels in which represent boundary regions that are parallel to either the X or Y axis.

Other embodiments which attempt to address these differentials in erosion rate might involve steps as follows: 1) In a first pass through the bit map all "solid" pixels which are bounded on their right side by a "hollow" pixel and all other sides by "solid" pixels are converted to "hollow" pixels; 2) In a second pass all "solid" pixels which are bounded on their left side by a "hollow" pixel and on all other sides by "solid" pixels are converted to "hollow" pixels; 3) In a third pass all "solid" pixels which are bounded, on at least their upper side, by a "hollow" pixel are converted to "hollow" pixels; and 4) In a fourth pass all "solid" pixels which are bounded, on at least their lower side, by a "hollow" pixel are converted to "hollow" pixels. Other embodiments might change the order of steps (1) to (4) or the conditions on which conversion will be based. If more than a one pixel erosion is required, steps (1) to (4) can be repeated as multiple times until the correct amount of reduction is achieved. These embodiments do a better job of minimizing excess reduction in corner regions.

Other embodiments, might involve setting erosion conditions based on whether or not two, three or all four sides of a pixel are bounded by "hollow" pixels. Other embodiments may vary the erosion conditions depending on how many times the bit map has been passed through. Other embodiments may use a combination of erosions and Boolean comparisons with original cross-section or other partially compensated bit maps to derive final bit map representations of the pixels to be exposed. Numerous other embodiments and algorithms for eroding pixels while emphasizing the reduction or maintenance of certain object features will be apparent to those of skill in the art in view of the teachings herein.

In situations where X and Y pixels dimensions are significantly different, droplet width compensation may only be necessary along one axis instead of both axes. In these situations, embodiments similar to those described above may be used wherein only a portion of the steps will be performed per erosion. It is anticipated that deposition width compensating schemes can also be utilized using subpixel offset amounts in either one or both of the X and Y dimensions.

Randomization:

A technique (method and apparatus) known as randomization can be employed in the build process. This technique may be used in combination with any of the embodiments described above or any embodiments described herein after. According to this technique, the manner of dispensing material at each location for two consecutive cross-sections is varied. This can lead to a more uniform build up of material across a layer (i.e. lamina) resulting in the ability to potentially use thicker layers, thus improving build time. This technique also minimizes the effects from any single jet or plurality of jets that may not be properly firing. The varying of deposition can occur in several ways. For example variation may occur by: 1) varying the jet which deposits material onto a given portion of a layer relative to the jet that deposited material on the corresponding portion of the immediately preceding layer; 2) varying the temporal order or spatial order of dispensing onto any given portion of the layer relative to any other portion of the layer; and 3)

a combination of these, such as varying the main scanning orientation or direction and/or varying the secondary scanning orientation or direction. The varying of deposition from layer to layer can occur in a totally random manner or it can occur in a periodic or planned manner. A similar technique has been used in photo-based stereolithography though for a completely different purpose (see Alternate Sequencing in previously referenced U.S. Pat. No. 5,711,911).

Specific embodiments for varying the deposition will now be given. The presently preferred randomization technique maintains the orientation of the main and secondary scanning directions but uses a different dispenser (e.g. jet) to deposit material along corresponding scanning lines between two layers. In other words, a first dispenser is used to scan a particular main scanning line on a first layer and a second dispenser may be used to scan that particular main scanning line on a subsequent layer (the one immediately above the particular scanning line on the first layer). In some preferred embodiments, a particular scan line is exposed (i.e. deposited on), from layer-to-layer, using a different jet until 96 layers have been deposited and each of the 96 jets has deposited on the particular scan line, after which the process repeats. These embodiments are examples of "full head" randomization. In other preferred embodiments, "half head" randomization is preferred. Half head randomization can reduce the number of passes that must be made over the any cross-section depending on the object geometry. Based on building with the presently preferred 96 jet head, half head randomization involves scanning over any given location with randomized dispensing occurring from either jets 1 to 48 or jets 49 to 96.

To explain the full head randomization embodiments in more detail, reference is made to FIGS. 4a and 6. For a particular layer, orifice 10(1) might be used to trace scan lines R(1)–R(8); orifice 10(2), lines R(9)–R(16); orifice 10(3), lines R(17)–R(25); orifice 10(4), lines R(26)–R(33), etc. On the next layer, however, these assignments are changed such that a given orifice does not trace the same scan line on the next layer. For example, the following new assignments might be made: orifice 10(1), lines R(257)–R(264); orifice 10(2), lines R(265)–R(272); orifice 10(3), lines R(273)–R(280), etc.

Figure 8:
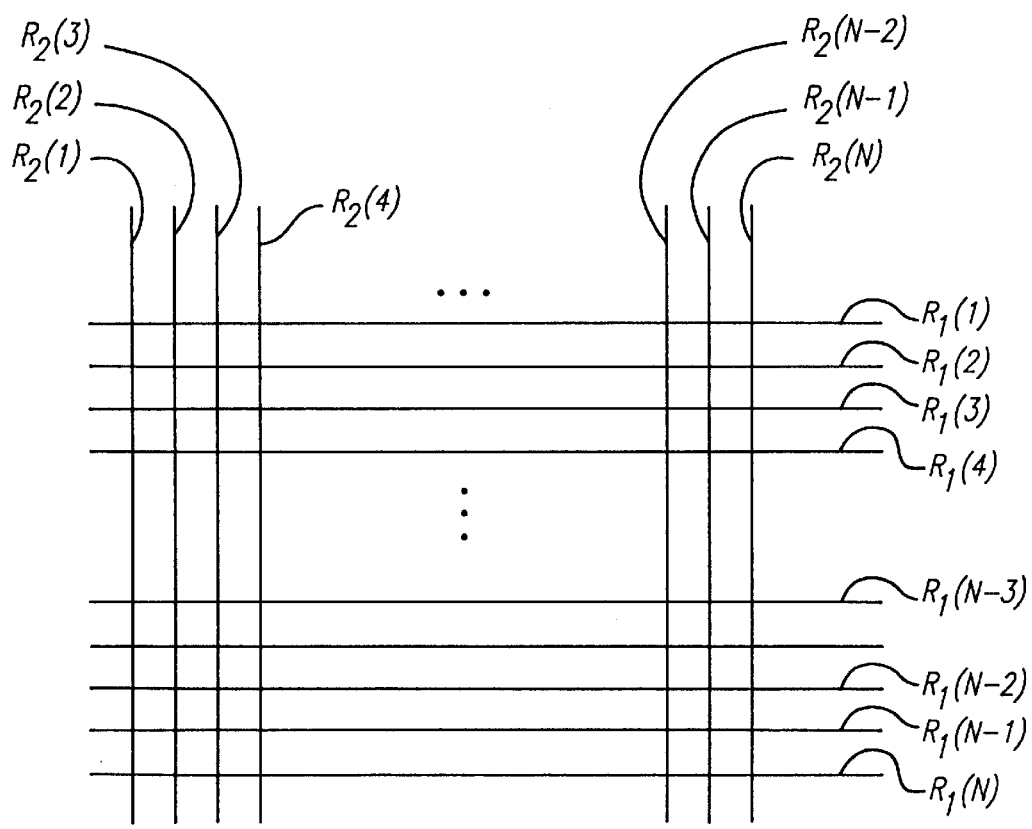
FIG. 8 illustrates two perpendicular examples of raster line orientation.

Another embodiment might involve relatively rotating the partially formed object and/or the print head by some amount (e.g. 30°, 60°, or 90°) between the deposition for two layers so that the main and secondary scanning orientations are changed from their previous orientations. This results in material deposition on a current layer, (i.e. lamina), from any jet, mainly occurring above material which was deposited by other jets on the previous layer. This is depicted in FIG. 8 wherein the scan lines associated with a first layer are depicted by lines $R_1(1)$, $R_1(2)$, $R_1(3)$, $R_1(4)$, ..., $R_1(N-3)$, $R_1(N-2)$, $R_1(N-1)$, $R_1(N)$ while the scan lines associated with a subsequent layer are depicted by line $R_2(1)$, $R_2(2)$, $R_2(3)$, $R_2(4)$, ..., $R_2(N-3)$, $R_2(N-2)$, $R_2(N-1)$, $R_2(N)$ which are rotated by 90° with respect to the scanning lines of the first layer. The amount of rotation may vary between subsequent layers or it may be a constant amount. The angles may be chosen such that if the rotation is continued for a sufficient number of layers, identical jets will deposit material over identical scan lines where deposition occurred on previous layers. Alternatively, the angles may be chosen so that no identical jet to scan line redeposition occurs.

Figure 9:
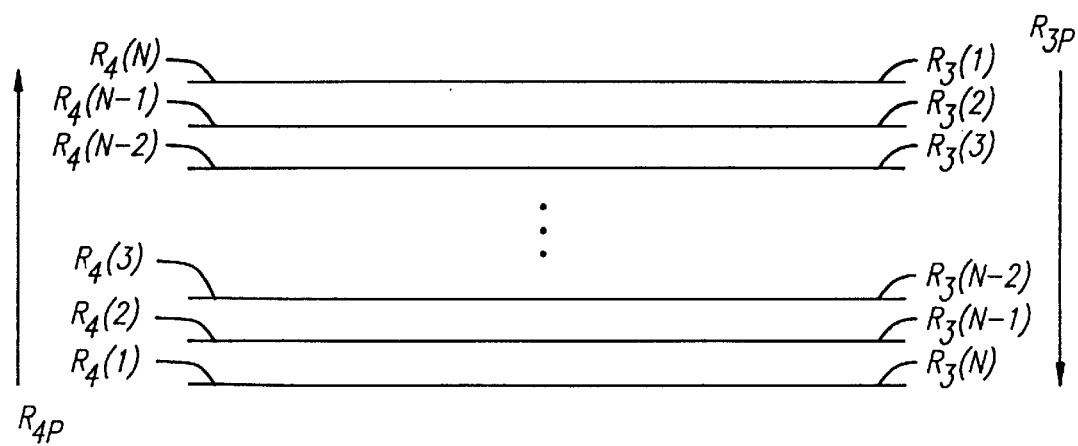
FIG. 9 illustrates two examples of deposition propagation in the secondary scanning direction.

Additional embodiments might involve changing the order of progression from one scan line to another (in the secondary scanning direction). This is depicted in FIG. 9, where for a first layer the order of deposition of material on main scan lines begins on the upper most scan line, $R_3(1)$ and proceeds to scan lines $R_3(2)$, $R_3(3)$, ..., $R_3(N-2)$, $R_3(N-1)$, and ends with lower most scan line $R_3(N)$. The order of progression of scan lines is depicted by arrow $R_{3P}$. The deposition of material on scan lines for a subsequent layer begins on the lower most scan line, $R_4(1)$ and proceeds to scan lines $R_4(2)$, $R_4(3)$, ..., $R_4(N-2)$, $R_4(N-1)$, and ends with upper most scan line $R_4(N)$. The order of progression of scan lines on this subsequent layer is in the opposite direction to that of the lines on the first layer and is depicted by arrow $R_{4P}$.

Figure 10A:
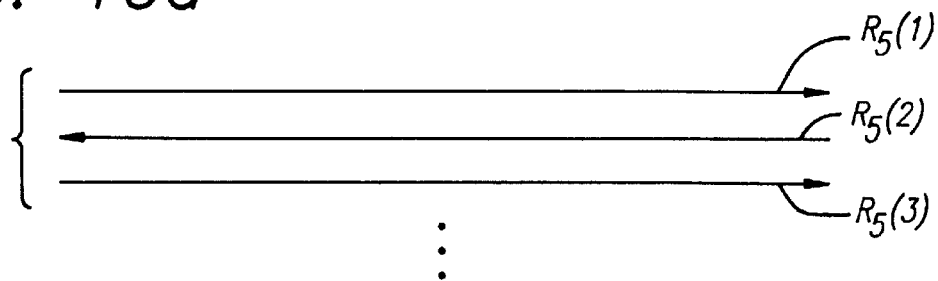
FIGS. 10a and 10b illustrate two examples of deposition propagation in the main scanning direction.
Figure 10B:
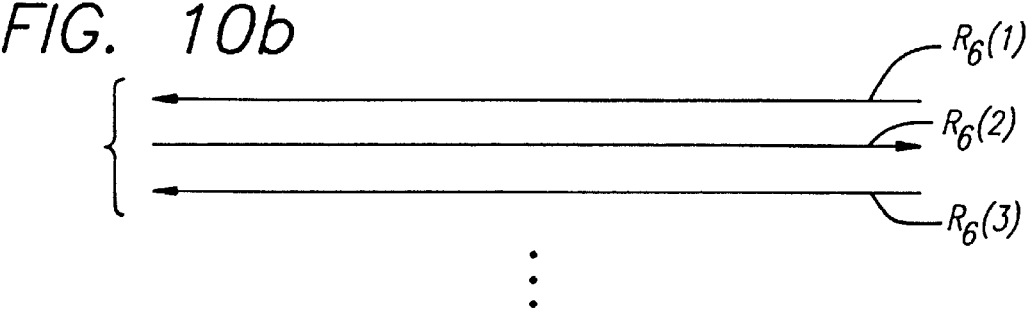

Additional embodiments are depicted in FIGS. 10a and 10b, wherein the direction of scanning along corresponding scan lines is reversed between two subsequent layers. FIG. 10a depicts the scanning directions for scan lines on a first layer wherein scan lines $R_5(1)$ and $R_5(3)$ are scanned from left to right and scan line $R_5(2)$ is scanned from right to left. FIG. 10b depicts that the scanning directions are reversed on a subsequent layer wherein scan lines $R_6(1)$, $R_6(2)$, and $R_6(3)$ overlay $R_5(1)$, $R_5(2)$, and $R_5(3)$, respectfully, and wherein scan lines $R_6(1)$ and $R_6(3)$ are scanned from right to left and scan line $R_6(2)$ is scanned from left to right.

Many other randomization patterns are possible including combinations of the above described techniques. Depending on the randomization technique chosen, the randomization process may cause an overall increase in layer deposition time since it might result in the need to perform additional main scanning passes. However, this possible disadvantage is believed to be outweighed by the enhancement in uniform layer build up. Additionally, since heat removal is a significant problem when using elevated dispensing temperatures (as used to make the material flowable), these extra passes can be effectively used to allow additional cooling to occur prior to deposition of a subsequent layer.

Drop Location Offsetting:

As noted above some building techniques can be enhanced by the use of offset scan lines and/or offsetting of drop locations along scan lines. These offsetting techniques could be used in combination with the above noted randomization techniques, though it should be understood that corresponding lines and drop locations on successive layers may be offset from one another. These techniques may also be used in combinations with other embodiments disclosed herein before or herein after. In some preferred embodiments this offsetting may be up to ½ the line spacing or drop spacing. One use of offset pixelling might involve deposition of material on a down-facing portion of a cross-section so as to aid in bridging the gap between adjacent support elements. In fact the down-facing region may be cured in multiple passes wherein progressive or alternating offset, between successive passes, are used to bridge a wide gap between support elements. In these embodiments any non-down-facing portion of the cross-section might be exposed using one or more depositions and offset or non-offset pixels and deposition in any down-facing portion might occur by multiple depositions (or exposures) where pixels zones partly overlap. The overall height of deposition, in preferred embodiments, might be made uniform by trimming to an appropriate level by planarizing.

In some embodiments, offsetting of pixels and therefore drop sites might occur during support structure formation to enhance the formation of arch-like supports, bridges, or branching supports (e.g. like limbs of a tree). In some embodiments, offsetting of pixels might occur during object formation to enhance building of object sections which protrude a limited amount beyond the boundaries of the immediately preceding object lamina. Protruding supports and object portions can be formed without the use of offset pixelling but it is believed that offset pixelling can be useful to aid in the formation of such structures wherein less material may slump into regions below the layers levels at which it was dispensed.

Embodiments may involve the offsetting of pixels on every layer or alternatively may involve the offsetting of pixels only on periodic layers. In this last alternative, material is deposited according to the same pixel positions over a number of layers. According to this alternative, stabilization of overhanging regions may be allowed to better occur by build up of multiple layers, above an initial overhang, prior to attempting the formation of a subsequent overhang.

The offsetting of pixels, e.g., to build branching supports or tapering outward object structures, results in the formation of structures which branch out over empty space. The extent of this branching is limited to some thing less than one droplet width per layer. Whether each layer extends beyond the boundary of its immediately preceding layer, or whether multiple layers are built above one another followed by periodic extensions beyond the boundary of an immediately preceding layer, one can define an angle of extension based on the average extension over a number of layers. The maximum angle of extension depends, in part, on the rate at which the material near and in the extended portion solidifies, which in turn depends on the amount of material dispensed near and in the extended portion. The layers can be built at any angle wherein the material solidifies quickly enough and is capable of supporting the next layer of material. In some preferred embodiments, extension angles close to 30 degrees have been achieved. It is believed that extension angles approaching or even exceeding 45 degrees are possible.

Due to material cool down rates, it is preferred that the formation of overhanging solid object portions be achieved in multiple passes. In one preferred embodiment, the extension region is deposited on one or more initial passes and the fully supported regions are exposed on one or more subsequent passes. This embodiment allows the material in the extension regions to cool and solidify without the added delays that might be associated with heat absorption from material dispensed in the interior regions. In another preferred embodiment, the interior of the layer is exposed initially and the extension regions are exposed in one or more subsequent passes. This embodiment allows time for the material on the interior portions to cool somewhat prior to dispensing the extension regions thereby reducing the risk of the extension material remaining flowable for too long a time. For a given set of build parameters, the useable extension angles can be empirically determined by building and examining test parts.

Offsetting of pixels may be used in combination with multiple passes over a given portion of a layer so as to allow build up of material around a given geometric feature in a prescribed order and offset pattern. For example, offsetting may occur on one side of a feature such that a fraction of a pixel shift in position occurs away from that side of the feature, while a different offset might be used so that the same fractional shift might be obtained in the opposite direction on the opposite side of the feature.

An alternative to offset pixelling is simply to build objects using higher resolution data and associated build patterns or styles that yield the desired drop density which may be less than that provided inherently by the data but which still may yield formation of solid structures or other desired features.

Scan Line Interlacing:

Interlacing is another technique that can be used to enhance object formation. As with all other embodiments disclosed herein, the embodiments of this section are combinable with the other embodiments disclosed herein. As discussed previously, if the head is not oriented at the saber angle, the spacing between the jets is not equal to the desired resolution and thus is not equal to the desired spacing of main scanning or raster lines. As such, by its nature, a form of main scan line interlacing must be used if it is truly desired to deposit material along all main scan lines. However, additional interlacing may be done for a number of reasons (e.g. to enhance layer cooling and/or material build up).

A variety of scan line interlacing patterns can be used, whether or not the print head is oriented at the saber angle, whether or not the preferred raster scanning technique is used, whether or not a vector scanning technique is used, whether or not some other scanning technique or combination technique is being used.

In one preferred embodiment, as previously described, the head is oriented perpendicular to the main scanning direction and a resolution of 300 scan lines per inch is used. In this configuration successive jets are spaced $8/300$ of an inch apart. The head is made to perform 8 main scans, the first 7 of which are followed by a secondary scan of width equal to the spacing between the raster lines (raster width), and the eighth of which is followed by a secondary scan of width equal to the effective head width plus the raster width. Repetitions of the above scanning pattern are made until the width incremented in the secondary scanning direction has equaled or exceeded the width of the building region.

Alternative embodiments could limit the X range of main scanning to that which is sufficient to effectively cover the working region required by the object, by the particular object cross-section being scanned, by each segment of the object length required to make the 8 closely spaced main scans, or by other schemes which lead to a reduction in scanning time. Similarly, the positioning along the secondary scanning axis could likewise be limited to the width and position of the object, cross-section being scanned, particular portion of a cross-section being scanned, or the like. In preferred embodiments, the use of randomization may increase the amount of indexing needing to be performed so that the appropriate jets may trace the appropriate main scan lines. Other embodiments may limit the main scanning to paths which actually include active drop locations.

Figure 11A:
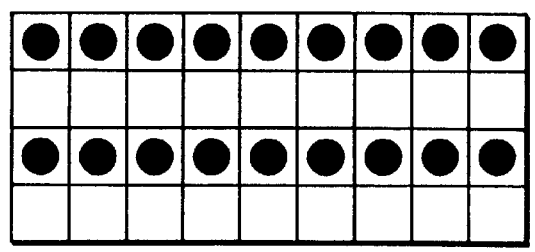
FIGS. 11a and 11b illustrate an example of scan line interlacing.
Figure 11B:
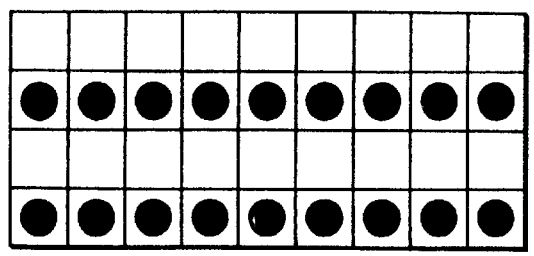
Figure 22A:
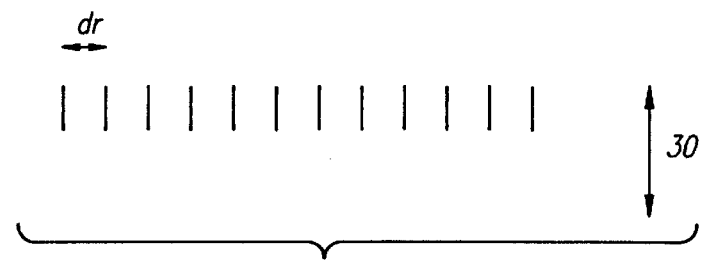
FIGS. 22a–d depict an interlacing embodiment for depositing material during the building of an object.
Figure 22B:
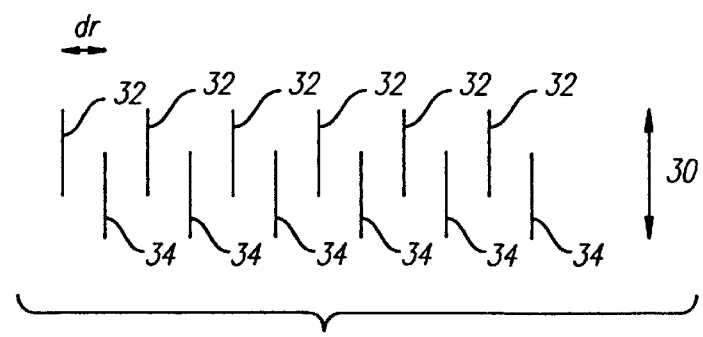
Figure 22C:
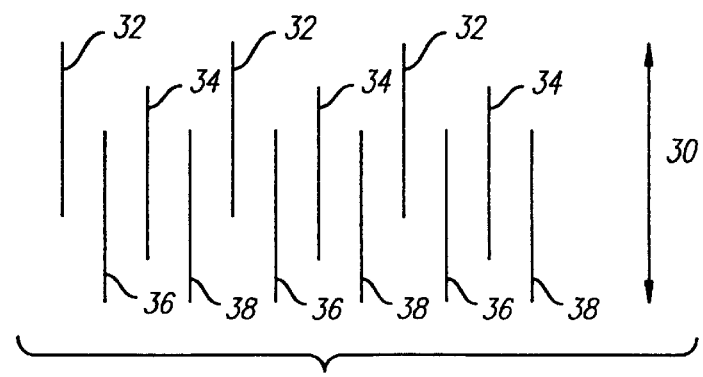
Figure 22D:
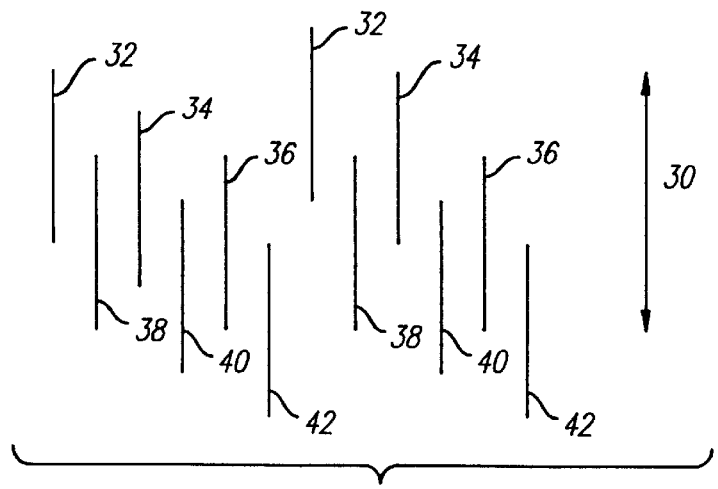

As a first preferred alternative interlacing technique non-adjacent scan lines would be left unexposed after at least a first pass whereafter on one or more subsequent passes the intermediate lines would be exposed. In other preferred embodiments, it is desired that intermediate raster lines be drawn prior to depositing material on either adjacent raster line or after depositing material on both adjacent lines. Examples of this type of embodiment are depicted in FIGS. 11a, 11b, and 22a–22d. FIGS. 11a and 11b depict the situation wherein every other line is skipped on a first pass. FIG. 11a depicts four scanning lines wherein two lines are to be exposed (i.e. the drop locations to be used) on a first pass. FIG. 11b depicts the same four scanning lines wherein the other two lines are to be exposed (i.e. the drop locations to be used) on a second pass. Further examples of interlaced patterns are shown in FIGS. 22a–22d. In these figures two headed arrow 30 represents the main scanning direction, spacing $d_r$. represents the spacing between successive raster lines, and for clarity, the beginning points and end points of the lines are shown offset although in practice the lines would have the same beginning and ending points. FIG. 22a depicts a series of raster lines to be scanned in the main scanning direction. FIG. 22b depicts first raster lines 32 to be exposed on a first pass and second raster lines 34 to be formed on a second pass according to the example of FIGS. 11a and 11b. FIG. 22c depicts raster lines 32, 34, 36 and 38 to be exposed on first, second, third and fourth pass, respectively. FIG. 22d depicts raster lines 32, 34, 36, 38, 40, and 42 to be exposed on first, second, third, fourth, fifth and sixth pass, respectively. In the example of FIG. 22d other raster line scanning orders could also be used while still ensuring that when intermediate lines are deposited they are either not bounded on either side or that they are bounded on both sides by previously deposited adjacent raster lines. For example, other useful scanning orders might be 32, 34, 38, 36, 40 and 42; 32, 36, 34, 40, 38 and 42; or the like.

In one preferred system, to fully implement these embodiments in a generalized manner using a minimum number of passes, an odd number of raster lines would need to exist between the line scanned by one of the jets (e.g. a first jet),and the line scanned by an adjacent jet (e.g. a second jet). In other words, the number of dr spacing between successive jets would have to be even; thereby requiring that two adjacent jets must be positioned so as to scan raster lines M and M+N where M and N are integers and N is even. In the case where the spacing between the jets is not appropriate (e.g. not even), it is always possible to scan only appropriate raster lines (e.g. those associated with every other jet) in a first pass and then to expose the remaining scan lines in one or more subsequent passes. As the width of deposition may be significantly wider than the raster line spacing, other preferred embodiments might not be based on the skipping of every other scan line on a first pass, but instead be based on the selection of scan lines for deposition (i.e. exposing) on the first pass such that the lines of deposited material do not directly contact each other and then filling in any skipped raster lines on one or more subsequent exposures.

This first alternative interlacing technique can be fully or approximately implemented even when the adjacent jets are inappropriately positioned for the desired scan line resolution (i.e. the jet positions and scan line resolution are such that an even number of raster lines exist between the line scanned by one of the jets and the line scanned by an adjacent jet). This may be accomplished in at least three ways: 1) each jet is used to scan every other raster line between its initial position and the position of the line initially formed by the adjacent jet except at least two adjacent raster lines to be scanned by each jet will be left unexposed until at least a second pass when the remaining raster lines will be exposed; 2) each jet is used to scan every other raster line until it also scans the raster line adjacent to the first line scanned by the adjacent jet whereafter the remaining unexposed lines will be selectively exposed in a second pass; and/or 3) only every other jet is used in the scanning process thereby ensuring that an odd number of raster lines exist between any two adjacent jets. In these embodiments, as well as the previous embodiments, it is preferable to expose alternating lines for the whole layer prior to beginning a second pass to expose the interimediate lines; however it is possible to complete the exposure of all scan lines between the starting points of some or all of the adjacent jets prior to making even a first pass over other portions of the layer.

Numerous other interlacing embodiments will apparent to those of ordinary skill in the art who study this disclosure. For example, interlacing with higher numbers of passes can be used or interlacing wherein some contact occurs between lines exposed on a first pass. Of course any combination of interlacing with the previously described randomization techniques could also be used. Further exposure of a subsequent layer may change the order of scanning the various sets of lines and/or the scanning directions of the lines themselves (e.g. reverse the order of scanning of the first, second, and higher order sets). Further embodiments might involve the completion of interlacing exposures for a first layer while exposing regions during formation of one or more subsequent layers.

Figure 12A:
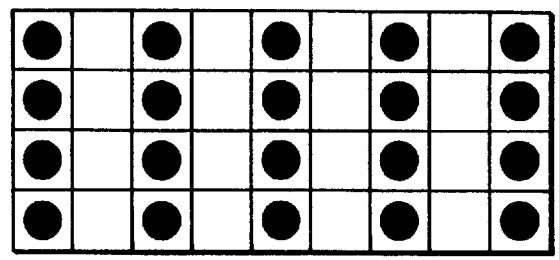
FIGS. 12a and 12b illustrate an example of drop location interlacing along several scan lines.
Figure 12B:
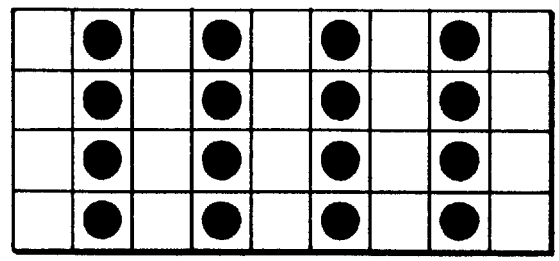

Drop Location Interlacing:

As with scan line interlacing, object formation may utilize drop location interlacing along individual scan lines. In this case, each scan line would be exposed by at least two passes wherein a first pass would expose a number of drop locations and, whereafter, on one or more subsequent passes, the remaining drop locations would be exposed. As a two step (i.e. pass) example, on a first pass every other drop site would be exposed while on a second pass the intermediate drop sites would be exposed. This situation is depicted in FIGS. 12a and 12b. FIG. 12a depicts four scanning lines each with 9 drop locations wherein every other drop location is to be exposed on a first pass while FIG. 12b depicts the same lines and locations but instead depicts that only complementary drop locations are to be exposed on a second pass. As a second two step example every third site may be exposed on a first pass while on a second pass both the intermediate sites, there between, would be exposed. As a three step example, a first pass might expose every fifth site beginning with the first site, then on a second pass every fifth site would be exposed beginning with the third site, and finally on a third pass every other site would be exposed beginning with the second site.

As with all other embodiments disclosed herein, the embodiments of this section are combinable with the other embodiments disclosed herein.

Figure 13A:
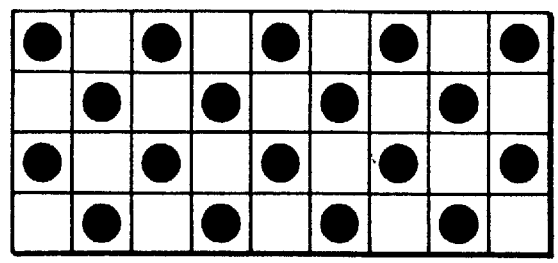
FIGS. 13a and 13b illustrate a further example of drop location interlacing along several scan lines.
Figure 13B:
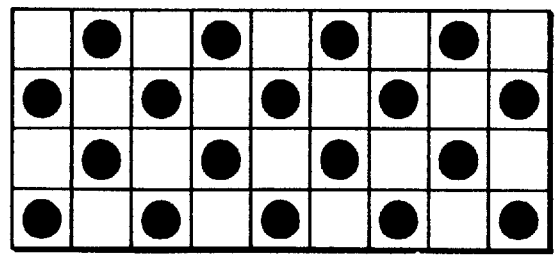

In these interlacing techniques, successive scan lines may be exposed using different or shifted interlacing patterns so that two dimensional interlacing patterns may be developed (offset pixelling could also be used). For example, a two step interlacing pattern may be used on each scan line wherein the starting points on successive lines are shifted by one pixel such that a checkerboard first pass pattern is formed. FIGS. 13a and 13b illustrate this example. FIG. 13a depicts the first pass checkerboard pattern while FIG. 13b depicts the complementary checkerboard pattern that is exposed on a second pass.

As with scan line interlacing, drop location interlacing may complete all passes over single lines prior to exposing subsequent lines though it is preferred that all lines be exposed with each pass prior to initiating subsequent passes over partially exposed lines. Furthermore, completion of all passes over portions of single lines may be achieved prior to initiating exposure over remaining portions of those lines.

A third interlacing technique involves feature sensitive interlacing. In this technique the order in which a given drop site is exposed depends on the geometry of the immediate cross-section alone or on multiple cross-section geometries. Feature sensitive interlacing may involve one or both of scan line interlacing and drop location interlacing. For example, in a single layer embodiment one may determine the boundary regions of the cross-sections and ensure that the boundary zones are exposed on a first pass. Some interior portions of the cross-section might also be exposed on the first pass or alternatively exposure of all interior portions may be delayed until one or more subsequent passes are made. For example, the interior portions may be exposed using a checkerboard interlacing pattern on a first pass in combination with all boundary regions also being exposed on the first pass. Then on a second pass the remaining interior portions would be exposed. It is also possible that a wide boundary width could be defined for exposure on a first pass so that more than a one-drop site width border may be placed around the cross-section prior to performing subsequent passes. This wide boundary region might be implemented using erosion routines such as those described above in association with Droplet Width Compensation. As an additional alternative, one may focus on ensuring that only one of scan line boundary sites or drop location boundary sites (boundaries along lines in the secondary scanning direction) are exposed on the first pass. As a further alternative, internal regions may be exposed in whole or in part prior to dispensing material in boundary regions. It is believed that dispensing boundary regions first might lead to improved build-up in the vertical direction and that exposing boundary regions last might lead to improved horizontal accuracy of the object. An even further alternative might involve the dispensing of a near boundary region initially, followed by the dispensing of deeper internal regions of the cross-section and finally followed by dispensing of the outer cross-sectional boundary itself.

Examples of a multi-cross-sectional feature sensitive interlacing technique might involve initially exposing those locations which form part of the present cross-section but which were boundary or solid internal object regions on the previous cross-section. The boundary and solid internal regions on the previous cross-section might include boundary regions and solid internal regions of support structures as well as object structures. In using this embodiment deposition in at least critical (i.e. important) down-facing object regions does not occur on the first pass unless those down-facing regions are actually supported by a structure of some nature (e.g. a support column directly below). In one or more subsequent exposures, material is dispensed to form unsupported down-facing features. Since the deposition width is typically wider than the pixel width, it is more likely that a droplet which is dispensed to land at a pixel location adjacent to previously dispensed material on that cross-section, the droplet will strike and hopefully adhere to the neighboring deposited material as opposed to continue falling downward to a cross-section below that for which is was intended. Furthermore, since in preferred embodiments support structures are typically no more than one pixel in separation, when exposure of unsupported down-facing regions occur the dispensed material will more likely be wedged between material already dispensed on the present layer as opposed to being wedged between material dispensed on a previous layer. However, since droplet diameter is typically less than deposition diameter (i.e. impacted droplet diameter) and since it may be smaller than pixel width, material deposited at an adjacent pixel location may not sufficiently extend into the path of a falling droplet so as to ensure a collision and stopping of the particle.

In another preferred embodiment, the drop locations would be shifted by a fraction of a pixel width (preferably approximately ½ a pixel width) along the main and/or secondary scanning directions (preferably both) when dispensing unsupported down-facing regions and preferably adjacent regions such that a droplet is more likely to be at least partially supported by previously dispensed material than if droplets were deposited in perfect alignment. It is preferred that droplets over partially unsupported regions be dispensed in a subsequent pass from those dispensed over fully supported regions. However, it is possible to rely solely on the overlap with the previous cross-section (and not any additional benefit associated with adhesion to material previously dispensed on the given cross-section) in ensuring reasonable vertical placement of the droplets in at partially unsupported regions. In this embodiment at least the support regions (e.g. columns) on the current layer would not be shifted. This ensures that registration from layer to layer occurs. It is further preferred that wide gaps be closed by progressively working deposition locations inward (i.e. multistage) from supported sides of the gap using multiple passes over the cross-section, wherein each pass is partially offset from the immediately preceding pass to ensure adequate overlap of droplets so as to limit any material placement beyond the required vertical level. Further, in one preferred embodiment, Simultaneous Multiple Layer Curing Techniques, as described in U.S. Pat. No. 5,999,184, are used in order to offset critical down-facing data up one or more layers so that upon deposition material forming the down-facing layer will be located at the correct level.

Figure 23A:
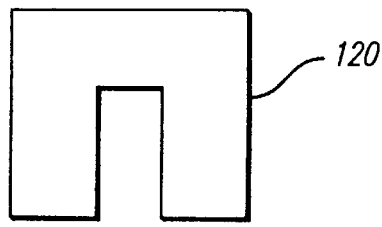
FIGS. 23a–h illustrate a building embodiment which uses horizontal and vertical pixel offsets.
Figure 23B:
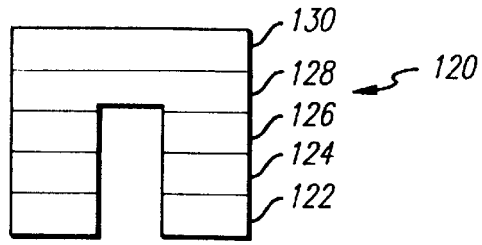
Figure 23C:
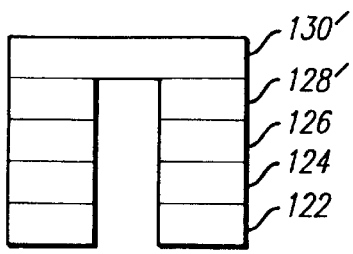
Figure 23D:
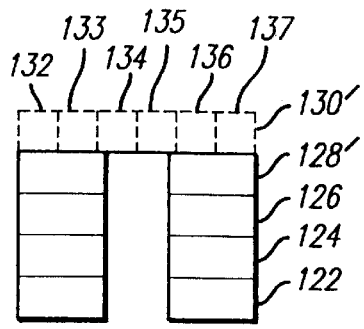
Figure 23E:
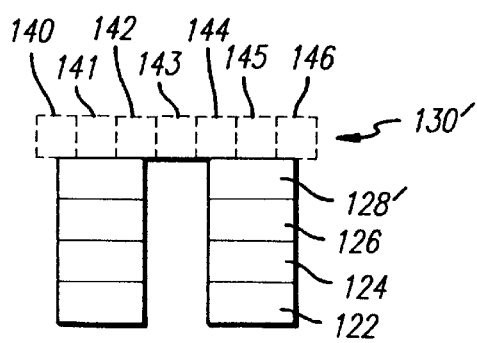
Figure 23F:
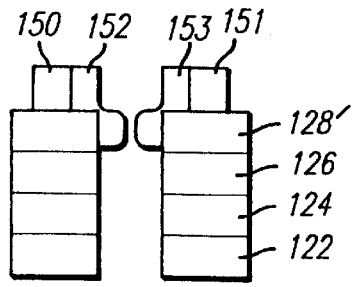
Figure 23G:
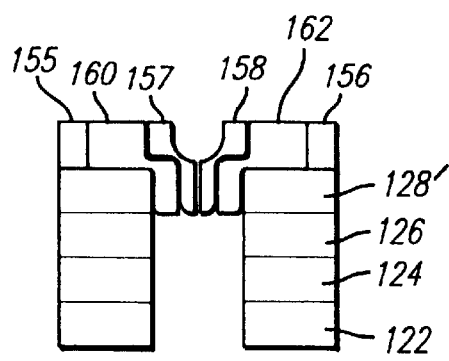
Figure 23H:
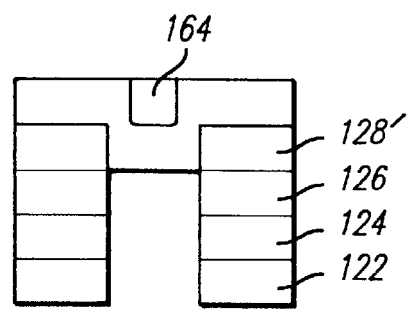

An example of this multistage horizontally and vertically offset embodiment using a ½ pixel horizontal offset and 1 layer thickness vertical offset is shown in FIGS. 23a–23h. FIG. 23a depicts a side view of an object 120 to be formed. FIG. 23b depicts object 120 as it would normally be divided into layers 122, 124, 126, 128, and 130. FIG. 23c depicts object 120 as it is to be divided into layers 122, 124, 126, 128', and 130'. Layer 128' is different from 128 in that the down-facing portion of the layer has been removed as it is anticipated that it will be created during deposition of the material on the next layer using a series of successively offset exposures. Layer 130' is similar to layer 130 except that a different deposition pattern might be used in its formation. FIG. 23d again depicts layers 122, 124, 126 and 128' but in addition depicts deposition locations, or pixel positions, 132–137 at which material may be deposited during formation of layer 130'. FIG. 23e is similar to FIG. 23d except that instead of showing drop locations 132–137, drop locations 140–146 are shown. As can be seen from the relative positions of the drop locations, locations 132–137 and 140–146 are offset from each other by ½ a pixel width. FIG. 23f depicts the deposition pattern formed from a first pass of the print head in forming layer 130'. Droplets 150, 151, 152, and 153 are deposited at drop locations 141, 145, 142, and 144, respectively. It can be seen that droplets 152 and 153 were only partially supported by layer 128' and that as a result it is assumed they will partially extend (as depicted) into the region originally belonging to layer 128. FIG. 23g depicts the deposition pattern from the first pass in forming layer 130' as well as additional material deposited in a second pass. Region 160 and 162 were deposited on the first pass and were represented in FIG. 23f as regions 150, 152, 151 and 153. The deposition on the second pass occurs according to the pixel arrangement depicted in FIG. 23d. Droplets 155 and 156 are deposited at drop locations 132 and 137. In practice, the dispensing of droplets 155 and 156 would initially result in excess material being applied over a portion of regions 160 and 162 but this excess would be trimmed off during the planarization process. Droplets 157 and 158 are deposited at drop locations 134 and 135 but since these locations are not fully bounded from below by material previously deposited, it is assumed that a portion of the material dispensed will extend downward into the region originally part of layer 128. The offset dispensing of droplets 152, 153, 157 and 158 results in the formation of the down-facing portion of layer 128 which was removed from layer 128'. In a third and final pass, droplet 164 is deposited onto drop location 143 to complete formation of layer 130'.

In other preferred embodiments various aspects to the above example could be changed. For example, the extension of material into lower layer regions (assumed to occur when droplets or drop locations are only partially supported) could take on values other than the 1 layer thickness extension described. The extension may be less than 1 layer thickness or at least different from an integral number of layer thickness. Maybe the extension would be an integral number of layer thicknesses (e.g. 2 to 5 layer thickness or more). In such a case, for most accurate formation, it would be desired to have the initial object representation transformed into a modified representation, as described in U.S. Pat. No. 5,999,184, (either before or after generation of cross-sectional data) so that when material is dispensed according to the modified representation, the bottom of the down-facing feature is properly located. Other variations might use geometry based deposition, in multiple passes, along with different offset values such as ¼ of a pixel (so that ¾ of the drop zone would be unsupported) or ¾ of a pixel (such that only ¼ of the drop location would be unsupported). These different offset amounts might lead to more control over the amounts of extension into previous layer regions. Other variations might use different deposition orders, different amounts of over printing, or even quantities of deposition per droplet. Still other variations might not use offset pixelling but instead would use higher resolution pixels, possibly in combination with deposition patterns yielding the right droplet density.

An additional interlacing technique combines: 1) feature sensitivity, and 2) selective direction of scanning when exposing object features. In this embodiment, cross-sectional geometry (e.g. cross-sectional boundary information) from a current layer and possibly cross-sectional geometry (e.g. cross-sectional boundary information) from the immediately preceding layer would be used to determine what the direction of scanning should be when exposing different regions of the cross-section. For example, when exposing the left most portion of a solid region of a cross-section it may be advantageous to be scanning the head (i.e. the jet used for exposing the line to be formed) from left to right if it is desired that the droplet not bridge or not partially bridge any small gaps. On the other hand, if it is desired that some bridging occur it may be advantageous to ensure that scanning is in the opposite direction. Similarly, when exposing the right most portion of a solid region of the cross-section it may be advantageous to be scanning from right to left (for no bridging) or from left to right (for bridging). By controlling the scanning direction when depositing boundary regions it can be ensured that horizontal momentum of the droplets either do not contribute to bridging gaps or enhance the bridging of gaps.

Figure 24A:
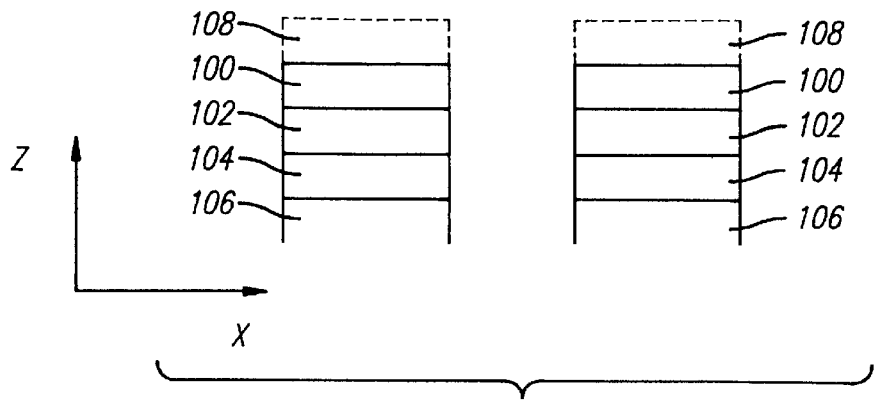
FIGS. 24a–d illustrate a deposition embodiment that reduces risk of bridging between regions separated by a gap.
Figure 24B:
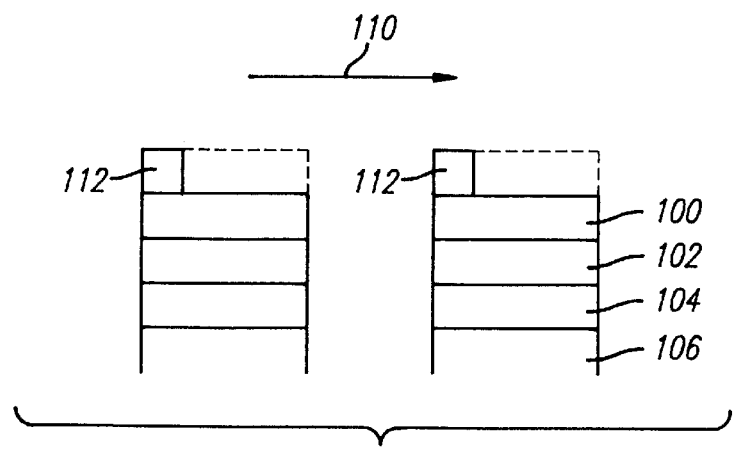
Figure 24C:
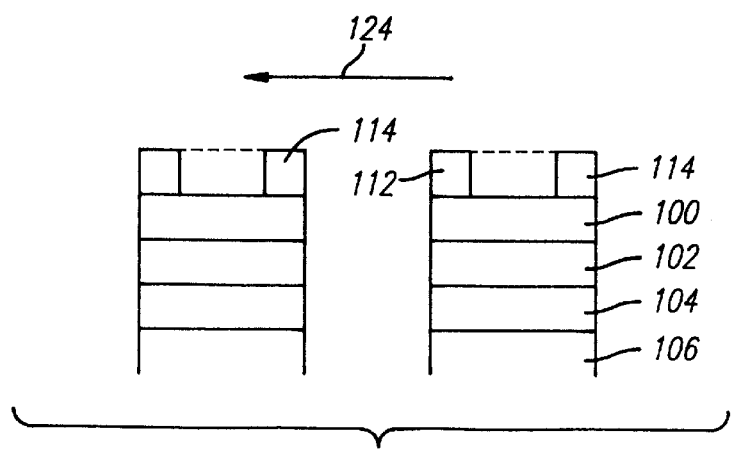
Figure 24D:
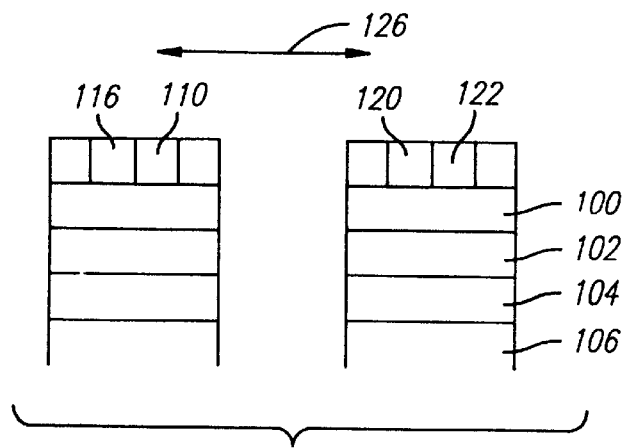

An example of the non-bridging technique is illustrated in FIGS. 24a–24d. FIGS. 24a–d depict side views of two columns as being formed and as cut in an XZ plane. The Z-direction is perpendicular to the planes of the cross-sections and the X-direction is the main scanning direction. Reference numeral 108 indicates the cross-section being formed and reference numerals 100, 102, 104, and 106 refer to previously formed cross-sections. FIG. 24a depicts cross-section 108 with a broken line as no material deposition has taken place. FIG. 24b indicates that the scanning direction 110 is to the right and that droplets 112 are deposited on the left most side of each column on a first pass. FIG. 24c indicates that the scanning direction 124 is to the left and that droplets 114 are deposited on the right most side of each column in a second pass. FIG. 24d indicates that scanning can occur in either direction 126 and that droplets 116, 118, 120, and 122 are deposited to complete the formation of the cross-section in a third pass. As opposed to the illustrated three pass embodiment, a two pass embodiment could be used wherein droplets 116, 118, 120, and 122 may have been deposited to their respective locations during one or both of the first or second passes when droplets 112 and 114 were deposited.

It is anticipated that the object could be relatively reoriented (e.g. one or more rotations about the vertical axis) with respect to the relative scanning direction of the print head (i.e. jets) so that the edges of any desired cross-sectional features can be exposed while relatively moving the print head in a desired direction to enhance or decrease the probability of bridging small gaps.

As noted above, if the orifice plate to working surface distance is too small, droplets will have an elongated shape (i.e. large aspect ratio) as they strike the working surface. In the case of building with elongated droplets, it is anticipated that the above indicated scanning directions for depositing on edges of solid features might yield opposite results from those indicated above. Other interlacing techniques might involve bi-directional printing of adjacent raster lines or non-adjacent raster lines.

The above-described building techniques can be applied to the formation of solid objects or in combination with other techniques to the formation of partially hollow or semi-solid objects. In an original design of an object, portions of the object are supposed to be solid (i.e. be formed of solidified material) and portions are supposed to be hollow (i.e. empty regions). In actuality these intended hollow (or void) regions that are not supposed to be part of the object, since by definition wherever there is object there is supposed to be material. In the context of the present invention a non-solid, hollow, or semi-solid object, is an object built or to be built according to the teachings of some preferred embodiments wherein a portion of what should be solid object has been removed. A typical example of this might be the hollowing out, partial hollowing out, or the honeycombing of what was originally a solid structure of the object. These originally solid structures are sometimes referred to as object walls regardless of their spatial orientation. Some preferred build styles form completely solid objects, while other build styles form solid surface regions of the objects but hollowed out or partially hollowed out interior regions. For example, the interior portions of an object might be formed in a checkerboard, cross-hatched, hexagonal, tiled, or honeycombed manner (these and other build styles useful herein, as implemented in photo-based stereolithography are described in the above referenced patents and applications). The above non-solid deposition patterns can be considered internal object support structures. As such the other support structures described herein can also be used as internal object support structures. Such non-solid objects would be lighter in weight than their solid counterparts, they would use less material, they might even be formed more quickly depending on the details of the specific building parameters, and they might be formed with less risk of encountering heat dissipation problems since much less heated material is deposited during their formation. These objects might be useful as investment casting patterns due to the decrease in the possibility of cracking molds.

Temperature Control:

Additional object formation embodiments involve the formation of the object wherein the partially formed object is maintained within a desired temperature range as it is being formed or is at least maintained such that the differential in temperature across the part (or the gradient of temperature difference) is small. If during object formation, the different portions of the object are allowed to be at different temperatures, the object will undergo a differential amount of shrinkage as it is cooled to room temperature or as it is brought to its use temperature (the temperature at which it will be put to use). This differential in shrinkage could lead to the development of stresses within the object and associated distortions or even fractures of the object. It is preferred that temperature differential remain within a range which is effective for maintaining object distortion within a reasonable limit. The temperature differential across the object is preferably maintained within a range of 20° C., more preferably within a range of 10° C. and even more preferably within a range of 5° C. and most preferably within a range of C. In any event, the desired temperature can be estimated by taking into consideration the coefficient of thermal expansion of the material and the differential in shrinkage (or expansion) that would occur upon cooling (or heating) the formed object to a uniform temperature. If the differential in shrinkage results in an error outside a desired tolerance range, the above mentioned ranges of temperatures can be adjusted.

In the formation of objects, the initial object data can be scaled to take into account dimensional changes in the object that will occur as the object is cooled from its jetting temperature (about 130° C. in the preferred embodiment) to its solidification temperature (about 50° C.–80° C. with a peak DSC energy transfer temperature of about 56° C.) to its build temperature (about 40° C.–45° C.) and finally to its use temperature (e.g. room temperature—about 25° C.). This scaling factor could be used to expand the initial object design by an appropriate thermal shrinkage compensation factor such that it would be appropriately sized at its use temperature. It is further anticipated that one or more geometry dependent or at least axes dependent shrinkage factors could be used to at least partially compensate critical regions of the object for expected variations in object temperature during build up.

The temperature of the previously formed lamina and the cooling rate of the lamina being formed have been found to be important parameters for the formation of objects with reduced distortion and in particular with reduced curl distortion. Presently preferred materials undergo about 15% shrinkage when cooled from their solidification temperature to room temperature. This shrinkage provides a tremendous motivation force for causing curl distortion, build up of internal stresses, and associated post processing distortions (these distortions are described with regard to photo-based stereolithography in the above referenced patents and applications wherein many of the building techniques described therein can be effectively utilized in the practice of SDM and TSL in view of the teaching found in the instant application). It has been found that if the object build temperature and in particular if the temperature of the last formed layer is maintained at a temperature above room temperature during the build process, curl distortion will be reduced. It is preferred that the temperature of the entire partially formed object be maintained above room temperature and, more particularly, that its temperature remain within a tight tolerance band due to the differential shrinkage considerations discussed above.

For effective object formation, it is apparent that the build temperature of the partially formed object must be maintained below the melting point of the material. Additionally the build temperature must be maintained below a temperature that allows the solidified material to have sufficient shear and compressional strength and even tensional strength (especially if sideways or upside down object formation embodiments are used) to allow the object to be accurately formed while experiencing the typical forces associated with the build process (e.g. inertial forces associated with accelerations the object will experience, drag forces or vacuum forces associated with the planarizer and print head contacting or passing close to the object, air pressure forces associated with any air flow used to cool the object, and gravitational forces on the object due to its own weight). Some of these forces are dependent on the mass of the object and increase with depth into the part. Thus, a slight negative temperature gradient from higher to lower layers (i.e. decrease in temperature from most recently formed layers to earliest formed layers) can supply increasing strength in needed regions while simultaneously allowing the latest formed layer or layers to be at a high enough temperature to result in minimal curl and other distortions. One might use a simple gravitational force calculation summed with an inertial force calculation for one or more positions in the part (based on the mass of the part and the Y-direction acceleration it experiences) as an approximation of the minimum shear strength needed from the solidified material. This in combination with an empirical determination of the variation of material shear strength with temperature can be used to estimate the approximate upper build temperature limit for any position in the object. Of course it is preferred that additional considerations be taken into account, especially near the latest formed lamina of the object, since dynamic thermal effects occur at the interface of the partially formed object and the material being dispensed that involve remelting phenomena and heat capacity phenomena which are dependent on object geometry parameters, temperature differentials, and cooling techniques. Thus, the actual overall maximum build temperature will probably be lower than the above estimated amount.

On the other hand, as noted above, curl and other distortions can be significantly reduced by building at elevated temperatures wherein the higher the temperature the less the distortion. It is postulated that this reduction in distortion results from a combination of the materials enhanced ability to flow at elevated temperatures and its lower ability to support shear loads which allow some material redistribution to occur thereby reducing stress which causes distortion. It is further postulated that working near, at, or preferably above any solid state phase change temperatures (e.g. crystallization temperature or glass transition temperature) will result in the quickest and potentially most significant reductions in stress and distortion. Since these phase changes typically occur over a broad range, various levels of benefit are postulated to occur depending on where the working temperature is in within these ranges and the process time allowed. Melting temperatures and/or solidification temperatures and solid state transition temperatures can be determined using Differential Scanning Calorimetry (DSC) techniques which in turn can be utilized in determining appropriate build temperature ranges. Additionally, appropriate build temperature ranges can be determined empirically. It has been determined that some benefit can be gained by working at any temperature above room temperature and it is anticipated that the closer one moves to the melting temperature and/or solidification temperature the more the benefit. Thus, the working temperature range might be set as a percentage of the distance along the temperature differential between room temperature and melting or solidification temperature or room temperature and the temperature of estimated minimum shear strength. Alternatively, the working temperature may be selected to be a temperature for which the material has a certain percentage of its room temperature shear strength. For example it might be desired to set the working (build) temperature such that the shear strength is 75%, 50%, 25% or even 10% of its maximum room temperature value.

Surface Finish Enhancement:

Additional building embodiments useful for enhancing object surface finish involve taking advantage of the aesthetically pleasing, up-facing surfaces which result from the practice of preferred SDM techniques. In these embodiments the number of effective up-facing surfaces (c.g. the overall area) is increased while the number of effective down-facing surfaces is reduced from that defined by the original object design. This involves splitting the object into two or more pieces and changing the orientation of the separated pieces such that as many critical surfaces as possible are made to be up-facing surfaces, vertical surfaces or combined up-facing/vertical surfaces whereas no truly external surfaces or only less critical surfaces remain as down-facing surfaces. These separate object components are then built independently of one another, each with the proper orientation. Then supports are removed and the resultant components combined by gluing, or the like, such that a complete object is formed primarily from up-facing and vertical surface regions. If rough surfaces are desired instead of smooth surfaces, the above technique can be used to ensure that critical surfaces are formed as down-facing surfaces. As an alternative the up-facing surfaces which are to be roughened can simply be formed with supports extending therefrom.

Figure 25A:
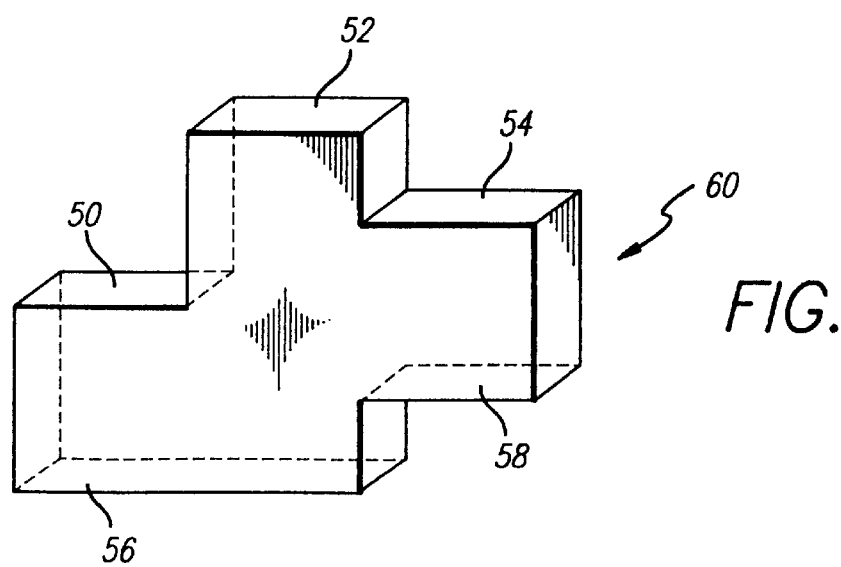
FIGS. 25a–e illustrate a building technique wherein the object is separated into pieces, built separately and then adhered together.

An example of this building technique is illustrated in FIGS. 25a–e. FIG. 25a depicts the configuration of an object 60 to be formed using SDM (i.e. the desired object design). If the object is formed directly from this design, the object will be formed with both up-facing features or surfaces (50, 52, and 54) and down-features or surfaces (56 and 58). As discussed previously, the formation of down-facing features requires the prior formation of a support structure which acts as a working surface onto which material forming the down-facing features is dispensed. After object formation and removal of the supports, it has been found that the down-facing surfaces are left with a rough and irregular surface finish. If it is desired that the down-facing surface be smooth, the object must undergo additional post-processing which may require detailed sanding or filling.

Figure 25B:
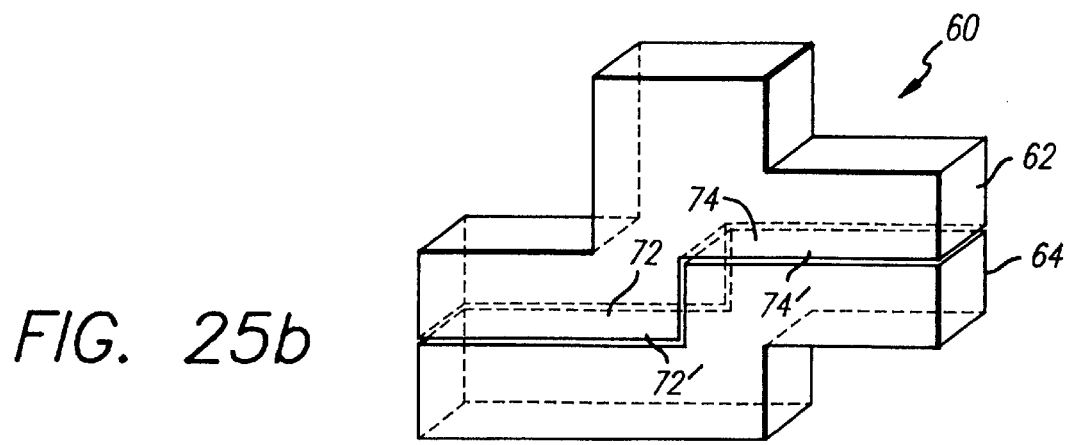

FIG. 25b depicts the first step in the practice of the above technique. This first step involves splitting the original or desired object design into two or more components. The splitting is performed so that all critical features of the object can be formed as either vertical surfaces or up-facing surfaces (preferably as up-facing surfaces and more preferably as up-facing surfaces which do not have down-facing surfaces above them so that supports will not be formed which start from and mar the up-facing surfaces). Additional details about support formation and issues associated therewith will be described further hereinafter. In the present example, all surfaces 50, 52, 54, 56 and 58 are considered to be critical and should be formed as up-facing surfaces.

FIG. 25b depicts object 60 being split into two portions 62 and 64. Portion 62 includes original outward facing features 50, 52, and 54 and new or temporary outward facing features 72 and 74. Portion 64 includes original or desired outward facing features 56 and 58 and new or temporary outward facing features 72' and 74'.

Figure 25C:
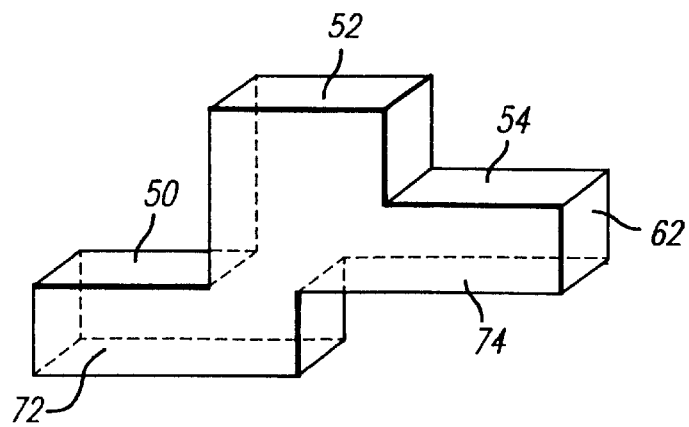
Figure 25D:
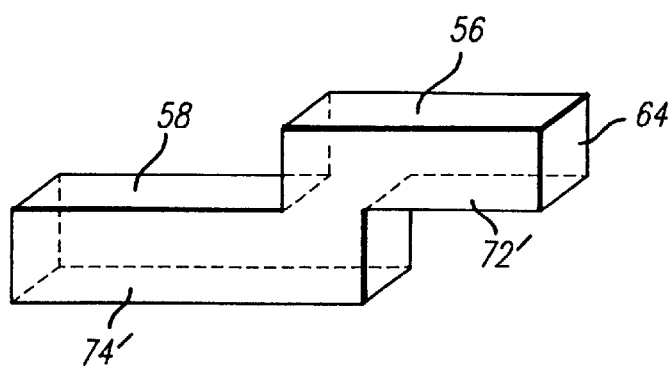
Figure 25E:
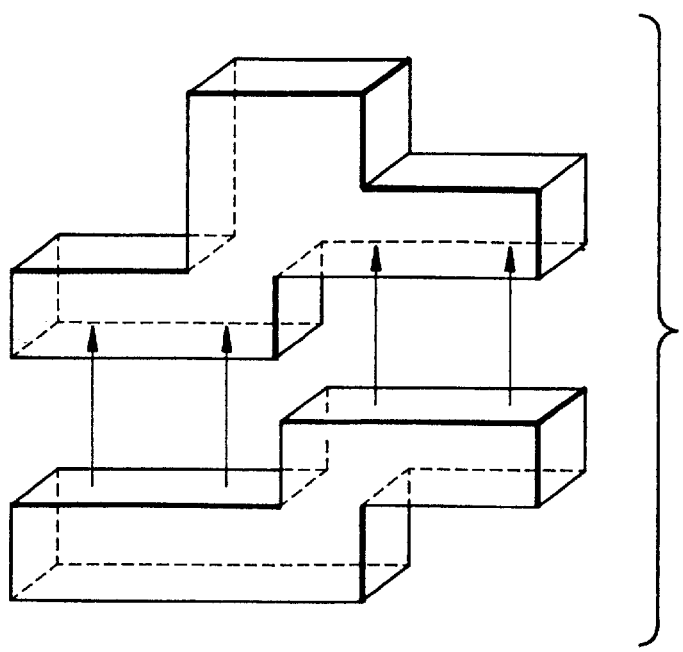

FIG. 25c depicts the preferred orientation (right side up) of portion 62 during formation so that surfaces 50, 52 and 54 are formed as up-facing features. FIG. 25d depicts the preferred orientation (upside down) of portion 64 during formation so that surfaces 56 and 58 are formed as up-facing features. After formation of each portion 62 and 64 the supports are removed and temporary pairs of surfaces 72 & 72', and 74 & 74' are prepared for mating. FIG. 25c depicts the joining of portions 62 and 64 to form object 60 wherein all critical outward facing portions (i.e. original surfaces 50, 52, 54, 56 and 58) have good surface finish.

Additional Build Styles:

Other building styles might include one or more of the following: 1) the use of higher resolution dispensing in the scanning directions; 2) the use of a higher drop density per unit area in forming down-facing skin surfaces than in forming interior regions of the object; 3) the use of down-facing skin regions which extend at least N layers (e.g., 5 to 10) above down-facing surfaces; 4) the use of a higher drop density per unit area when forming up-facing skin surfaces than in forming interior regions of the object; 5) use of up-facing skin regions which extend for at least N layers (e.g., 5 to 10) below an up-facing surface; 6) the use of higher drop density per unit area when forming boundary regions of an object than when forming interior regions, boundary regions which extend at least L drop widths (e.g., 2 to 4) into the interior of an object; and 7) forming interior regions of the object through raster scanning and boundary regions through vector scanning.

Support Styles:

The next portion of the application is primarily directed to support formation. It should be appreciated, however, that as supports are formed from deposited material, all the aforementioned building techniques are applicable to the support building process. Moreover, as will be appreciated, all aspects of the support building process are applicable to object building as well.

Support structures must serve several needs which may be opposing: 1) they preferably form a good working surface on which to build object lamina and even successive support lamina; 2) they are preferably easily removable from the down-facing surfaces they support; 3) if they start from an up-facing surface of the object, they are preferably easily removable therefrom; 4) when removed, the supports preferably cause only minimal damage to down-facing and up-facing surfaces and preferably have at least a tolerable to good surface finish on those surfaces; 5) they preferably build up at a reasonable rate per cross-section in the vertical direction (e.g. Z-direction); 6) they are preferably formed using a minimal number of passes per layer; and 7) their formation is preferably reliable. A number of different support styles have been developed or proposed which achieve different balances between these needs.

To optimize building speed, vertical accumulation is important and, as such, it is desirable to have supports build up at approximately the same rate as the object. In particular, it is preferred that the vertical accumulation of supports (e.g., from a single pass per layer) be at least as great as a desired layer thickness set by the use of the planarizer. The closer the support accumulation is to that of object accumulation, the thicker the useable layer and the less material that will be removed during planarization which thereby increases the efficiency of the building process. For a given material and apparatus, the vertical build up of material from different support and build styles can be empirically determined, as described previously, by building test parts for each deposition style or pattern using different layer thicknesses (planarization levels) and thereafter measuring the parts to determine when the build up of material lagged behind the anticipated thickness as dictated by the number of layers deposited and the expected layer thickness. From this information one can either set the layer thickness (planarization level) to an appropriate amount for a desired combination of build and support styles or one can set the required support and build styles necessary to achieve the desired layer thickness.

Some preferred support style embodiments emphasize speed of formation, maintain easy removal, but leave rough surface finish in regions where supports have been removed. This support style involves the formation of solid columns which are separated by small gaps. In particular, in a preferred system, data is supplied at 300 pixels per inch in both the X and Y directions and the object and supports are formed using four times ID overprinting in the X direction (main scanning direction). Each layer of supports includes three-by-three pixels zones where support material is to be dispensed with the columns separated by two pixels zones of no pixel defined deposition along the main scanning direction (X-direction) and one pixel zone of no pixel defined deposition in the secondary scanning direction (Y-direction). The data situation defining these pixel zones is depicted in FIG. 15a. The "X's" in the figure depict pixels which contain droplet data while the "O's" in the figure depict pixels which contain "no droplet" data. Squares 50 have been inscribed around the "X" zones so as to highlight the shape of the deposition zones. However, due to the ID overprinting in the X-direction, the two pixel gaps are actually narrowed considerably (by almost one pixel width) when actual deposition occurs. Thus, the actual resulting pattern of deposition more closely approximates 4 by 3 pixel width (12–14 mils by 9–10 mils) columns, though with rounded corners, which are separated by I pixel width gap in both X and Y (3.3 mils). This situation is approximately depicted in FIG. 18.

In the practice of building objects it has been found that supports of the above configuration accumulate at approximately the same rate as the object and thus a single pass of the head over each drop site can be used for forming both supports and object on each layer. It has also been found that the above support structure is easily separable from the object but that a poor down-facing surface finish results. Therefore, in terms of building speed, the above style is preferred, but in terms of surface finish, significant room for improvement remains.

A variant involves using multiple passes of the dispensing head to form a support portion of a cross-section. Another alternative involves periodically dispensing an extra support cross-section in order to equalize vertical material accumulation between supports and the object.

Another variant involves allowing support formation to lag behind object formation by one or more layers to eliminate or minimize planarization problems that can occur in the case where fragile supports are being built. The problem is that the planarizer can cause these supports to distort if support portions of a cross-section are dispensed during the same pass or passes as the corresponding object portion of the cross-section. By allowing a lag of one or more layers to occur, excessive contact between the supports and the planarizer can be avoided, and it is anticipated that the resultant distortion of the supports will be minimized.

Other column-like support structures are possible including columns of different dimensions or shapes. For example, data formatting and overprinting techniques could be combined to produce physical columns of approximately a 3 by 3 pixel size (9–10 mils by 9–10 mils), 2-by-3 or 3-by-2 pixel size (these may result in less vertical accumulation), 2-by-2 (6–7 mils by 6–7 mils) pixel size (probable loss in vertical accumulation rate), 4 by 4 (12–14 mils by 12–14 mils) pixel size (may be more difficult to remove and cause further damage to object surfaces), or even larger sizes. Other cross-sectionally shaped columns may also be used. These might include more circularly shaped structures (e.g. octogonal or hexagonal), cross-like structures, structures with different length to width aspect ratios, or combinations of structures that can be intermixed.

Figure 21B:
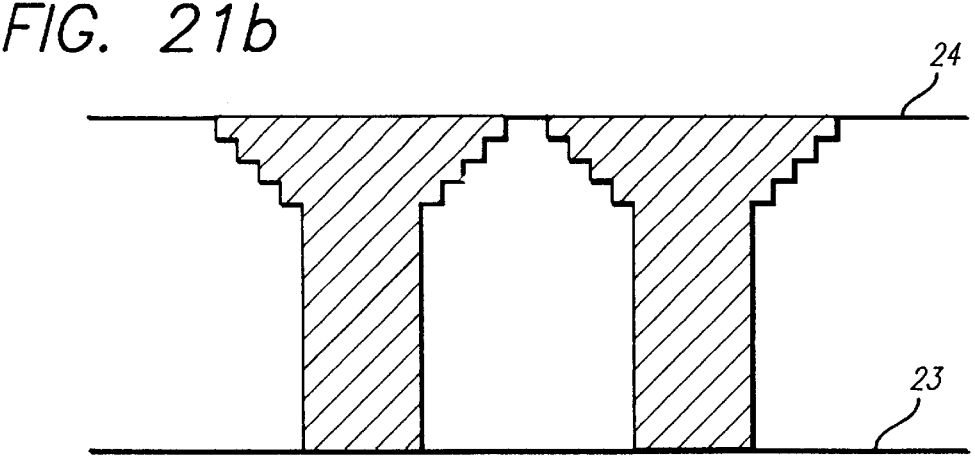

Other alternatives might include offsetting alternate support columns in one or both of the main and subscanning directions. For example, every other support column could be offset in the secondary scanning direction by ½ the separation between columns. This is depicted in FIG. 19. Wider spacing of support columns is possible, particularly if some technique, such as arch or branching supports are used to narrow the gap between the support columns prior to encountering a down-facing surface of the object. Two examples of arch-like supports are depicted in FIGS. 21a and 21b wherein different amounts of pixel offsetting (or at least drop placement control) are used).

Branching Supports:

As described at several locations herein above, some preferred embodiments utilize supports that may be described as branching supports. The arch-type supports discussed above are an example of a type of branch support. Branching or branch-type supports are support structures that are built such that portions of some lamina extend outward in a cantilever manner from solidified regions on the immediately preceding lamina. These outward extensions may be based on identical (i.e. fixed) pixel positions from layer to layer. Alternatively these outward extensions may be based on fractional pixel width shifts in pixel positions between some or all layers. Further alternatives may be based on changing pixel patterns between some or all layers. Some embodiments of branching supports produce more individual support structures at a surface to be supported than the number of support structures from which the branching supports originated at a lower layer.

Figure 28A:
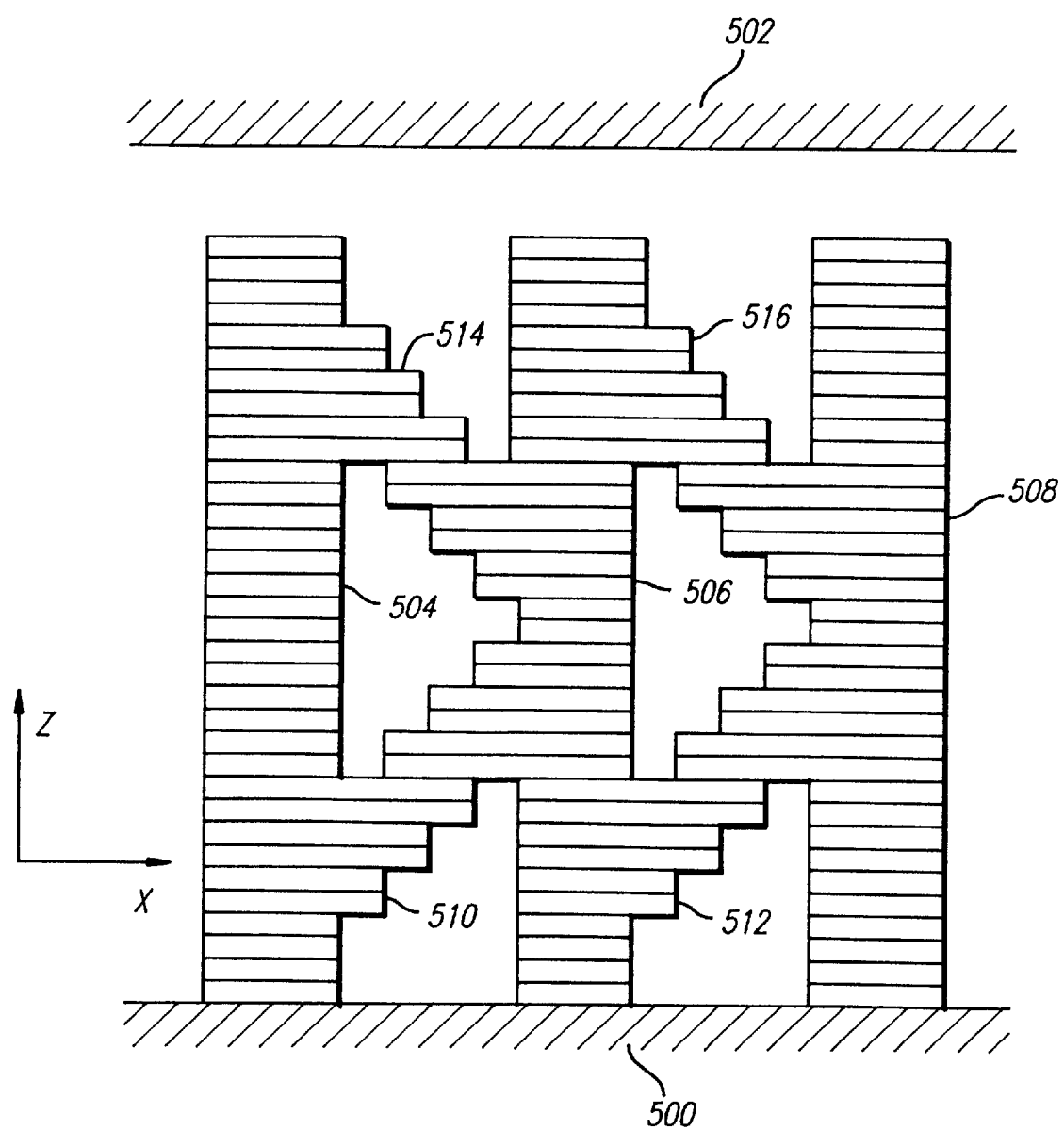
FIG. 28a depicts a side view of an embodiment of branching supports.
Figure 28B:
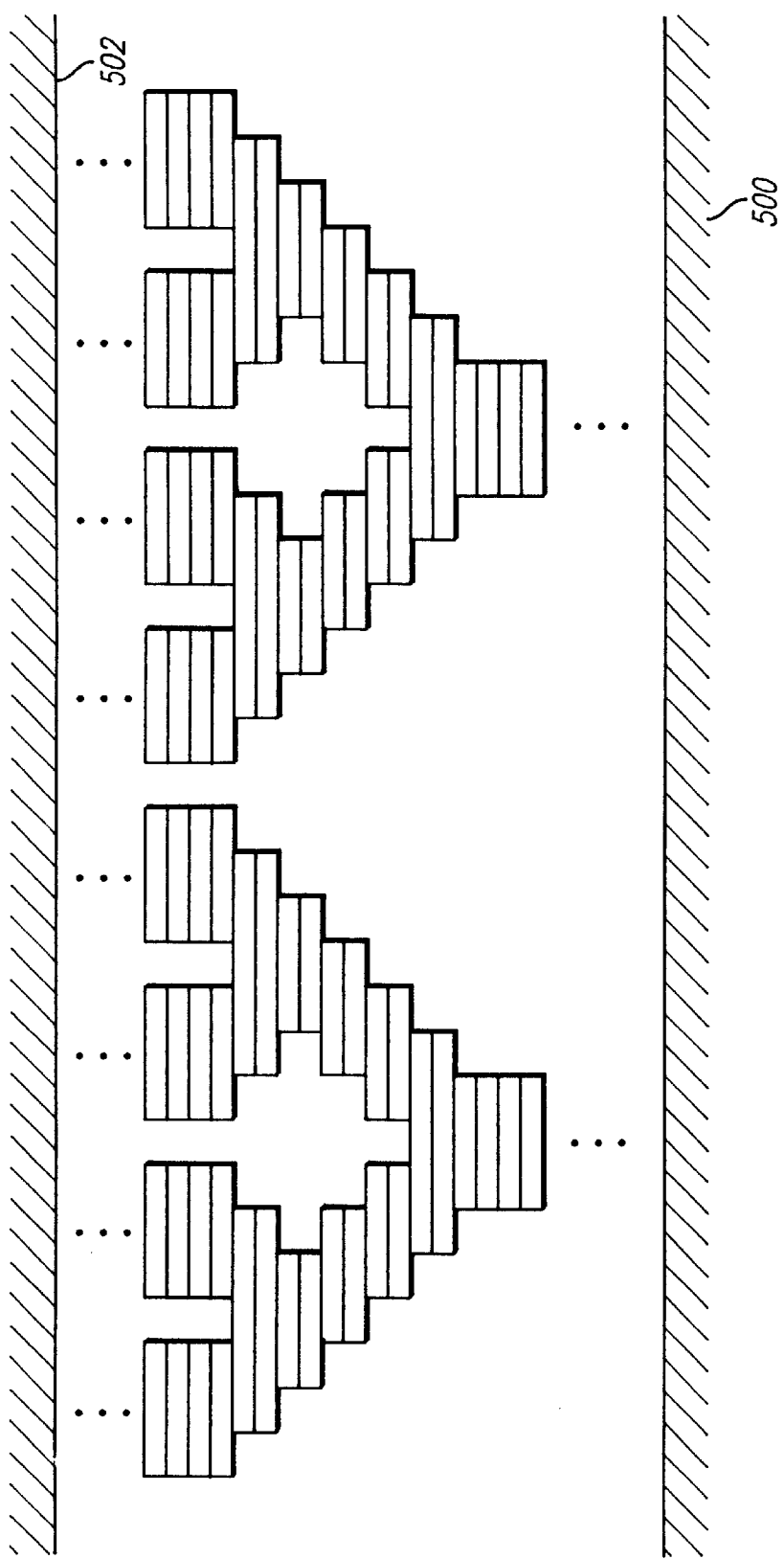
FIG. 28b depicts a side view of another embodiment of branching supports.

In addition to the various embodiments disclosed previously (which in essence can be considered branching supports), FIGS. 28a, 28b, 29a–e, 30a–m, 31a–c, 32a–d depict additional examples of preferred branching support structures. FIG. 28a depicts a side view of column supports 504, 506 & 508 starting at surface 500 and working up toward surface 502. These column supports are connected one to another by branching elements 510, 512, 514 and 516. FIG. 28b depicts a side view of an embodiment of branching type supports that work up from surface 500 toward surface 502. The supports are shown to branch every two layers. In this two dimensional view, some branching appears to occur in a two path fork-like pattern while other branches simply branch out along a single path. The same support structure depicted in FIG. 28b is looked at from a different view in FIGS. 31a–c and 32a–d.

Figure 29A:
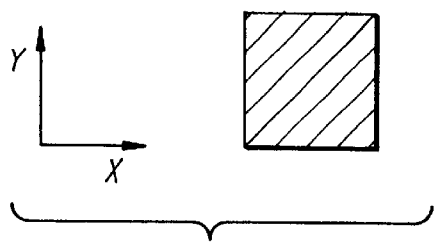
FIGS. 29a–29e depict a top view of branching layers for an embodiment of branching supports.

Other preferred branching patterns arc illustrated in the example of FIGS. 29a–e. FIGS. 29a–e depict top views of successive branching cross-sections for a single support tree that uses X only and Y only branches and results in a total of four support branches from a single support trunk. FIG. 29a depicts a single support structure that will be branched into a plurality of structures. This single support structure may be called the "trunk" of the support tree or structure. As will be made clear below, for case of data manipulation, the trunk can be considered to consist of four separate but identical components which maintain their separate identity, but may be Booleaned together to yield the scanning pattern for any given layer. Of course in practice a real region to be supported might require a plurality of these trunk elements appropriately spaced from each other.

Figure 29B:
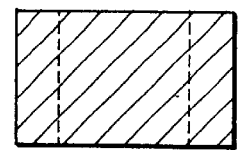

FIG. 29b depicts a first branching in the X direction. As with the other Figures to follow, the hatched solid regions, as depicted, represent the deposition regions for the instant cross-section whereas the region(s) depicted with dashed lines represent the immediately proceeding branch. This way of depicting the deposition regions is done to make the registration between branches clear. This first branching may occur after one or more trunk layers are formed. As with other branches to be described herein after in association with this figure and other figures to follow, branching may extend the dispensed material out from supported regions by a fraction of a pixel, a full pixel, or multiple pixels depending on the drawing order used, the pixel width as compared to the drop width, the number of identical layers to be formed above the present layer (which can compensate for imperfections in the present layer), ability of the material to be partially unsupported, and the like. As with some of the other branches, to be discussed herein after, this branching can be looked at as a two way branch (i.e. one way in the positive X direction and the other way in the negative X-direction) or as a one-way branch of two or more initially overlapped components. As will be seen from the description to follow, this first branch may be considered a one-way branching of four initial components wherein two components follow each branching direction. The actual deposition of material from these four components may be based on a Boolean union of the components so that multiple depositions over overlapping regions are avoided.

Figure 29C:
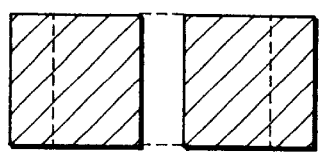

FIG. 29c depicts the next branching of the tree wherein this branching may initially occur one or more layers after the branching depicted in FIG. 29b. This branching of object components occurs in the same directions as seen in FIG. 29b.

Figure 29D:
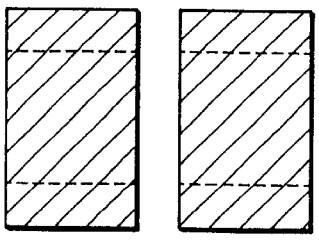

FIG. 29d depicts two branchings in the Y-direction of each of the two branches depicted in FIG. 29c. In concept, this may again be considered a single branching in the Y direction of separate components. The branching depicted in FIG. 29d is the first branch which begins the separation process of all four components.

Figure 29E:
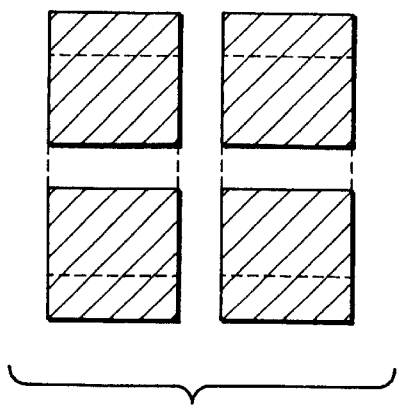

FIG. 29e depicts a final branch for this example embodiment wherein an additional Y-direction branch of each component is made. These final branches can be used to support an object surface as appropriate. If an object surface is located several layers above these final branches, the structures (e.g. columns) of FIG. 29e can be extended until the object surface is encountered. If the object surface is not at the same level for all four branches the individual columns or portions of columns can be extended as necessary. This extension of support height is similar to other preferred column support embodiments discussed herein and can include the use of bridge layers and the like. Of course if different configurations (e.g. shapes, positions, and the like) of the four column branched support is desired, modifications (e.g. modifications to branching order, branching directions, extension amounts, number of layers between branches and the like) to the depicted embodiment can be made and will be apparent to one of skill in the art in view of the teachings herein. The support trunk depicted in FIG. 29a may initially be formed on a previous object cross-section or initial substrate. Alternatively, the trunk may begin on top of another support structure such as that depicted in FIG. 28a. Furthermore, if multiple trees are to be used, branching of the trees may or may not begin on the same layer and may or may not result in each branch being formed after the same number of layers. Selection of where to beginning branching and when to make successive branches thereafter, may be based on the geometry of the object to be formed. It may be desirable to have the final branching pattern achieved, for a particular tree, several layers before first encountering a surface to be supported (e.g. down-facing object surface). The branching routines performed in association with the example embodiment illustrated in FIGS. 29a–29e may outlined in the following table:

| Component #1 | Component #2 | Component #3 | Component #4 |
|---|---|---|---|
| Build without branching for a desired number of layers (FIG. 29a) | | | |
| Branch in the +X direction by desired amount A (FIG. 29b) | Branch in the +X direction by desired amount A (FIG. 29b) | Branch in the −X direction by desired amount A (FIG. 29b) | Branch in the −X direction by desired amount A (FIG. 29b) |
| Build without branching for a desired number of layers | | | |
| Branch in the +X direction by desired amount A (FIG. 29c) | Branch in the +X direction by desired amount A (FIG. 29c) | Branch in the −X direction by desired amount A (FIG. 29c) | Branch in the −X direction by desired amount A (FIG. 29c) |
| Build without branching for a desired number of layers | | | |
| Branch in the +Y direction by a desired amount A (FIG. 29d) | Branch in the −Y direction by a desired amount A (FIG. 29d) | Branch in the +Y direction by a desired amount A (FIG. 29d) | Branch in the −Y direction by a desired amount A (FIG. 29d) |
| Build without branching for a desired number of layers | | | |
| Branch in the +Y direction by a desired amount A | Branch in the −Y direction by a desired amount A | Branch in the +Y direction by a desired amount A | Branch in the −Y direction by a desired amount A |
| Build without branching until a new support style is implemented or until a surface of the object is encountered | | | |

As desired, the various parameters outlined in the above table can be modified. For example the Branching amounts where taken as an amount "A". As appropriate, this amount can vary with different branching levels or it can even vary for different components during the same branching level.

Figure 30A:
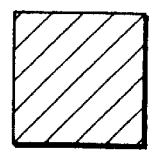
FIGS. 30a–30m depict a top view of branching layers for another embodiment of branching supports.
Figure 30B:
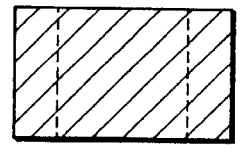
Figure 30C:
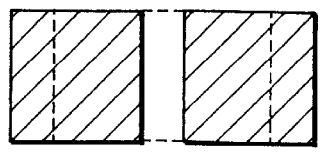
Figure 30D:
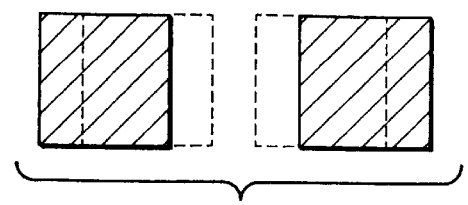
Figure 30E:
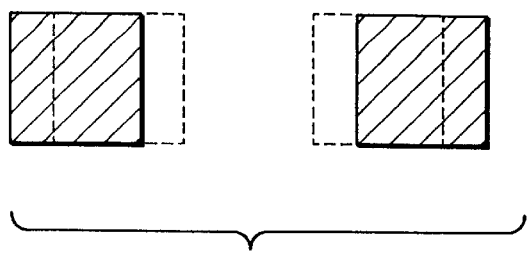
Figure 30F:
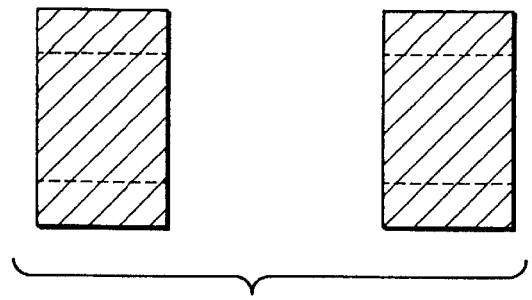
Figure 30G:
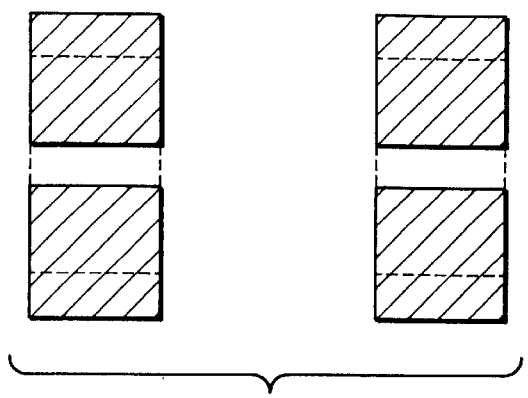
Figure 30H:
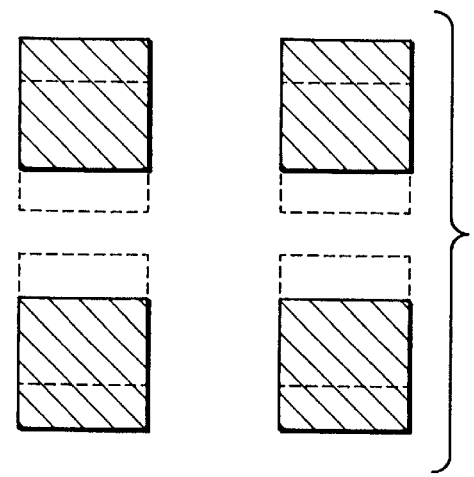
Figure 30I:
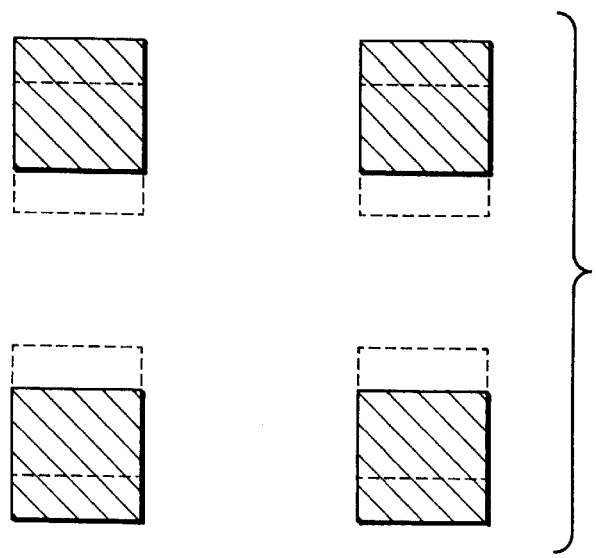
Figure 30J:
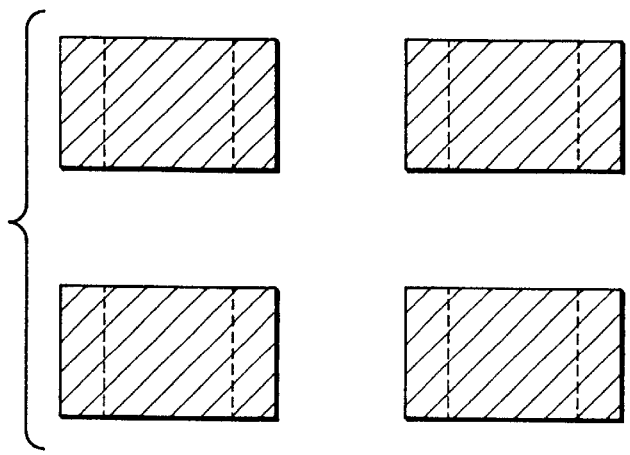
Figure 30K:
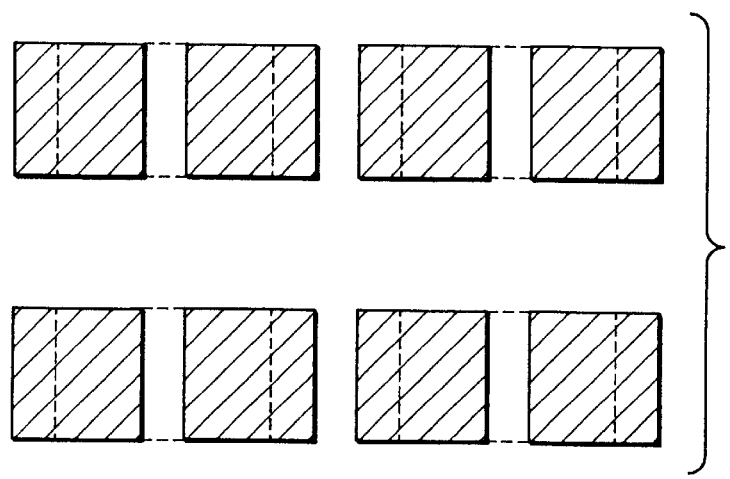
Figure 30L:
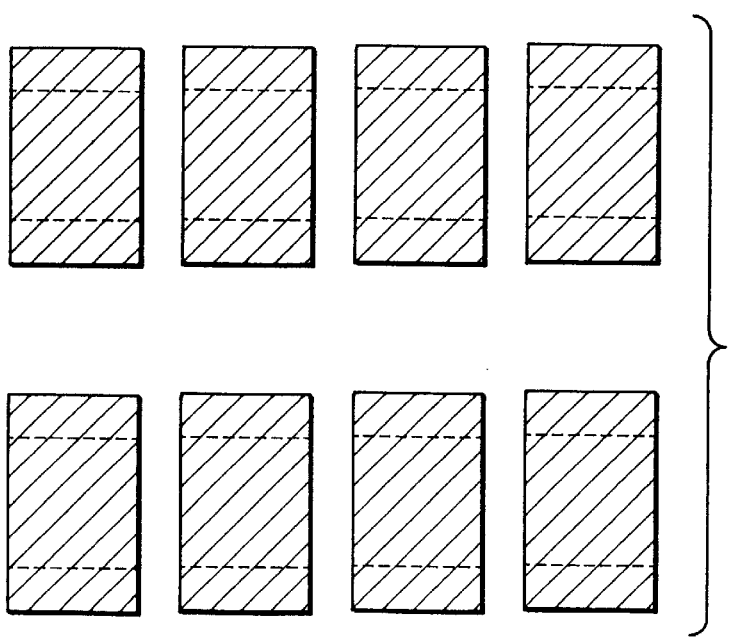
Figure 30M:
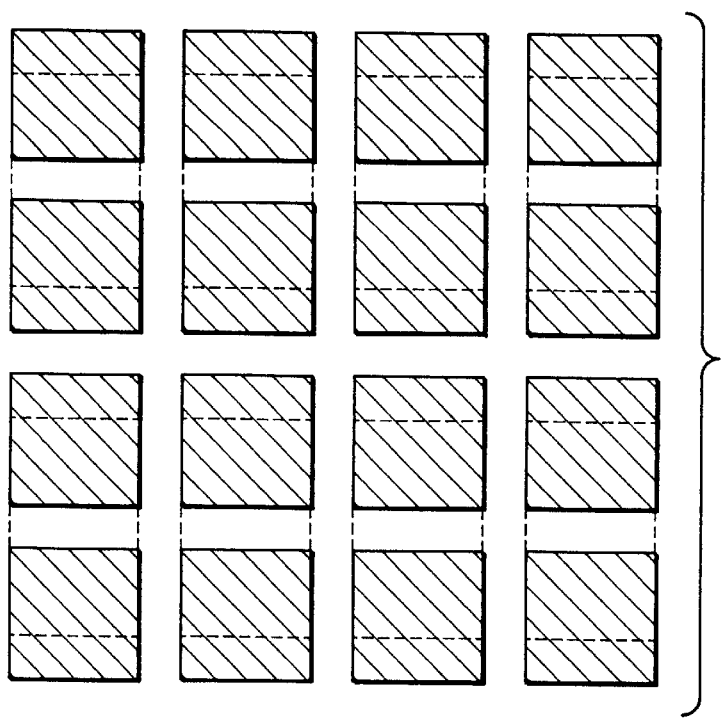

FIGS. 30a–30m depict an analogous branching support embodiment to that of FIGS. 29a–29e with the exception that the single trunk depicted in FIG. 30a will give rise to 16 branches as indicated in FIG. 30m. For ease of understanding and possibly implementation, the trunk shown in FIG. 30a can be considered as consisting of 16 individual but identical components. Again, the offset is performed along only one of either the X or the Y directions during a given branching operation for a given component. All the considerations noted above in describing FIGS. 29a–e can be applied to the example embodiment depicted in these Figures as well as the example embodiments to follow.

Figure 31A:
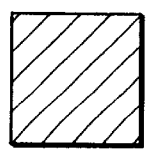
FIGS. 31a–31c depict a top view of branching layers for another embodiment of branching supports.
Figure 31B:
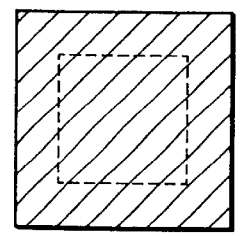
Figure 31C:
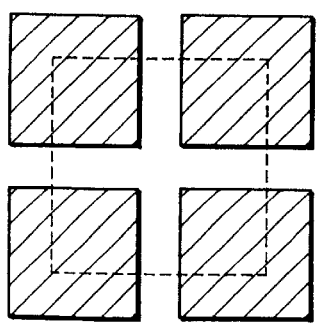
Figure 32A:
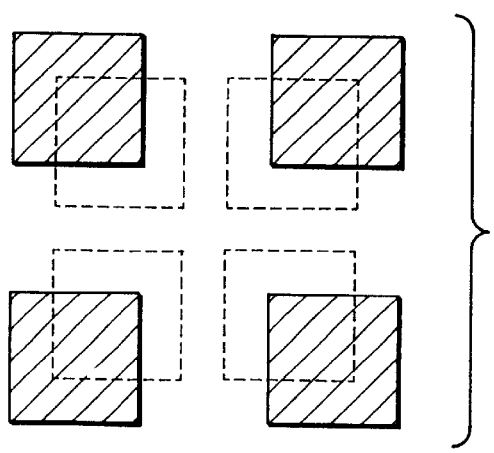
Figure 32B:
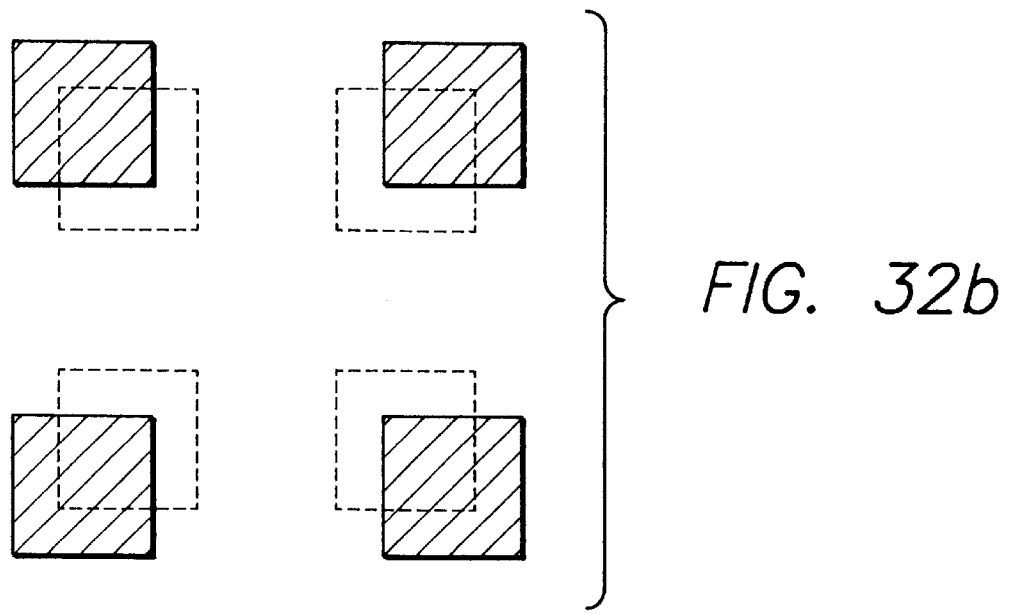
Figure 32C:
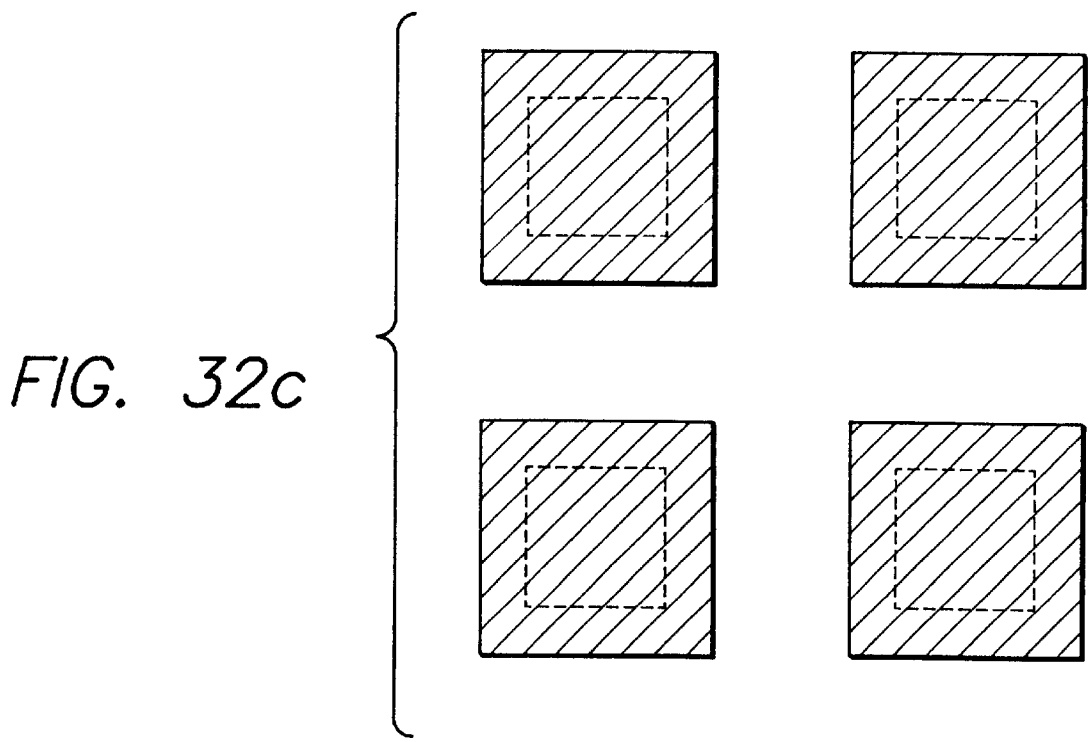
Figure 32D:
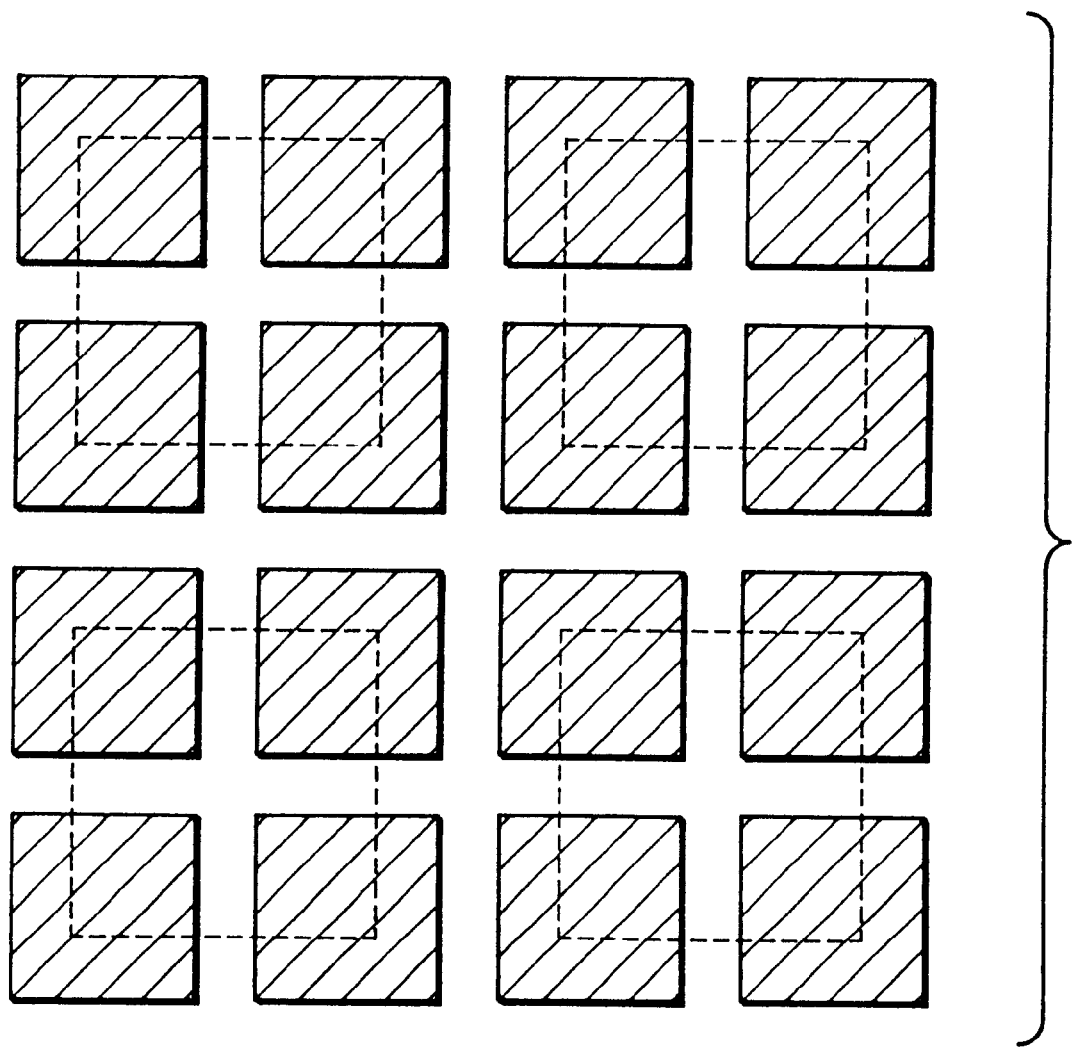

FIGS. 31a–c depicts an additional example embodiment wherein a single trunk, as depicted in FIG. 31a, is branched into four elements, as depicted in FIG. 31c. This embodiment differs from that in FIGS. 29a–29c in that branching occurs simultaneously in both the X and Y directions. As illustrated, the extent of branching is the same in both the X and Y directions but this extent of branching could be varied between these directions.

FIGS. 32a–32d continues the embodiment depicted in FIGS. 31a–31c to yield 16 separate branched supports. These Figures further illustrate the Structure depicted in FIG. 28b wherein two layers for each branch are depicted.

In other preferred embodiments other branching patterns are possible. For example, instead of yielding rectangular arrays of branched supports from individual trunks, as depicted in the above described examples, hexagonal arrays, triangular arrays, semi-circular arrays, or the like may be formed. If the achieved patterns do not fit nicely together, it may be desirable to use a mixture of patterns which are alternated in an appropriate fashion to give a good fitting or meshing of the final support structures such that a down-facing surface can be adequately supported. Other preferred embodiments may use multiple trunks for supporting single groups of branching supports.

It is anticipated that these branching support embodiments might yield better down-facing surface than achieved with some of the other preferred embodiments since it is believed that the final support structures that contact the object will be more uniformly spaced. As noted above, the branched support embodiments described herein might be a part of a larger support structure or hybrid support structure. Other modifications to the above embodiments will be apparent to one of skill in the art after studying the teachings herein.

If the geometry and direction sensitive interlacing techniques described above are used it may be possible to build smaller diameter and/or more closely spaced structures to provide a better working surface while still providing reasonable vertical accumulation rates.

In the preferred embodiment, deposited drop diameter is approximately the same as the preferred pixel diameter (about 2.9–3.4 mils). In general, however, the pixel separation between suppolts (e.g. separation between support columns) is less critical than the separation relative to the falling drop diameter (e.g. 2 mils) and impacted (or deposited) drop diameter. Preferably the horizontal spacing between supports (e.g. support columns) is less than 6 drop diameters on the layer immediately preceding the layer containing the down-facing surface to be supported. More preferably, the spacing is less than 3 falling drop diameters, and most preferably, the spacing is less than 1 to 2 falling drop diameters.

It has been found useful to include periodic bridging elements between the support columns to limit their ability to shift from their desired XY positions as they grow in height. Typically the smaller the diameter of the support columns the more often bridging elements or layers are needed. These bridging elements may extend one or more layers in height. In the preferred embodiment, it has been found that a single layer (1–2 mils) of bridging elements is not completely effective and that more than five layers (5–10 mils) makes the overall support structure too rigid. Thus, when using the preferred 3 by 3 pixel supports, bridging layers are preferably between 2 layers (2–4 mils) and 5 layers (5–10 mils) II height and most preferably 3 layers (3–6 mils) in height. Furthermore, it has been found that the bridging layers are preferably repeated every 75 mils to 2 inches, more preferably every 100 to 300 mils, and most preferably every 100 to 200 mils. For use with other materials, building parameters, or building conditions, formation and analysis of test parts can be used to determine the effective bridge thickness and separations thicknesses.

When bridging layers are periodically used they may bind all support columns together or they may bind only a portion of them together wherein the other columns were bound on a previous use of bridging or will be bound on a subsequent use of bridging. In other words, the bridging elements may form a solid plane of deposited material or alternatively they may form only a partially solid plane (e.g. a checkerboard pattern) which connects some of the columns together. The support columns may or may not be shifted from their previous XY positions when they are restarted after formation of bridging layers.

Figure 14:
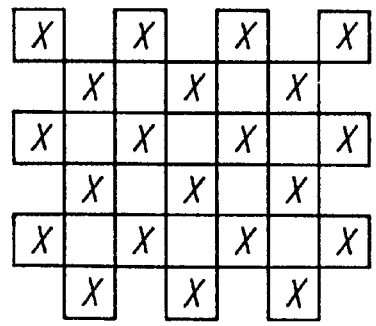
FIG. 14 illustrates a single pixel checkerboard deposition pattern.

Another preferred support structure which emphasizes easy removal and good down-facing surface finish over speed of object production is known as a checkerboard support. The cross-sectional configurationl of this support structure is depicted in FIG. 14. Along each raster line, deposition occurs using every other pixel (300 pixels/inch) and in adjacent raster lines the deposition pixels are shifted along the line by one pixel width. One preferred version of this support does not use ID overprinting, but can use DD overprinting or multiple exposures to increase deposition per layer. Without DD overprinting or multiple exposures, the layer thickness when using this type of support in the preferred embodiment islimited to under 0.4 to 0.5 mils, instead of the approximately 1.3 mils obtainable with some preferred embodiments described previously. Instead of using DD overprinting or multiple exposures with these supports, it is possible to not use the preferred ID overprinting of the object, and simply deposit material in thinner layers (e.g. 0.3 to 0.5 mils per layer). Overprinting of the object does not need to be utilized as the extra material would simply need to be removed during the planarization step. Since raster scanning is used and since the speed of forming a layer is the same with or without overprinting, build styles according to these techniques are approximately 3 to 4 times slower than equivalent build styles where four times overprinting are used. Though there is a significant increase in build time the improvement in surface finish may warrant its use under certain circumstances.

When building checkerboard supports, regular use of bridging layers is preferred (e.g. every 30 to 100 mils of z-height) to ensure column integrity. The bridging layers should comprise a sufficient number of layers to ensure their effectiveness (e.g. about the same thickness of the bridging layers discussed above). A drop-on/drop-off checkerboard pattern (in terms of drop width) is where the solidified elements are 1 drop wide (deposition width), and spacing between the center points of successive elements is greater than 1 drop width but less than 2 drop widths.

Line supports (in terms of drop width) comprise line elements which are approximately one impacted droplet diameter in width, where the spacing between elements tangential to the orientation of the lines is less than 1 drop width (i.e. overlapping), while the spacing between elements perpendicular to the line orientation is greater than 1 drop width. Preferably, the spacing between elements perpendicular to the line orientation is also less than 2 drop widths.

N-by-N column supports (in terms of pixels) are N-on, preferably one or two-off in the main scan direction, and N-on, and preferably l-off in the index direction. The width of the columns and spacing( therebetween can be calculated based on a knowledge of the pixel spacing, the drop diameter and any overprinting used. The preferred spacing between deposited material in adjacent columns is under one to two droplet diameters.

Another possible support style involves the use of solid or periodically broken lines which are preferably less than 3 pixels wide (less than 10 mils) and more preferably 1 to 2 pixels or less in width (less than 3.3 to 6.6 mils) and are separated by 1 to 2 pixels or less of undeposited material (less than 3.3 to 6.6 mils). These supports may run along the main scanning directions, secondary scanning directions, or other directions. Another type of support is curved line supports which follow the boundary of an object. Alternatively, the support pattern can differ at different areas of the cross-section. It can also be displaced from the boundary of the object by N pixels (or drop widths) in the scan direction, or M pixels (or drop widths) in the index direction.

Some other alternatives involve building supports from a different material than used to form the surface or boundary regions of the object. Other alternatives might use a different support material only on one or more of the layers adjacent to the object.

Hybrid Supports:

Further types of support structures useful for Selective Deposition Modeling are Hybrid Supports. In its simplest sense, a hybrid support is a support structure that includes at least two different types of support structures. Preferably, the structures used in a hybrid support vary depending on the height of the support and, more particularly, the structure at any given point may depend on the distance from that point to an up-facing and/or down-facing surface of the object. In other words, the support structures are tailored to the most appropriate structure based on the distance to the object. In an exemplary embodiment, the support pattern is changed when the point is located a predetermined number of layers (e.g., 4 to 9) below a down-facing surface. In another, the drop density per unit area or drop density ratio (defined as the drops to non-drops per unit area ratio) of the supports is decreased as a down-facing surface is approached. In a variant of these embodiments, one or more layers of shelving (or intermediate) layers are used when transitioning from higher to lower drop density ratio support structures.

In still another exemplary embodiment, the drop density ratio is increased as an up-facing surface is left (e.g., 4 or more layers away from an up-facing surface). In an optional variant of this embodiment, one or more layers of shelving (intermediate) layers are used when transitioning from lower to higher drop density ratio support structures. It is also conceivable that support structures could vary not just based on vertical distance from the object but also based on horizontal distance as well. For example, when horizontally bordering the object, a different type of support may be useful than when some distance away from the object.

An example Hybrid support is depicted from the side in FIG. 20. As shown, the structure extends from surface 23, which may be the building platform, or which may be an up-facing surface of the object being built, to support down-facing surface 24. As depicted, the support structure consists of five components: (1) thin, fiber-like columns 25 which contact surface 23 (if surface 23 is not an up-facing surface of the object this component of the support structure can be eliminated); (2) more massive columns 26 situated on top of the fiber-like columns 25; (3) intermediate layers 27 (i.e. a final bridging layer); (4) thin, fiber-like columns 28 situated on top of the intermediate layers and which directly contact down-facing surface 24; and (5) bridging layers 29 which are used to fuse two or more of the massive columns together and which are distributed at various places amongst the columns 26.

The thin columns 25 and 28 are both 1 pixel in cross-section (3.3×3.3 mils) and form a "checkerboard" pattern as shown in FIG. 14a. The result is a series of thin, fiber-like columns which are spaced by I pixel from adjacent columns, and which easily separate from surfaces 23 and 24. These are equivalent to the checkerboard supports discussed above. Based on the one-pixel on, one-pixel off deposition pattern of these supports the drop density ratio is approximately 1. If the support does not start on an up-facing surface of the object columns 25 can be skipped.

Columns 25 and 28 should be between 3 mils and 15 mils in height and preferably about 4–6 mils in height. The height should be held to a minimum since it is desired that these supports be used in combination with an object which is being formed with 4 times ID overprinting and since when using a single pass on these support structures without overprinting they accumulate at a much slower rate than the object. On the other hand, it is desired that these supports have some height since the needlelike elements tend to melt down when the down-facing surface of the object is dispensed onto them.

Figure 15:
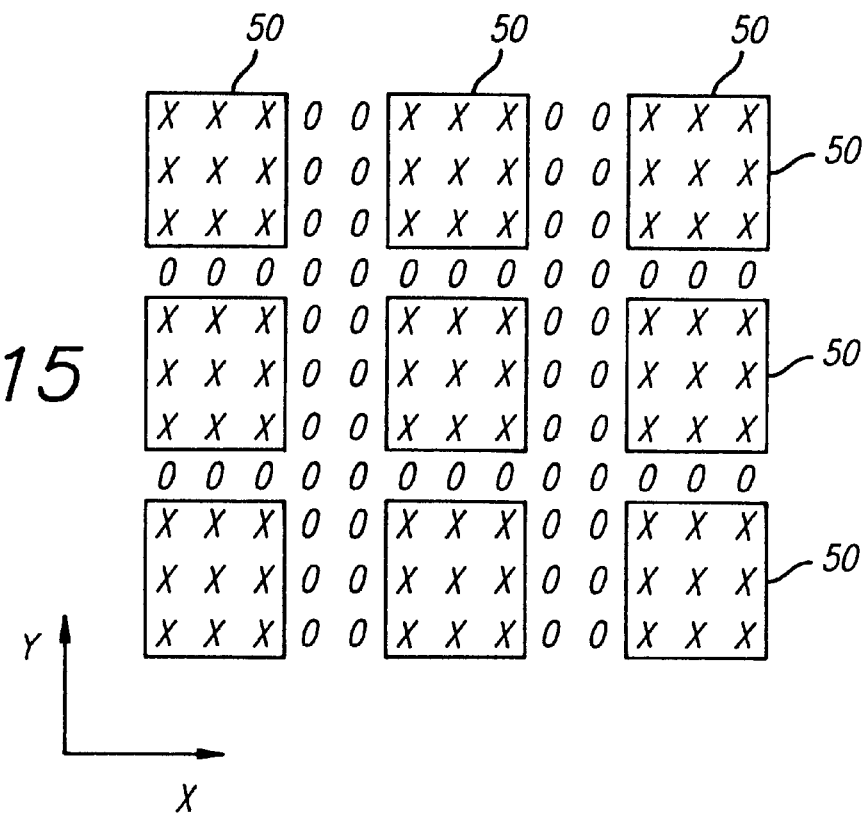
FIG. 15 illustrates a 3×3 column support pixel pattern forming a preferred support structure.
Figure 18:
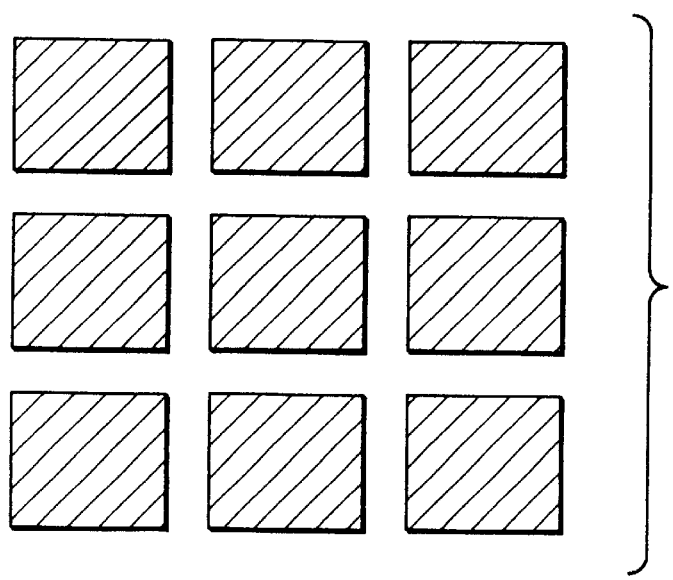
FIG. 18 illustrates the resulting deposition regions when the pixels of FIG. 15 are exposed using an overprinting scheme.

Columns 26 are 3×3 pixels in cross-section (9.9 mils×9.9 mils), and are spaced 2 pixels from adjacent columns in the scanning direction, and 1 pixel from adjacent columns in the index direction. These column supports are equivalent to the most preferred supports discussed above. As discussed above, the primary reason for the extra space in the main scanning direction is the fact that these supports will receive 4 times overprinting. The cross-sectional pattern formed by these columns is shown in FIGS. 15 and 18. The result is a series of columns more massive than fiber-like columns 25 and 28.

These columns, unlike the others, can be arbitrarily tall. The reason is that the larger cross-sections of these columns allow the columns to grow at about the same rate as the part itself (about 1.3 mils/layer). As previously discussed, it is preferred that bridges 29 be used to fuse adjacent ones of columns 26 together periodically to prevent "wandering" of these columns which can occur after building up for some distance. The spacing of the bridges is preferably in the previously discussed range.

The intermediate layers 27 represent an optional final layer of bridging which can function as a transition between columns 26 and columns 28. The reason a transition layer is useful is that the columns 28 are about the same size or smaller than the spaces between the columns 26, with the result that without the transition layers, the columns 28 may fall into these spaces. In one preferred approach, intermediate layers as a whole would not be used and instead careful placement of columns 28 on top of columns 26 would occur or only the necessary portions of interinediate layers 27 would be used.

Preferably, if used, these intermediate layers are of similar thickness to that of the previously discussed bridging layers.

It should be appreciated that intermediate layers are not needed between columns 25 and columns 26, because the columns 26 are larger in cross-section than the spacing between the columns 25. Accordingly, these larger columns can be built directly on top of the smaller columns without the need of intermediate layers.

Other hybrid supports are possible that make other combinations with the previously described support elements. The hybrid and other support structures may also be used to form internal portions of objects.

Additional alternatives exist for building supports. For example, it is also possible to build the support from a material which is different from that used to build the part. Another possibility is to add a fluid such as water between the interstices of the above described support structures in order to provide additional support and also for aiding heat dissipation. In such an approach, it is advantageous to use a fluid that has a greater density than the building material. That will give buoyancy to the drops of building material that fall between the interstices of the columns. The material should also be chosen such that its surface energy is matched to that of the building material in order to prevent a meniscus forming between the fluid and the columns. An example of such a material is a surfactant.

Another possibility is to shoot airjets upward between the interstices of the columns. In this approach a heat dissipation effect and buoyancy are possible. Another possibility is to fill the interstices of a reduced number of column supports (e.g. columns placed 0.1 to 1 inch or more apart) with particles. Moreover, such particles could be formed from the building material by allowing or causing the droplets to solidify before they reach the working surface (such as by increasing the distance between the dispensing head and the working surface), or by coating the droplets before they land with a material that sublimes, i.e., goes directly from a solid to a gas.

Supports preferably space the object from 50 to 300 mils from the surface of the building platform. Alternatively, the object may be directly built on the platform. In this alternative, the platform may be covered with a flexible sheet material that will allow easy separation of the object from the rigid platform and then from the sheet material. An electric knife may be used to separate the supports from the platform in which case it is preferred that object be placed 150 to 300 mils above the platform surface. A thin comb-like device with long teeth has been found effective for removing the supports from the platform. In this case, the thickness of the device dictates the required spacing between the object and the platform, typically between 50 and 200 mils. The supports may be removed from the object by light rubbing, brushing or by use of a small probe device such as a dental tool.

Another variant involves incorporating the subject embodiments into an integrated system, which includes a capability for automatic part removal, and a cooling station. Other alternatives involve using a low-melting, point metal as a building material, a material filler, or different materials on different raster lines or drop locations.

Further alternatives involve using larger drops for support building than for part building. Another alternative involves the use of powdered supports, which may be formed by allowing or causing the droplets to solidify before they reach the working surface, as described above.

Other embodiments might build up objects based on different main-scanning direction orientations (e.g. Y or Z), other secondary scanning direction orientations (e.g. X or Z) and other stacking orientations (e.g. X or Y). Other embodiments might use other absolute movement schemes to achieved the desired relative movements between the object and print head. For example in some embodiments absolute movement of the print head might occur in all three directions, while in other embodiments absolute object movement might occur in all three-directions. In still other embodiments, non-Cartesian movement of the print head or object might be used and jetting directions may vary from layer to layer or portion of layer to portion of layer.

Though some embodiments have been described under headings inserted in the application, these embodiments should not be considered as pertaining only to the topic indicated by the header. Furthermore, though headers were used to enhance the readability of this specification, all disclosure relevant to the particular topic recited by the header should not be considered as falling within those single sections. All embodiments disclosed herein are useful separately or in combination with other embodiments disclosed herein.

While embodiments and applications of this invention have been shown and described, it will be apparent to those skilled in the art that many more modifications are possible without departing from the inventive concepts herein. The invention, therefore, is not to be restricted, except in the spirit of the appended claims.

Appendix A: Tables I–III Detailing preferred materials for use in some preferred embodiments

TABLE I describes the component formulations.

| COMPONENT | |
|---|---|
| A | paraffin wax, melting point 60° C. |
| B | pure monomer hydrocarbon resin comprising a copolymer of α-methylstyrene, vinyl toluene; viscosity 1000 cps @ 130° C.; softening point 78–95° C. |
| C | medium hard microcrystalline esterwax; viscosity 16 cps @ 100° C.; melting point 78–86° C.; penetration 1.7 mm @ 25° C. |
| D | hard microcrystalline wax; viscosity 16 cps @ 100° C.; melting point 93° C.; penetration 0.55 mm @ 25° C. |
| E | soft microcrystalline wax; viscosity 13 cps @ 100° C.; melting point 69° C.; penetration 2.9 mm @ 25° C. |
| F | ethylene-vinyl acetate copolymer; viscosity 575 cps @ 140° C.; melting point 92° C. |
| G | tetrakis[methylene(3,5-di-tert-butyl-4-hydroxyhydrocinnamate)]methane, an antioxidant; melting point 110–125° C. |
| H | dioctylphthalate (DOP), a plasticizer |
| I | dioctylterephthalate (DOTP), a plasticizer |
| J | 2,6-di-tert-butyl-4-methylphenal, an antioxidant |
| K | diisononyl phthalate (DINP), a plasticizer |
| L | dye or coloring compound |
| M | methacrylate terminated polystyrene |
| N | free radical photoinitiator |
| O | polyethylene oxide, average molecular weight 2000 |
| P | epoxy novolac oligomer |
| Q | catonic photoinitiator |
| R | multifunctional acrylate |

Appendix A: Tables I–III Detailing preferred materials for use in some preferred embodiments Table II-A and II-B present formulations of preferred materials for use in some preferred embodiments by component designation.

TABLE II-A

| | | Weight % | | | | | |
|---|---|---|---|---|---|---|---|
| COMPONENT | | Ex. 1 | Ex. 2 | Ex. 3 | Ex. 4 | Ex. 5 | Ex. 6 |
| A | | 21 | 21 | 44 | 25 | 20 | 20 |
| B | | 49 | 49 | 25 | 20 | 25 | 50 |
| C | | 12 | 12 | 12 | — | — | 12 |
| D | | 5 | 5 | 6 | 10 | 5 | 5 |
| E | | 5 | 5 | 6 | 20 | 20 | 5 |
| F | | 4 | 4 | 2.3 | 20 | 25 | 4 |
| G | | 2 | 2 | — | — | — | — |
| H | | — | 2 | — | — | — | — |
| I | | — | — | 2.3 | 2 | 2.5 | 2 |
| J | | — | — | 2.3 | 3 | 2.5 | 2 |
| K | | 2 | — | — | — | — | — |
| PROPERTIES | | | | | | | |
| Viscosity @ 130° C. | cps/° C. | 22 | 22 | 7 | 20 | 28 | 24 |
| Hardness | shore D | | | | | 28 | 26 |
| Impact Energy | kJ/m² | | | | | 1.4 | 2.2 |

Appendix A: Tables I–III Detailing preferred materials for use in some preferred embodiments

TABLE II-B

| COMPONENT | Ex. 7 | Ex. 8 | Ex. 9 |
|---|---|---|---|
| A | 21 | | |
| M | 51 | | |
| C | 12 | | |

TABLE II-B-continued

| COMPONENT | Ex. 7 | Ex. 8 | Ex. 9 |
|---|---|---|---|
| D | 5 | | |
| E | 5 | | |
| F | 5 | | |
| N | 1 | | 1 |
| O | | 77 | 77 |
| P | | 22 | |
| Q | | 1 | |
| R | | | 22 |

Appendix A: Tables I–III Detailing preferred materials for use in some preferred embodiments

TABLE III

| COMPONENT | NAME | SUPPLIER |
|---|---|---|
| A | Paraffin | Allied Signal Inc., Morristown, NJ |
| B | "PICOTEX LC" | Hercules, Inc., Wilmington, DE |
| C | "X-22" | Hoechst Celanese Corp., Somerville, NJ |
| D | "C-700" | Petrolite Corp., Tulsa, OK |
| E | "ULTRAFLEX" | Petrolite Corp., Tulsa, OK |
| F | "AC-400" | Allied Signal Inc., Morristown, NJ |
| G | "IRGANOX 1010" | Ciba-Geigy Corp., Hawthorne, NY |
| H | DOTP | Aldrich Chemical Co., Inc., Milwaukee, WI |
| I | DOP | Aldrich Chemical Co., Inc., Milwaukee, WI |
| J | "BHT" | Aldrich Chemical Co., Inc., Milwaukee, WI |
| K | DINP | Aristech Chemical Corp., Cleveland, OH |
| M | "13K-RC" | Sartomer Co., West Chester, PA |
| N | "IRGACURE 184" | Ciba-Geigy Corp., Hawthorne, NY |
| O | Polyethelene Oxide | Dow Chemicals, Midland, MI |
| P | "DEN 438" | Dow Chemicals, Midland, MI |
| Q | "UVI 6974" | Union Carbide Chemicals, Danbury, CT |
| R | "SR 399" | Sartomer Co., West Chester, PA |

What is claimed is:

1. A rapid prototyping apparatus comprising:
a dispenser for controllably dispensing a flowable material having a solidification temperature into a build environment which is at a temperature below the solidification temperature of the flowable material, the flowable material being dispensed to accumulate in a vertical direction at a desired rate in a layer-by-layer cross-section basis;
a platform disposed in the build environment for supporting a three-dimensional object and support structure being formed by the layer-by-layer cross-section basis, wherein the platform includes a working surface for supporting a first layer of flowable material dispensed by the dispenser;
at least one displacement device for relatively displacing the dispenser and the working surface in a plurality of dimensions;
a controller coupled to the displacement device and to the dispenser to cause selective dispensing of the flowable material, wherein the controller includes means for combining object data with at least one selected building style for the three-dimensional object and for combining the object data with at least one selected support style for the support structure, the means for combining object data causing material to be dispensed in accordance with the combination of object data and the selected building style on a first portion of at least one of a plurality of layers and in accordance with the combination of object data and the selected support style on a second portion of the at least one layer, wherein the dispensed material accumulates in the vertical direction on the first portion of the at least one layer and on the second portion of the at least one layer at about the desired rate; and
a planarizer in communication with the apparatus for passing over the working surface to smooth the flowable material dispensed in each layer to establish a layer thickness for each cross-section.

2. The apparatus of claim 1 wherein the apparatus is a selective deposition modeling apparatus, and the dispenser comprises a print head configured to selectively dispense the flowable material.

3. The apparatus of claim 1 wherein the means for combining object data with the selected building style includes means for specifying overprinting in a scan direction.

4. The apparatus of claim 1 wherein the three-dimensional object has at least one up-facing skin surface and at least one interior portion and wherein the means for combining object data with the selected building style includes means for specifying a higher drop density ratio for forming the up-facing skin surfaces than for the interior portions of the three-dimensional object.

5. The apparatus of claim 1 wherein the means for combining object data with the selected building style includes means for specifying forming an interior region of the three-dimensional object with checkerboard supports.

6. The apparatus of claim 1 wherein the means for combining object data with the selected building style includes means for specifying altering a scan direction and an index direction between two layers.

7. The apparatus of claim 1 wherein the means for combining object data with the selected building style includes means for specifying forming the three-dimensional object through raster scanning having a length and width limited to a dispensing region required by a layer being formed.

8. The apparatus of claim 1 wherein the means for combining object data with the selected building style includes means for specifying separately forming different components of the three-dimensional object to enable object surfaces to be reoriented as up-facing surfaces during part building, and then combining the separately formed different components.

9. The apparatus of claim 1 wherein the means for combining object data with the selected support style includes means for specifying employing a higher number of passes per layer to form the support structure than to form the three-dimensional object.

10. The apparatus of claim 1 wherein the means for combining object data with the selected support style includes means for specifying complementary shelving on subsequent layers.

11. The apparatus of claim 1 wherein the means for combining object data with the selected support style includes means for specifying column supports with shelving.

12. The apparatus of claim 1 wherein the three-dimensional object has an up-facing surface and wherein the means for combining object data with the selected support style includes means for further specifying changing the support pattern in regions greater than a predetermined number of layers above an up-facing surface.

13. The apparatus of claim 1 wherein the means for combining object data with the selected support style includes means for specifying air pressure supports.

14. The apparatus of claim 1 wherein the dispenser includes an orifice for dispensing material therethrough in droplets toward the working surface and wherein the means for combining object data with the selected building style includes means for specifying a spacing between the orifice of the dispenser and the working surface which is large enough such that the droplets form semi-spherical drops upon impact.

15. The apparatus of claim 1, wherein the dispenser comprises at least one multi-jet ink jet dispensing head.

16. A rapid prototyping apparatus for forming a three-dimensional structure from a flowable, solidifiable material having a solidification temperature, the apparatus comprising:

- a dispenser for controllably dispensing the flowable solidifiable material into a build environment which is at a temperature below the solidification temperature of the flowable material, the material being dispensed to accumulate in a vertical direction at a desired rate in a layer-by-layer cross-section basis;
- a platform for supporting the three-dimensional structure as it is being formed on a layer-by-layer basis, wherein the platform includes a working surface for supporting a first layer of dispensed material, the three-dimensional structure including an object structure and a support structure;
- at least one displacement device for relatively displacing the dispenser and the working surface in at least two dimensions; a controller coupled to the displacement device and to the dispenser to cause selective dispensing of a plurality of layers of the material, wherein the controller includes means for combining object data with at least one selected building style and for combining the object data with at least one selected support style, the means for combining object data causing material to be dispensed in accordance with the combination of the object data with the selected building style and with the selected support style to form the object structure and the support structure, layer-by-layer, from the same solidifiable material, the object structure and the support structure both accumulating material in the vertical direction at about the desired rate; and
- a planarizer in communication with the apparatus for passing over the working surface to smooth the material dispensed in each layer to establish a layer thickness for each cross-section.

17. The apparatus as recited in claim 16, wherein said means for combining object data with the selected support style also includes means for providing boundary data defining the boundary of each layer of the support structure and for providing style data corresponding to a pattern of solidified material within the boundary of each layer of the support structure, and wherein said controller further includes means for causing the material to be dispensed in accordance with the boundary data and the style data of the support structure.

18. The apparatus of claim 16, wherein the dispenser comprises at least one multi-jet ink jet dispensing head.

* * * * *